(12) United States Patent
Zhang et al.

(10) Patent No.: US 12,063,689 B2
(45) Date of Patent: Aug. 13, 2024

(54) METHODS AND APPARATUS FOR SUPPORTING POSITIONING IN IDLE OR INACTIVE MODE

(71) Applicant: QUALCOMM Incorporated, San Diego, CA (US)

(72) Inventors: Xiaoxia Zhang, San Diego, CA (US); Srinivas Yerramalli, Hyderabad (IN); Lorenzo Ferrari, Oakland, CA (US); Yih-Hao Lin, San Diego, CA (US); Jing Sun, San Diego, CA (US); Rajat Prakash, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/335,982

(22) Filed: Jun. 1, 2021

(65) Prior Publication Data

US 2021/0400734 A1 Dec. 23, 2021

Related U.S. Application Data

(60) Provisional application No. 63/042,830, filed on Jun. 23, 2020.

(51) Int. Cl.
*H04W 74/0833* (2024.01)
*H04B 17/10* (2015.01)
(Continued)

(52) U.S. Cl.
CPC ...... *H04W 74/0833* (2013.01); *H04B 17/103* (2015.01); *H04L 5/0048* (2013.01); *H04W 52/0238* (2013.01); *H04W 72/21* (2023.01)

(58) Field of Classification Search
CPC ......... H04W 74/0833; H04W 52/0238; H04W 72/0413; H04B 17/103; H04L 5/0048
See application file for complete search history.

(56) References Cited

U.S. PATENT DOCUMENTS

2020/0260397 A1* 8/2020 Vos .................. H04W 74/0833
2021/0185614 A1* 6/2021 Zhou .................... H04L 5/0051
(Continued)

FOREIGN PATENT DOCUMENTS

WO WO-2018070908 A1 * 4/2018 ........ H04W 52/0216
WO WO-2020062071 A1 4/2020

OTHER PUBLICATIONS

International Search Report and Written Opinion—PCT/US2021/035479—ISA/EPO—Sep. 24, 2021.
(Continued)

*Primary Examiner* — Huy D Vu
*Assistant Examiner* — Robert Ma
(74) *Attorney, Agent, or Firm* — QUALCOMM Incorporated

(57) ABSTRACT

A user equipment (UE) transmits reference signals for positioning while in Idle or Inactive state. While in a connected state, the UE is pre-configured with Sounding Reference Signal (SRS) resource configuration including at least one of timing adjustment (TA) and an uplink (UL) transmission spatial filter. The UE transmits positioning SRS while in Idle or Inactive mode based on the pre-configuration. The TA and UL transmission spatial filter may be updated by a serving base station using control signals or a paging message received by the UE while in in Idle or Inactive mode. The validity of the TA and UL transmission spatial filter may be monitored using expiration timers or a relative position change threshold. The reference signals transmitted may be based on a UE may Physical Random Access Channel (PRACH), which is insensitive to TA
(Continued)

changes. A long sequence PRACH may be used for improved positioning accuracy.

68 Claims, 17 Drawing Sheets

(51) Int. Cl.
  *H04L 5/00* (2006.01)
  *H04W 52/02* (2009.01)
  *H04W 72/21* (2023.01)

(56) References Cited

U.S. PATENT DOCUMENTS

| | | | | |
|---|---|---|---|---|
| 2021/0259040 | A1* | 8/2021 | Babaei | H04W 72/1268 |
| 2021/0289463 | A1* | 9/2021 | Bi | H04W 74/0833 |
| 2022/0201646 | A1* | 6/2022 | Berggren | H04L 5/0094 |
| 2022/0271890 | A1* | 8/2022 | Grossmann | H04L 5/0051 |

OTHER PUBLICATIONS

Xiaomi Communications: "Positioning Enhancements for RRC Idle and RRC Inactive State UE", 3GPP Draft, 3GPP TSG RAN WG1 #101, R1-2003977, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 15, 2020 (May 15, 2020), XP051885739, 4 Pages, Retrieved from the Internet: URL: https://ftp.3gpp.org/tsg_ran/WG1_RL1/TSGR1_101-e/Docs/R1-2003977.zip. R1-2003977, Positioning Enhancements for RRC Idle and RRC Inactive state UE.doc [Retrieved on May 15, 2020] the whole document.

ZTE: "Discussion on NR Positioning Signals", 3GPP Draft, 3GPP TSG RAN WG1 Meeting #96bis, R1-1903901, Discussion on DL&UL PRS, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 3, 2019 (Apr. 3, 2019), pp. 1-6, XP051707055, Retrieved from the Internet: URL: http://www.3gpp.org/ftp/tsg%5Fran/WG1%5FRL1/TSGR1%5F96b/Docs/R1%2D1903901%2Ezip. [Retrieved on Apr. 3, 2019], p. 1, paragraph 2.1-p. 2, paragraph 2.3.

* cited by examiner

METHODS AND APPARATUS FOR SUPPORTING POSITIONING IN IDLE OR INACTIVE MODE

CLAIM OF PRIORITY UNDER 35 U.S.C. § 119

This application claims under 35 USC § 119 the benefit of and priority to U.S. Provisional Application No. 63/042,830, filed Jun. 23, 2020, entitled "METHODS AND APPARATUS FOR SUPPORTING POSITIONING IN IDLE OR INACTIVE MODE," which is assigned to the assignee hereof and is incorporated herein by reference in its entirety.

BACKGROUND OF THE DISCLOSURE

1. Field of the Disclosure

Aspects of the disclosure relate generally to positioning for user equipment (UE).

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

A user equipment (UE) transmits reference signals for positioning while in Idle or Inactive state. While in a connected state, the UE may be pre-configured with Sounding Reference Signal (SRS) resource configuration including at least one of timing adjustment (TA) and an uplink (UL) transmission spatial filter. The UE transmits positioning SRS while in Idle or Inactive mode based on the pre-configuration. The TA and UL transmission spatial filter may be updated by a serving base station using control signals or a paging message received by the UE while in in Idle or Inactive mode. The validity of the TA and UL transmission spatial filter may be monitored using expiration timers or a relative position change threshold. The reference signals transmitted may be based on a UE may Physical Random Access Channel (PRACH), which is insensitive to TA changes. A long sequence PRACH may be used for improved positioning accuracy.

In one implementation, a method for supporting position determination of a user equipment (UE) performed by the UE in a wireless network, includes receiving a Sounding Reference Signal (SRS) resource configuration for transmitting positioning SRS from a serving base station, the SRS resource configuration comprising at least one of timing adjustment (TA) and an uplink (UL) transmission spatial filter; entering an idle or inactive mode; transmitting the positioning SRS using the at least one of the TA and the UL transmission spatial filter while in the idle or inactive mode; receiving from the serving base station an update to the at least one of the TA and the UL transmission spatial filter while the UE is in the idle or inactive mode; and transmitting the positioning SRS using the update to the at least one of the TA and the UL transmission spatial filter while in the idle or inactive mode.

In one implementation, a user equipment (UE) configured to support position determination of the UE in a wireless network, includes a wireless transceiver configured to wirelessly communicate with base stations in the wireless network; at least one memory; at least one processor coupled to the wireless transceiver and the at least one memory, wherein the at least one processor is configured to: receive, via the wireless transceiver, a Sounding Reference Signal (SRS) resource configuration for transmitting positioning SRS from a serving base station, the SRS resource configuration comprising at least one of timing adjustment (TA) and an uplink (UL) transmission spatial filter; enter an idle or inactive mode; transmit, via the wireless transceiver, the positioning SRS using the at least one of the TA and the UL transmission spatial filter while in the idle or inactive mode; receive from the serving base station an update to the at least one of the TA and the UL transmission spatial filter while the UE is in the idle or inactive mode; and transmit, via the wireless transceiver, the positioning SRS using the update to the at least one of the TA and the UL transmission spatial filter while in the idle or inactive mode.

In one implementation, a user equipment (UE) configured for supporting position determination of the UE in a wireless network, includes means for receiving a Sounding Reference Signal (SRS) resource configuration for transmitting positioning SRS from a serving base station, the SRS resource configuration comprising at least one of timing adjustment (TA) and an uplink (UL) transmission spatial filter; means for entering an idle or inactive mode; means for transmitting the positioning SRS using the at least one of the TA and the UL transmission spatial filter while in the idle or inactive mode; means for receiving from the serving base station an update to the at least one of the TA and the UL transmission spatial filter while the UE is in the idle or inactive mode; and means for transmitting the positioning SRS using the update to the at least one of the TA and the UL transmission spatial filter while in the idle or inactive mode.

In one implementation, a non-transitory storage medium including program code stored thereon, the program code is operable to configure at least one processor in a user equipment (UE) to support position determination of the UE in a wireless network, the program code comprising instructions to: receive a Sounding Reference Signal (SRS) resource configuration for transmitting positioning SRS from a serving base station, the SRS resource configuration comprising at least one of timing adjustment (TA) and an uplink (UL) transmission spatial filter; enter an idle or inactive mode; transmit the positioning SRS using the at least one of the TA and the UL transmission spatial filter while in the idle or inactive mode; receive from the serving base station an update to the at least one of the TA and the UL transmission spatial filter while the UE is in the idle or inactive mode; and transmit the positioning SRS using the update to the at least one of the TA and the UL transmission spatial filter while in the idle or inactive mode.

In one implementation, a method for supporting position determination of a user equipment (UE) performed by a base station in a wireless network, includes transmitting to the UE a Sounding Reference Signal (SRS) resource configuration for transmitting positioning SRS in an idle or inactive mode, the SRS resource configuration comprising at least one of timing adjustment (TA) and an uplink (UL) transmission spatial filter; receiving the positioning SRS transmitted from the UE using the at least one of the TA and the UL transmission spatial filter while the UE is in the idle or inactive mode; generating positioning measurements using the positioning SRS transmitted from the UE using the at least one of the TA and the UL transmission spatial filter; transmitting to the UE an update to the at least one of the TA and the UL transmission spatial filter while the UE is in the idle or inactive mode; and receiving the positioning SRS transmitted from the UE using the update to the at least one of the TA and the UL transmission spatial filter while the UE is in the idle or inactive mode; and generating positioning measurements using the positioning SRS transmitted from the UE using the update to the at least one of the TA and the UL transmission spatial filter.

In one implementation, a base station configured to support position determination of a user equipment (UE) in a wireless network, includes an external interface configured to wirelessly communicate with the UE in the wireless network; at least one memory; at least one processor coupled to the external interface and the at least one memory, wherein the at least one processor is configured to: transmit to the UE, via the external interface, a Sounding Reference Signal (SRS) resource configuration for transmitting positioning SRS in an idle or inactive mode, the SRS resource configuration comprising at least one of timing adjustment (TA) and an uplink (UL) transmission spatial filter; receive, via the external interface, the positioning SRS transmitted from the UE using the at least one of the TA and the UL transmission spatial filter while the UE is in the idle or inactive mode; generate positioning measurements using the positioning SRS transmitted from the UE using the at least one of the TA and the UL transmission spatial filter; transmit to the UE, via the external interface, an update to the at least one of the TA and the UL transmission spatial filter while the UE is in the idle or inactive mode; receive, via the external interface, the positioning SRS transmitted from the UE using the update to the at least one of the TA and the UL transmission spatial filter while the UE is in the idle or inactive mode; and generate positioning measurements using the positioning SRS transmitted from the UE using the update to the at least one of the TA and the UL transmission spatial filter.

In one implementation, a base station in a wireless network configured for supporting position determination of a user equipment (UE), includes means for transmitting to the UE a Sounding Reference Signal (SRS) resource configuration for transmitting positioning SRS in an idle or inactive mode, the SRS resource configuration comprising at least one of timing adjustment (TA) and an uplink (UL) transmission spatial filter; means for receiving the positioning SRS transmitted from the UE using the at least one of the TA and the UL transmission spatial filter while the UE is in the idle or inactive mode; means for generating positioning measurements using the positioning SRS transmitted from the UE using the at least one of the TA and the UL transmission spatial filter; means for transmitting to the UE an update to the at least one of the TA and the UL transmission spatial filter while the UE is in the idle or inactive mode; means for receiving the positioning SRS transmitted from the UE using the update to the at least one of the TA and the UL transmission spatial filter while the UE is in the idle or inactive mode; and means for generating positioning measurements using the positioning SRS transmitted from the UE using the update to the at least one of the TA and the UL transmission spatial filter.

In one implementation, a non-transitory storage medium including program code stored thereon, the program code is operable to configure at least one processor in a base station to support position determination of a user equipment (UE) in a wireless network, the program code comprising instructions to: transmit to the UE a Sounding Reference Signal (SRS) resource configuration for transmitting positioning SRS in an idle or inactive mode, the SRS resource configuration comprising at least one of timing adjustment (TA) and an uplink (UL) transmission spatial filter; receive the positioning SRS transmitted from the UE using the at least one of the TA and the UL transmission spatial filter while the UE is in the idle or inactive mode; generate positioning measurements using the positioning SRS transmitted from the UE using the at least one of the TA and the UL transmission spatial filter; transmit to the UE an update to the at least one of the TA and the UL transmission spatial filter while the UE is in the idle or inactive mode; receive the positioning SRS transmitted from the UE using the update to the at least one of the TA and the UL transmission spatial filter while the UE is in the idle or inactive mode; and generate positioning measurements using the positioning SRS transmitted from the UE using the update to the at least one of the TA and the UL transmission spatial filter.

In one implementation, a method for supporting position determination of a user equipment (UE) performed by the UE in a wireless network, includes entering an idle or inactive mode; and transmitting a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

In one implementation, a user equipment (UE) configured to support position determination of the UE in a wireless network, includes a wireless transceiver configured to wirelessly communicate with base stations in the wireless network; at least one memory; at least one processor coupled to the wireless transceiver and the at least one memory, wherein the at least one processor is configured to: enter an idle or inactive mode; and transmit, via the wireless transceiver, a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

In one implementation, a user equipment (UE) configured for supporting position determination of the UE in a wireless network, includes means for entering an idle or inactive mode; and means for transmitting a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

In one implementation, a non-transitory storage medium including program code stored thereon, the program code is operable to configure at least one processor in a user equipment (UE) to support position determination of the UE in a wireless network, the program code comprising instructions to: enter an idle or inactive mode; and transmit a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

In one implementation, a method for supporting position determination of a user equipment (UE) performed by a base station in a wireless network, includes receiving a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and generating positioning measurements for the UE using the PRACH for UL positioning.

In one implementation, a base station configured to support position determination of a user equipment (UE) in a wireless network, includes an external interface configured to wirelessly communicate with the UE in the wireless network; at least one memory; at least one processor coupled to the external interface and the at least one memory, wherein the at least one processor is configured to: receive, via the external interface, a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and generate positioning measurements for the UE using the PRACH for UL positioning.

In one implementation, a base station in a wireless network configured for supporting position determination of a user equipment (UE), includes means for receiving a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and means for generating positioning measurements for the UE using the PRACH for UL positioning.

In one implementation, a non-transitory storage medium including program code stored thereon, the program code is operable to configure at least one processor in a base station to support position determination of a user equipment (UE) in a wireless network, the program code comprising instructions to: receive a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and generate positioning measurements for the UE using the PRACH for UL positioning.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
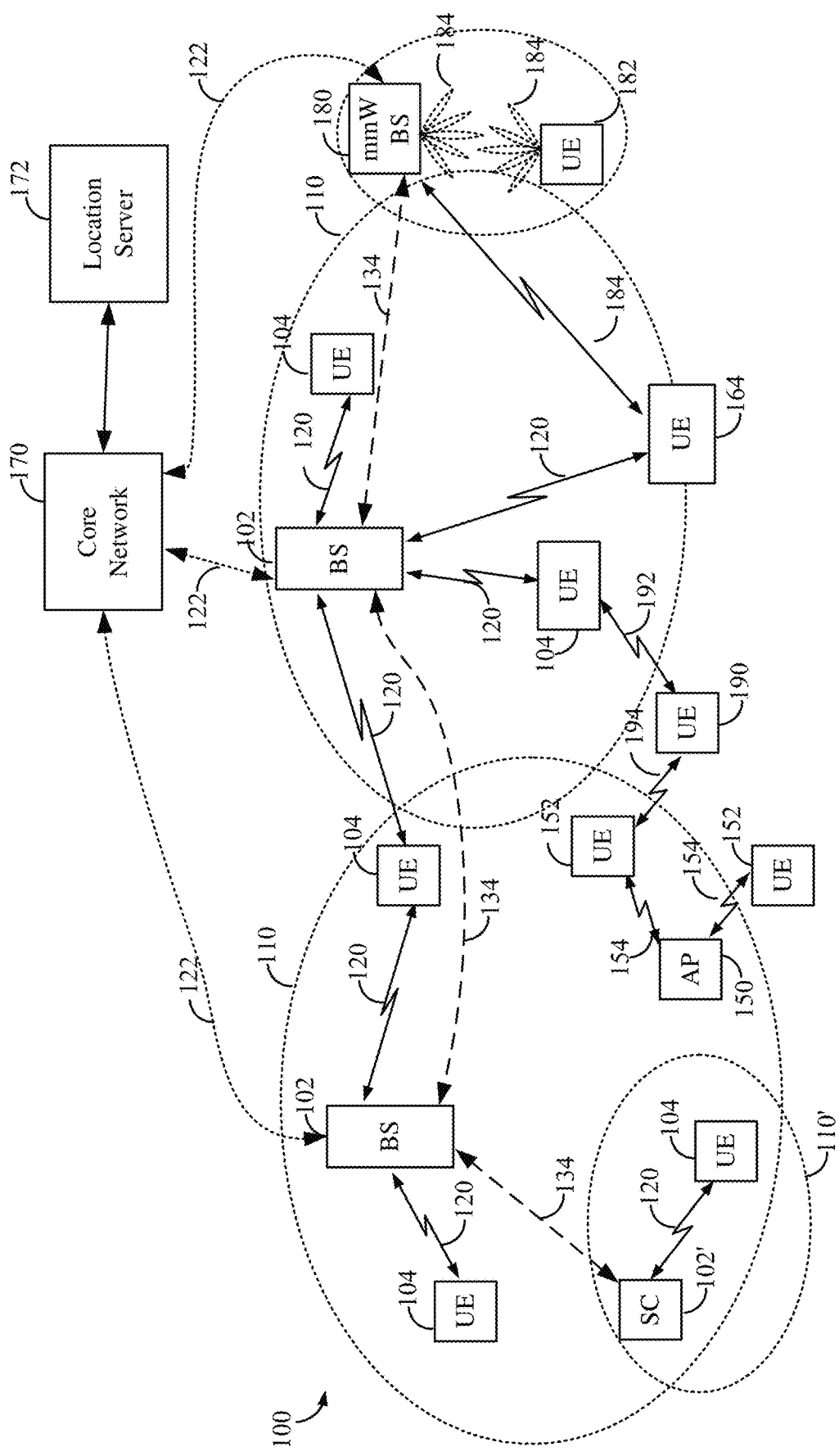
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

In general, positioning for a UE is supported only while the UE is in a radio resource control (RRC) connected state. For example, in Release 16, NR positioning is only supported for a RRC Connected state UE. An Idle or Inactive state is a power-saving state in which data is generally not exchanged. While some control signals and paging signals may be received by a UE in Idle or Inactive mode, communications between the UE and a base station typically requires the UE to transition into a connected state. A UE in an RRC Idle or Inactive state is required to transition to an RRC Connected state whenever the positioning is required. Such a requirement for positioning will increase the UE power consumption and positioning latency, as well as network load and efficiency.

It is desirable to support positioning for UEs in an Idle or Inactive mode. Configuration of the UE to receive DL and transmit UL reference signals for positioning needs, however, is problematic. For example, it has been proposed to pre-configure a UE with the desired DL and UL reference signal configurations while the UE is in a connected state so that the UE may use such configurations for receiving and transmitting reference signals while in the Idle or Inactive state.

With respect to UL reference signals configurations, a UE may be pre-configured so that the UE may transmit reference signals for positioning while the UE is in Idle or Inactive mode, but one problem is the timing advance, which is sometimes referred to herein generically as timing adjustment (TA). A TA value corresponds to the length of time a signal takes to reach the base station from the UE. Radio technologies, such as LTE and NR, assign timeslots to separate UEs that share the same frequency in the radio interface. It is important that a transmission from a UE arrives at the base station at the assigned timeslot or the transmission may not be properly received by the base station and the transmission may interfere with transmissions of other UEs in the wireless system. The distance between the base station and a UE may vary, which will alter the length of time for a transmitted signal to reach the base station from the UE. The time at which a UE is permitted to transmit UL reference signals to a base station must be adjusted accordingly for proper reception and to prevent interference to other UEs. The TA is a variable in the UL reference signal configuration that controls this adjustment. The serving base station, for example, monitors transmissions from a UE and determines any necessary adjustments to the TA, which are then provided to the UE. A continually adjusted TA value avoids interference to and from other UEs in adjacent timeslots, thereby minimizing data loss and maintaining Mobile QoS (call quality-of-service). The TA value obtained by a UE in a pre-configuration for UL reference signals while in connected mode may not be valid when the UE is in Idle or Inactive mode due to potential UE mobility. Any UL transmission by a UE in Idle or Inactive mode without accurate TA may not be received by the base station properly and may cause interference to other UEs whose transmissions are synchronous at the base station.

Another potential difficulty with pre-configuration of the UE with a UL reference signal configuration is related to the UL transmission spatial filter, sometimes referred to as beamforming, which may be quickly outdated once the UE is in Idle or Inactive mode. Transmit beamforming is a technique in which a UE may focus a RF signal in a specific direction. Traditionally, when a UE broadcasts an RF signal, it broadcasts the signal in all directions (omni-directionally). In certain situations, however, such as with certain 5G NR frequency bands, e.g., Frequency Range 2 (FR2) or any other mmW band, it is desirable to use direction transmissions of RF signals, e.g., to compensate for high path loss and short range. For example, with transmit beamforming, the UE may project a stronger UL RF signal in a specific direction, e.g., the direction of the base station, thereby providing a faster (in terms of data rate) and stronger RF signal for the receiving device. To change the directionality of the RF signal when transmitting, the UE may control the phase and relative amplitude of the RF signal at each of the one or more antennas in an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction.

The base station generally determines the specific direction that the UE is to use for beamforming and provides this information to the UE in the UL transmission spatial filter, which is received as part of a UL reference signal transmission configuration. The UL transmission spatial filter requires regular updating, as merely rotating the UE may change the direction at which the UE should beamform in order for the signals to be received by the base station. Thus, the UL transmission spatial filter obtained by a UE in a pre-configuration for UL reference signals while in connected mode may not be valid when the UE is in Idle or Inactive mode due to potential UE movement. Any UL transmission by a UE in Idle or Inactive mode based on an outdated UL transmission spatial filter may not be received by base station properly and may cause interference to other UEs in the wireless system.

Implementations are described herein for resolving issues related to UL reference signal transmissions while in Idle or Inactive mode and particularly issues related to the validity of pre-configured TAs and/or UL transmissions spatial filters.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), frequency band with above 52600 MHz, and frequency band between FR1 and FR2. In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial RRC connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
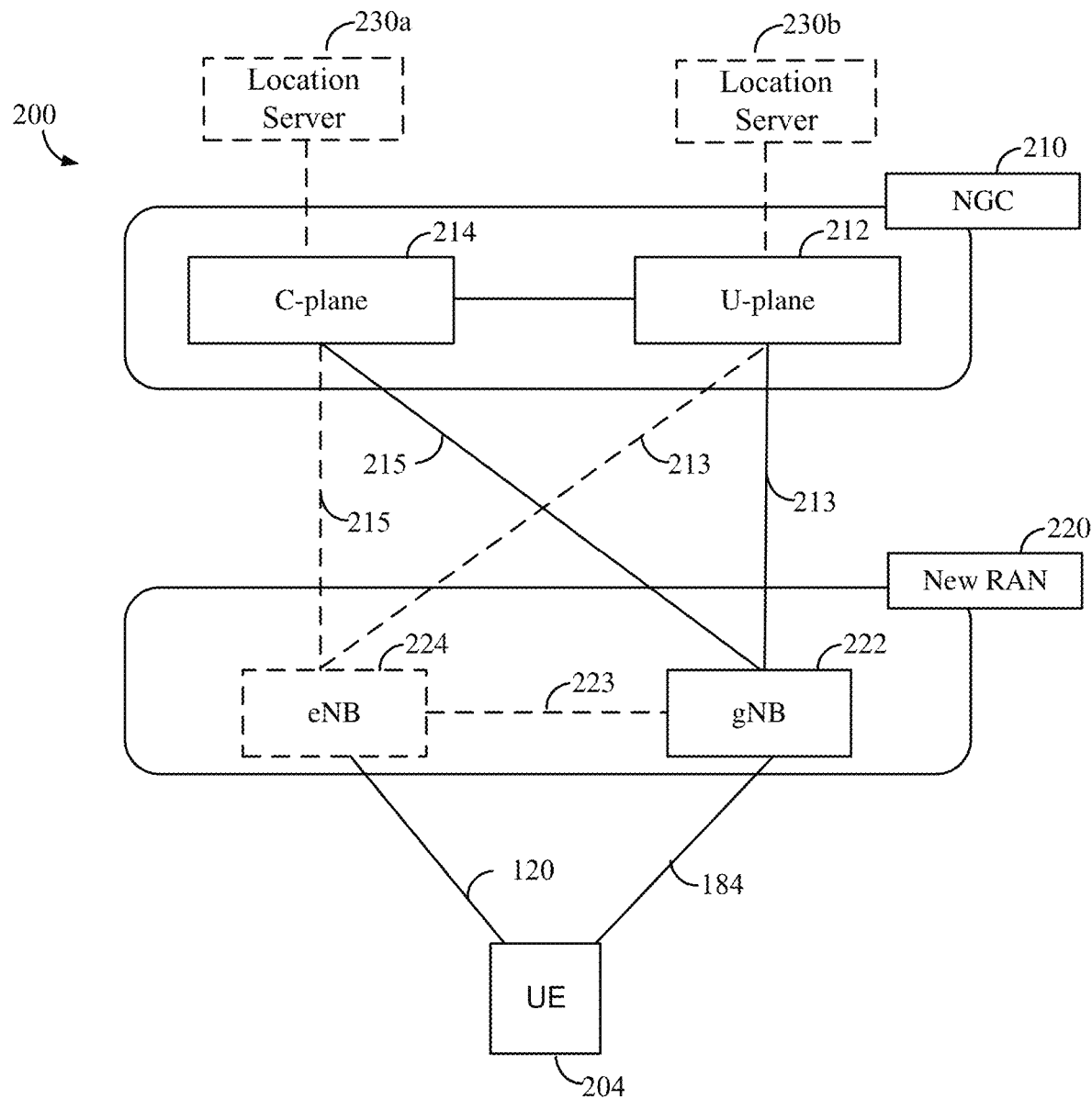
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to LMF 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
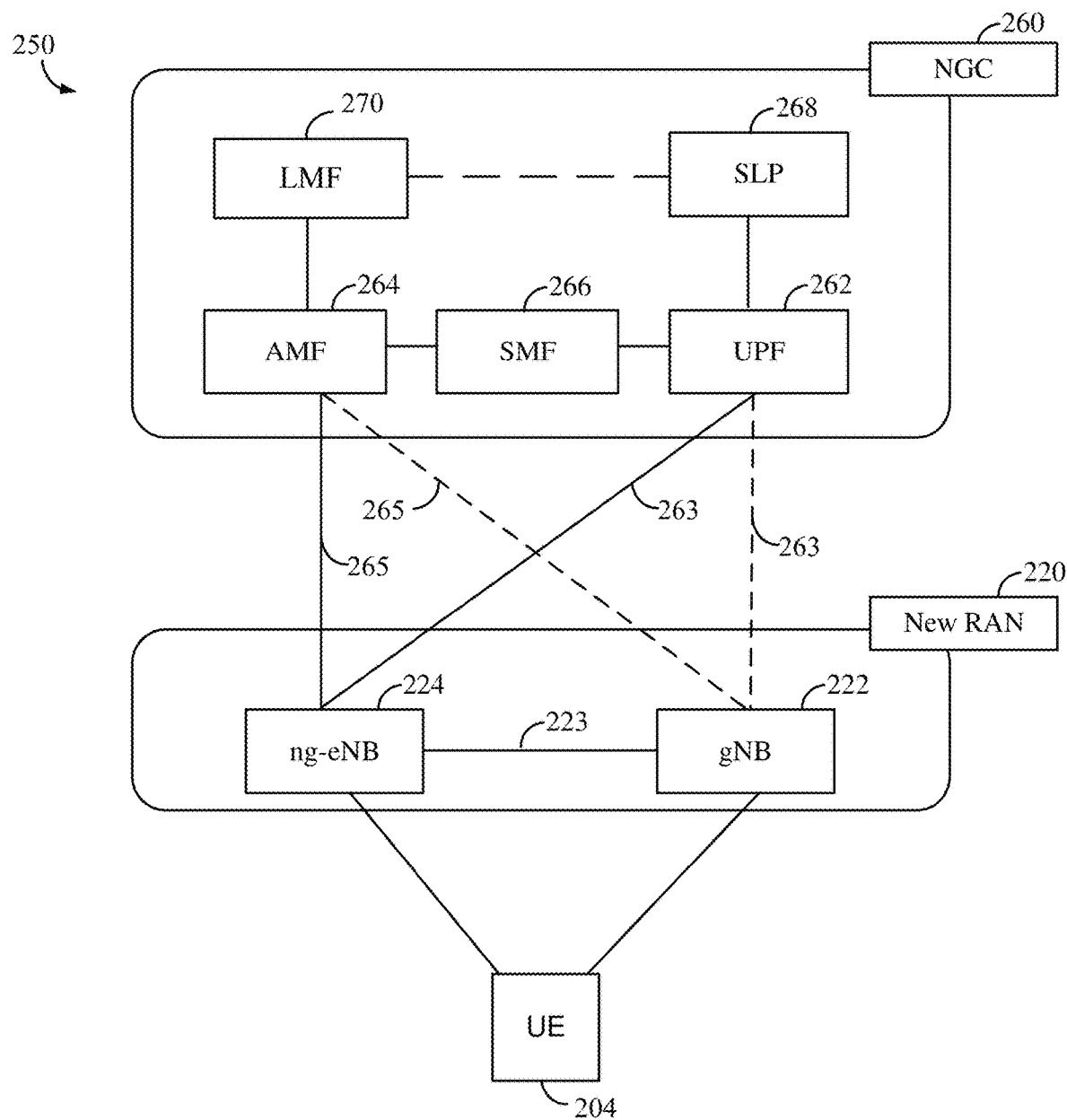

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to LMF 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
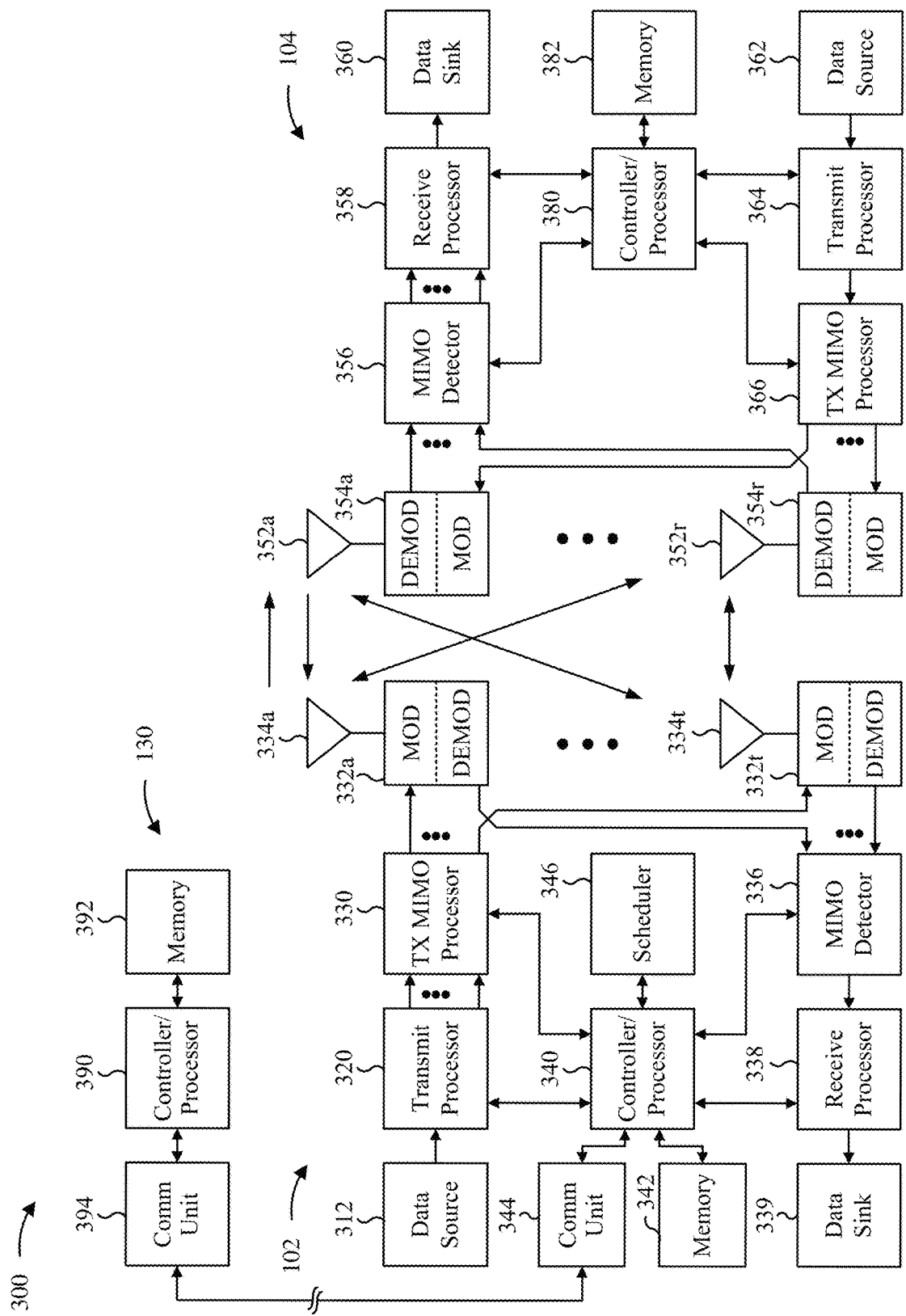
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general $T \geq 1$ and $R \geq 1$.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 130 via communication unit 344. Network controller 130 may include communication unit 394, controller/processor 390, and memory 392.

Controller/processor 340 of base station 102, controller/processor 380 of UE 104, and/or any other component(s) of FIG. 3 may perform one or more techniques associated with UL transmissions of reference signals while in Idle or Inactive mode, as described in more detail elsewhere herein. For example, controller/processor 340 of base station 102, controller/processor 380 of UE 104, and/or any other component(s) of FIG. 3 may perform or direct operations of, for example, process 1300 of FIG. 13, process 1400 of FIG. 14, process 1500 of FIG. 15, or process 1600 of FIG. 16 and/or other processes as described herein. Memories 342 and 382 may store data and program codes for base station 102 and UE 104, respectively. In some aspects, memory 342 and/or memory 382 may comprise a non-transitory computer-readable medium storing one or more instructions for wireless communication. For example, the one or more instructions, when executed by one or more processors of the base station 102 and/or the UE 104, may perform or direct operations of, for example, process 1300 of FIG. 13, process 1400 of FIG. 14, process 1500 of FIG. 15, or process 1600 of FIG. 16, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
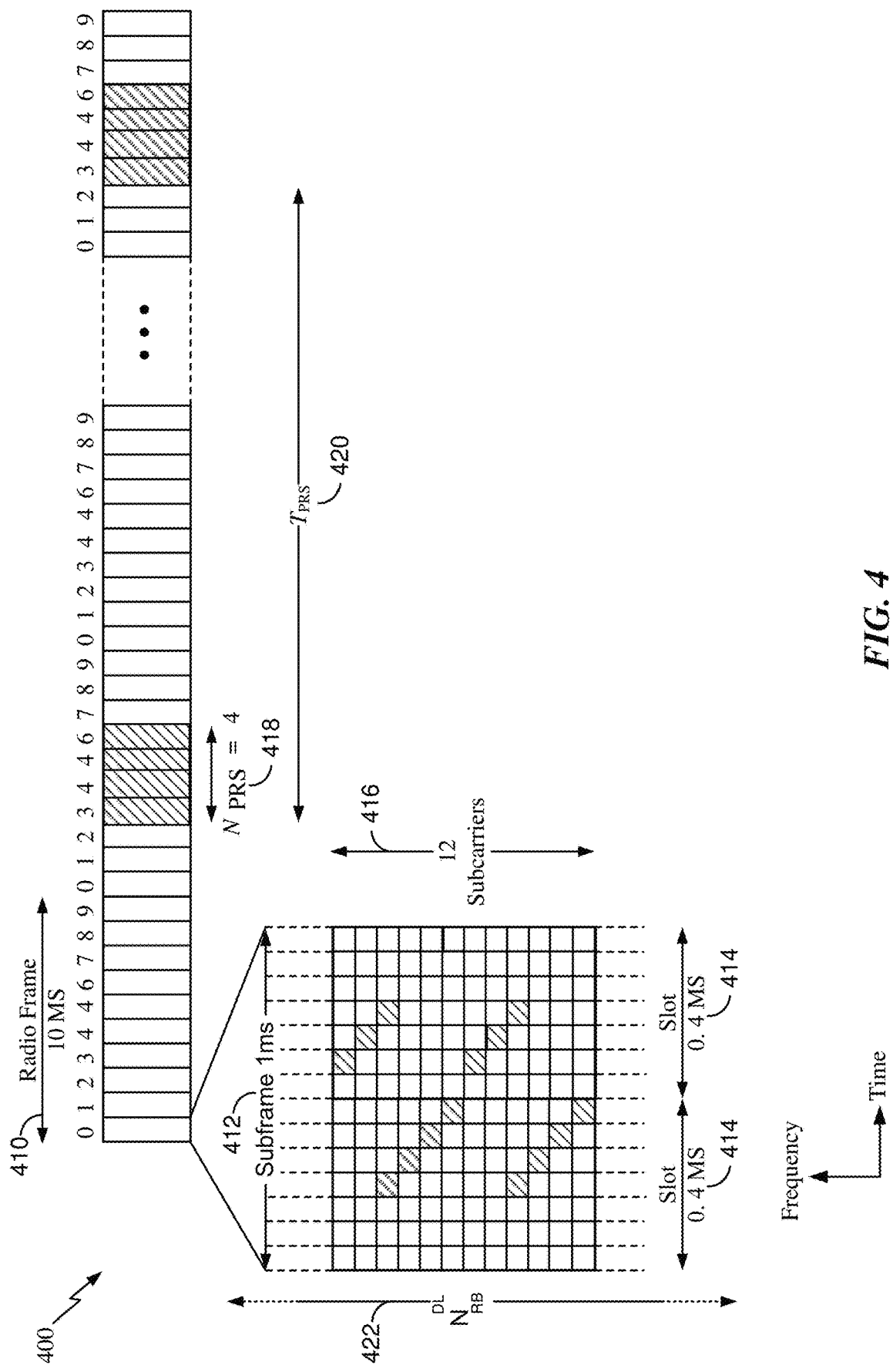
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that can be used for positioning, such as but not limited to, PRS signals in LTE/NR, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning. The UL PRS may be, e.g., sounding reference signals (SRS) for positioning. Using received DL PRS from base stations and/or UL PRS transmitted to base stations, various positioning measurements may be performed, such as time of arrival (TOA), reference signal time difference (RSTD), time difference of arrival (TDOA), reference signal received power (RSRP), time difference between reception and transmission of signals (Rx-Tx), angle of arrival (AoA), or angle of departure (AoD), etc. In some implementations, the DL PRS and UL PRS are received and transmitted jointly to perform multi-cell positioning measurements, such as multi-Round Trip Time (RTT).

Various positioning technologies rely on DL PRS or UL PRS (or SRS for positioning). For example, positioning technologies that use reference signal include downlink based positioning, uplink based positioning, and combined downlink and uplink based positioning. For example, downlink based positioning includes positioning methods such as DL-TDOA and DL-AoD. Uplink based positioning includes positioning method such as UL-TDOA and UL-AoA. Downlink and uplink based positioning includes positioning method, such as RTT with one or more neighboring base station (multi-RTT). Other positioning methods exist, including methods that do not rely on PRS. For example, Enhanced Cell-ID (E-CID) is based on radio resource management (RRM) measurements.

As discussed above, it is desirable to support positioning for a UE that is in an Idle or Inactive mode, during which the UE may transmit UL reference signals, such as SRS for positioning. The UE may be pre-configured with UL SRS configurations while in a connected state, but parameters, such as TA and UL transmission spatial filter, may be quickly outdated and invalid after the UE transitions to Idle or Inactive mode.

In one implementation, the UE 104 may be configured with a TA expiration timer for transmitting SRS for positioning while in Idle or Inactive mode. When the TA timer expires, for example, the TA that was obtained while the UE 104 was in a connected state may no longer be considered valid. Accordingly, once the TA timer expires, the UE 104 may no longer transmit on the pre-configured SRS resources for positioning. The TA timer, for example, may start upon receipt of the pre-configuration for the SRS for positioning.

The length of the TA expiration timer may be configurable. For example, a slow or low mobility UE or a UE that is restricted to a relatively limited area, may be configured with a relatively long TA expiration timer, while a more mobile UE may have a relatively short TA expiration timer. Additionally, in some implementations, different positioning SRS resource may be configured with different TA expiration timers. For example, some SRS resources may be more sensitive to TA errors than other SRS resources and, thus, may require a shorter TA expiration timer. By way of example, an SRS resource configured for a neighboring cell may require higher transmission power than an SRS resource configured for the serving cell, and accordingly, a TA error in the high power transmission for the neighboring cell may create more interference than the same TA error in the lower power transmission for the serving cell. Accordingly, it may be appropriate to use different TA expiration timers for the different SRS resources.

In one implementation, the UE 104 may be configured with a relative position change threshold for transmitting SRS for positioning while in Idle or Inactive mode. For example, the UE 104 may be configured with a change threshold for the power of received DL signals, e.g., a reference signal receive power (RSRP) change threshold, for transmitting SRS for positioning while in Idle or Inactive mode. A significant increase or decrease in the RSRP, for example, provides an indication that a substantial change in the relative position between the UE 104 and a base station 102 has occurred and, thus, pre-configured or pre-indicated TA value may no longer be valid. Note the pre-configured or pre-indicated TA value could be done implicitly where the TA value can be the latest TA value before UE transitioned to idle or inactive state.

Thus, for example, a UE 104 may measure the DL RSRP from a base station 102 at or near the time of reception of the pre-configuration for the TA, which may serve as a reference RSRP value. Alternatively, the reference DL RSRP value can be the latest DL RSRP measurement before UE transitioned to idle or inactive state. The UE 104 may continue to monitor the DL RSRP from the base station 102 and compare the difference between the latest RSRP and the reference RSRP values to a change threshold. When the UE 104 observes the change in the DL RSRP exceeding the change threshold, the UE 104 may no longer transmit on the pre-configured SRS resource for positioning.

The RSRP change may be based on the reference pathloss for each positioning SRS resource. For example, the RSRP change may be based the RSRP measured from the serving cell when the pathloss reference for positioning SRS is configured to be the serving cell, while the RSRP change may be based on the RSRP measured from a neighbor cell when the pathloss reference for positioning SRS is configured to be that neighbor cell. Additionally, different RSRP change thresholds may be configured for different positioning SRS resources. For example, as discussed above, some SRS resources may be more sensitive to TA errors than other SRS resources and, thus, may require a shorter TA expiration timer. Accordingly, it may be appropriate to use different RSRP change thresholds for the different positioning SRS resources.

In addition, the RSRP change for a positioning SRS resource may include more than one reference pathloss. Thus, for a positioning SRS resource, the RSRP change over more than one reference pathloss may be monitored, where the RSRP may be based on RSRP measured from the cell for the pathloss reference as well as some pre-configured neighbor cells. For example, for a serving base station, the change in RSRP may be monitored for the serving base station as well as for one or more neighboring cells, using the same or different change thresholds. In some implementations, if one of the RSRP changes exceeds the corresponding threshold, the UE 104 may no longer transmit on the pre-configured SRS resource for positioning. In another implementation, the UE 104 may transmit on the pre-configured SRS resource for positioning unless all the RSRP changes exceed the corresponding thresholds.

In another implementation, the UE 104 may be configured to monitor a relative position change threshold additionally or alternatively using inertial or motion sensors, e.g., using dead reckoning from an initial position when the pre-configuration is received, and to no longer transmit SRS for positioning while in Idle or Inactive mode if the relative position change exceeds a change threshold. Similar to the description above, the change threshold may be different for different SRS resources.

In some implementations, the UE 104 may use both a TA expiration timer and a relative position change threshold, such as one or more of the received power (RSRP) or inertial sensor. For example, the UE 104 may no longer transmit SRS for positioning on a pre-configured SRS resource if one or both of the TA expiration timer or relative position change indicates the TA is no longer valid.

The use of the TA expiration timer and monitoring the relative position change (e.g., RSRP change), provide an indication to the UE 104 of when the TA may no longer be considered valid, and thus, transmissions of SRS for positioning should cease while the UE 104 is in Idle or Inactive mode. It may be desirable, however, for the UE 104 to continue to transmit SRS for positioning over an extended duration or despite substantially movement without having to transition to an RRC connected state.

Thus, in one implementation, the UE 104 may receive updates for the TA while in Idle and Inactive mode. For example, when the UE 104 transmits SRS for positioning in Idle or Inactive mode, the UE 104 may also monitor DL transmissions from the serving base station for an update to the TA. The serving base station 102 may determine the UL TA for the UE 104 based on the SRS for positioning transmissions. The base station 102 may provide TA adjustments in control messages that are monitored by the UE 104 while the UE 104 is in Idle or Inactive mode, such as in in a Physical Downlink Control Channel (PDCCH), such as a downlink control information (DCI), or DL Physical Data Shared Channel (PDSCH). If the UE 104 is not provided with pre-configured Physical Uplink Control Channel (PUCCH), the UE 104 does not need to provide feedback to PDSCH. The UE 104, for example, may be pre-configured on the PDCCH monitoring occasions for the potential TA updates. In another example, the base station 102 may provide TA adjustments for a UE 104 in Idle or Inactive mode using a paging message, which the UE 104 monitors while in Idle or Inactive mode. The paging message, for example, may provide a TA update, but does not require that the UE 104 reconnect.

A single TA update may be valid for one or more positioning SRS resources based on base station's pre-configuration. Alternatively, the base station 102 may issue multiple TA updates for multiple positioning SRS resources jointly or separately in one or multiple DCI or PDSCH.

In implementations where an TA expiration is used, the UE 104 may reset the TA expiration timer every time the TA update is received. Similarly, in implementations where the UE 104 monitors relative position change (e.g., RSRP change), the UE 104 may update the reference RSRP (or initial position) every time the TA update is received.

Figure 5:
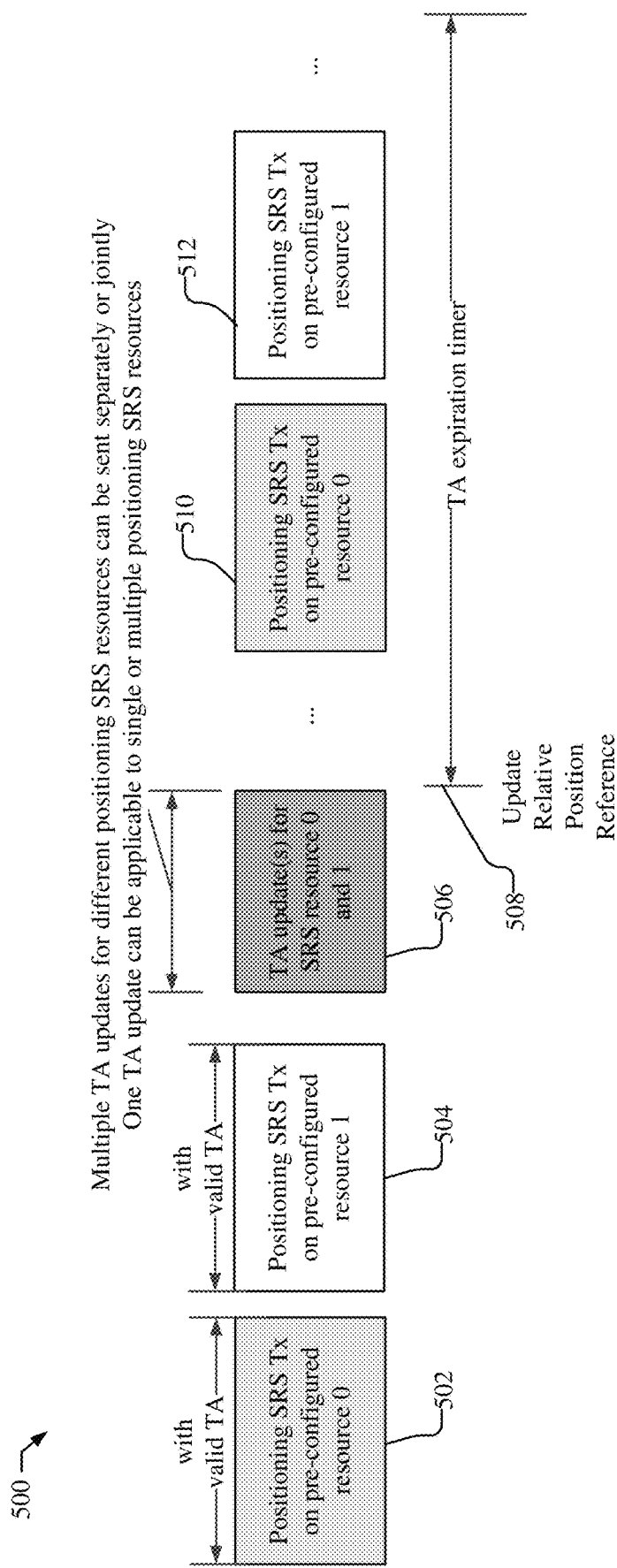
FIG. 5 illustrates an example of UE transmissions of pre-configured positioning SRS resources with potential TA adjustment while in Idle or Inactive mode.

FIG. 5 illustrates an example of UE 104 transmissions of pre-configured positioning SRS resources 500 with potential TA adjustment while in Idle or Inactive mode. As illustrated, with respective blocks 502 and 504, the UE 104 may transmit positioning SRS on pre-configured resource 0 and pre-configured resource 1 while the TA is valid. At block 506, the UE 104 may receive one or more TA updates for the SRS resource 0 and 1. Multiple TA updates may be provided in block 506 for different positioning SRS resources and may be sent separately or jointly. Moreover, one TA update may be applicable to a single or multiple positioning SRS resources, e.g., based on the base station pre-configuration.

At time 508, e.g., after receiving the TA updates, the UE 104 may reset the TA expiration timer. Additionally, at time 508 the UE 104 may update the relative position reference, e.g., the RSRP reference used for monitoring change in RSRP, or an initial position for monitoring change in relative position using dead reckoning with inertial sensors.

As illustrated with respective blocks 510 and 512, the UE 104 may continue to transmit the positioning SRS on the pre-configured resource 0 and pre-configured resource 1 based on the updated TA received at block 510, as long as the reset TA expiration timer has not expired, or a position change threshold has not been exceeded.

Additional TA updates may be received by the UE 104 before the expiration of the TA expiration timer (and prior to exceeding a position change threshold) and the UE 104 may continue to transmit the positioning SRS on the pre-configured resource 0 and pre-configured resource 1 based on the updated TAs.

If the TA expiration timer expires (or the position change threshold is exceeded) before receiving a TA update for one or more positioning SRS resources, the UE 104 may no longer transmit the positioning SRS on the invalid positioning SRS resource.

Additionally, as discussed above, the UE 104 may be pre-configured with a UL transmission spatial filter for SRS positioning transmissions that may be quickly outdated after the UE 104 transitions to Idle or Inactive mode.

In one implementation, similar to the TA expiration timer for positioning SRS discussed above, the UE 104 may be configured with a spatial filter expiration timer for transmitting positioning SRS while in Idle or Inactive mode. When the spatial filter expiration timer expires, the spatial filter obtained while the UE 104 was in a connected state may no longer be considered valid. Accordingly, once the spatial filter expiration timer expires, the UE 104 may no longer transmit on the pre-configured SRS resources for positioning. The spatial filter expiration timer, for example, may be start upon receipt of the pre-configuration for the SRS for positioning.

The length of the spatial filter expiration timer may be configurable. For example, a low mobility UE may be configured with a relatively long TA expiration timer, while a more mobile UE may have a relatively short TA expiration timer. Additionally, in some implementations, different positioning SRS resource may be configured with different spatial filter expiration timers. For example, some SRS resources may be more sensitive to spatial filter errors than other SRS resources and, thus, may require a shorter TA expiration timer. The spatial filter expiration timer may be independent from the TA expiration timer discussed above.

Additionally, in one implementation, the UE 104 may be configured with relative position change threshold for transmitting SRS for positioning while in Idle or Inactive mode. For example, the UE 104 may be configured with a change threshold for a change in relative position that may be determined e.g., using dead reckoning using inertial sensors. When a change in relative position exceeds a change threshold, the spatial filter may no longer be valid and the UE may no longer transmit SRS for positioning while in Idle or Inactive mode. Similar to the description above, the change threshold may be different for different SRS resources.

In some implementations, the UE 104 may use both a spatial filter expiration timer and a relative position change threshold based on inertial sensors. For example, the UE 104 may no longer transmit SRS for positioning on a pre-configured SRS resource if one or both of the spatial filter expiration timer or relative position change indicates the spatial filter is no longer valid.

Additionally, in one implementation, the UE 104 may receive spatial filter updates while in Idle or Inactive mode. The spatial filter updates may be received by the UE 104 in a manner similar to the TA updates discussed previously. To support spatial filter updates, however, the UE 104 may be pre-configured with UL resources for the UE 104 to sweep across multiple UL beams. In other words, the UE 104 may transmit UL signals on the pre-configured resources with multiple pre-configured UL transmission spatial filters. The base station 102 may determine a spatial filter update for the UE 104 based on the UL beam sweeping, and may provide the spatial filter update for the positioning SRS transmission in one or more resources. The spatial filter update may be provided to the UE 104 while the UE 104 is in Idle or Inactive mode, e.g., in a PDCCH, DCI, or PDSCH message or in a paging message. The base station 102 may issue multiple spatial filter updates for multiple positioning SRS resources jointly or separately in one or multiple DCI or PDSCH.

In implementations where an spatial filter expiration is used, the UE 104 may reset the spatial filter expiration timer every time the spatial filter update is received. Similarly, in implementations where the UE 104 monitors relative position change, the UE 104 may update the reference position every time the spatial filter update is received.

Figure 6:
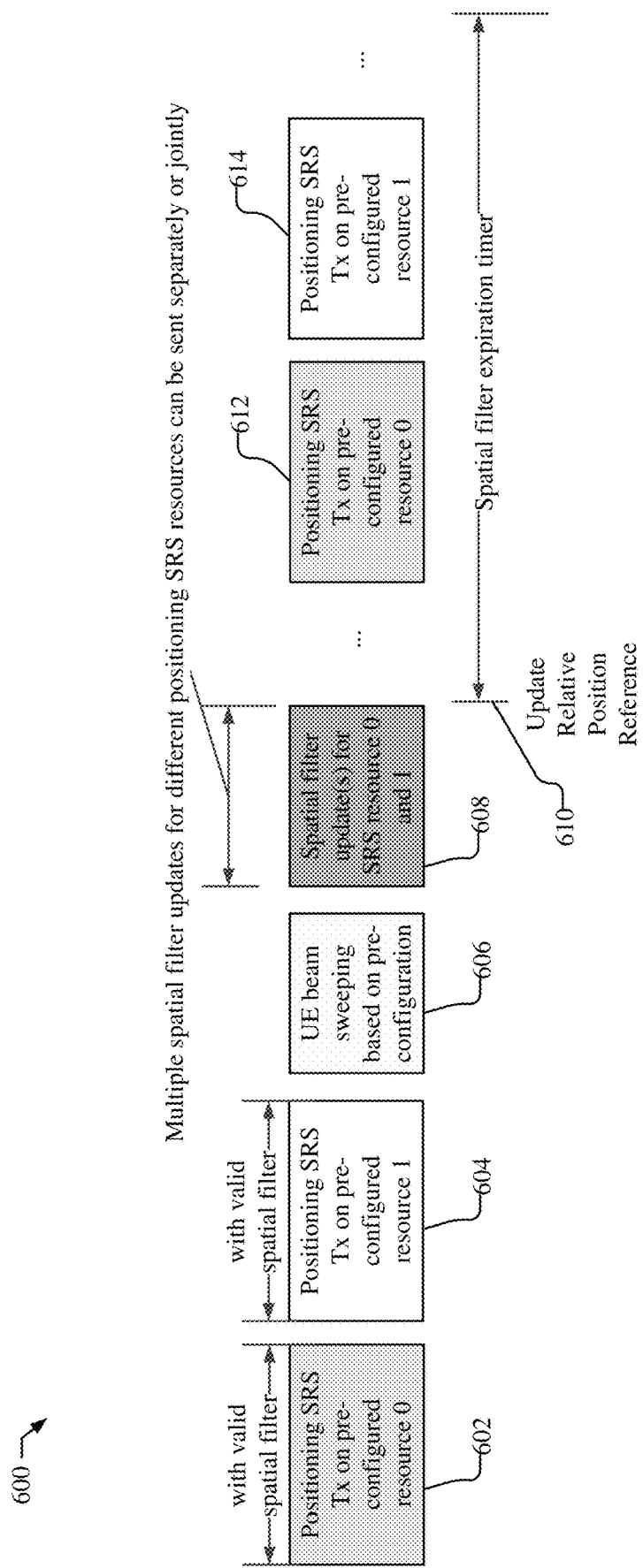
FIG. 6 illustrates an example of UE transmissions of pre-configured positioning SRS resources with potential spatial filter adjustment while in Idle or Inactive mode.

FIG. 6 illustrates an example of UE 104 transmissions of pre-configured positioning SRS resources 600 with potential spatial filter adjustment while in Idle or Inactive mode. As illustrated, with respective blocks 602 and 604, the UE 104 may transmit positioning SRS on pre-configured resource 0 and pre-configured resource 1 while the spatial filter is valid. At block 606, the UE 104 performs a beam sweep based on pre-configuration, e.g., by transmitting UL signals on the pre-configured resources with multiple pre-configured UL transmission spatial filters. The base station 102 receives the UL signals and based on the beam sweep, determines an update to the spatial filter for one or more SRS resources. At block 608, the UE 104 may receive one or more spatial filter updates for the SRS resource 0 and 1. Multiple spatial filter updates may be provided in block 608 for different positioning SRS resources and may be sent separately or jointly.

At time 610, e.g., after receiving the spatial filter updates, the UE 104 may reset the spatial filter expiration timer. Additionally, at time 610 the UE 104 may update the relative position reference used for monitoring a position change threshold using dead reckoning with inertial sensors.

As illustrated with respective blocks 612 and 614, the UE 104 may continue to transmit the positioning SRS on the pre-configured resource 0 and pre-configured resource 1 based on the updated spatial filter received at block 610, as long as the reset spatial filter expiration timer has not expired, or a position change threshold has not been exceeded. Additional spatial filter updates may be received by the UE 104 before the expiration of the spatial filter expiration timer (and prior to exceeding a position change threshold) and the UE 104 may continue to transmit the positioning SRS on the pre-configured resource 0 and pre-configured resource 1 based on the updated spatial filters.

If the spatial filter expiration timer expires (or the position change threshold is exceeded) before receiving a spatial filter update for one or more positioning SRS resources, the UE 104 may no longer transmit the positioning SRS on the invalid positioning SRS resource.

Additionally, besides updating the TA and spatial filter, in one implementation a base station may update the PRS resource configuration and SRS resource configuration for the UE 104 while the UE 104 is in Idle or Inactive mode. For example, the base station 102 may switch the UE 104 to more frequent PRS or SRS for positioning with lower latency. In some implementations, the UE 104 may be pre-configured with multiple PRS/SRS configurations, e.g., while the UE 104 is in an active RRC state. After the UE 104 is in an Idle or Inactive state, the base station 102 may change the PRS or SRS resource configuration in the UE 104 by sending a selection of the desired configuration in a signal monitored by the UE 104 while the UE 104 is the Idle or Inactive state, e.g., PDCCH, DCI, or PDSCH message or in a paging message. If the UE 104 is not provided with pre-configured PUCCH, the UE 104 does not need to provide feedback to PDSCH. In some implementations, UE may receive the DL PRS configuration or UL positioning SRS configuration update. For example, the base station 102 may want UE 104 to receive DL PRS or transmit UL positioning SRS more frequently hence to update DL PRS or UL positioning SRS configuration. The update of PRS/SRS configuration may be done separately or jointly with the TA and/or spatial filter updates and may be used with the TA and/or spatial filter updates.

Figure 7:
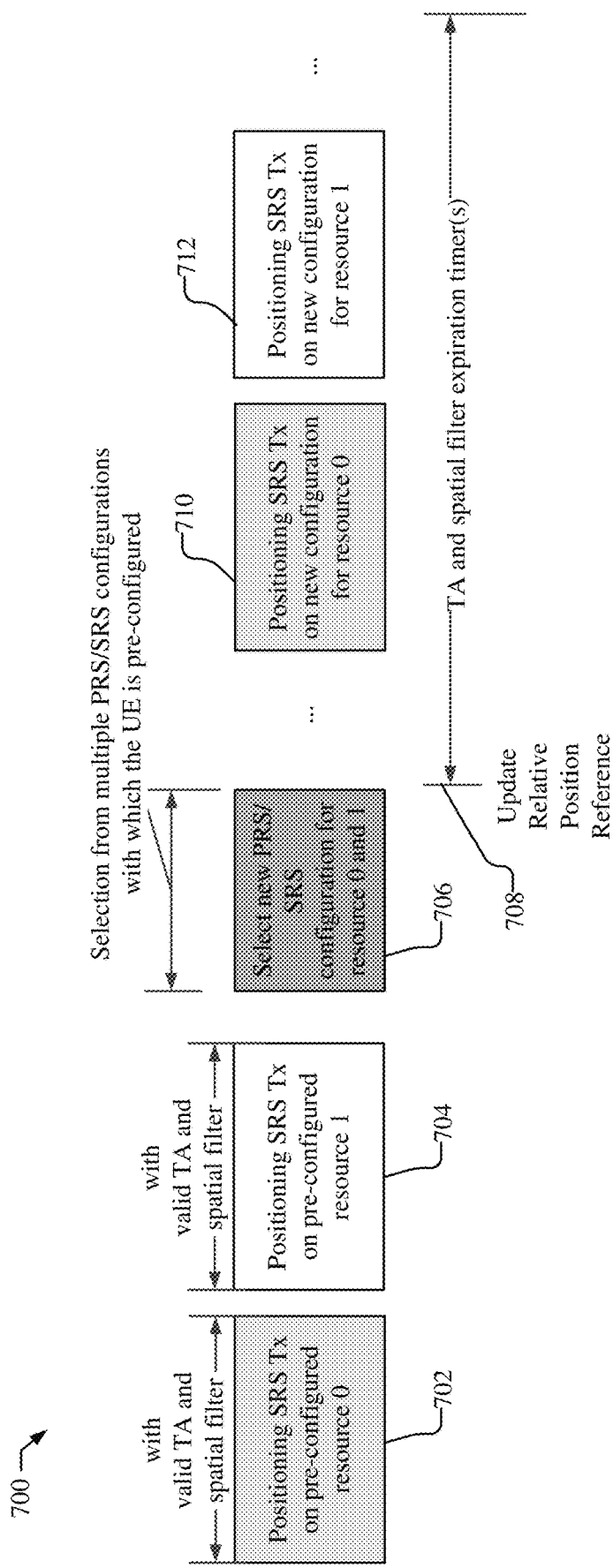
FIG. 7 illustrates an example of UE transmissions of pre-configured positioning SRS resources with an update to PRS/SRS resource configurations while in Idle or Inactive mode.

FIG. 7 illustrates an example of UE 104 transmissions of pre-configured positioning SRS resources 700 with an update to PRS/SRS resource configurations while in Idle or Inactive mode. As illustrated, with respective blocks 702 and 704, the UE 104 may transmit positioning SRS on pre-configured resource 0 and pre-configured resource 1, e.g., while the TA and spatial filter is valid. At block 706, the UE 104 may receive a selection from the base station for a new PRS or SRS resource configuration for the SRS resource 0 and 1 from multiple PRS or SRS resource configurations with which the UE 104 was pre-configured prior to entering the Idle or Inactive state. In addition to selecting a new PRS/SRS resource configuration, the base station 102 may additionally update the TA and/or spatial filter.

At time 708, assuming the TA and spatial filter were updated by the base station 102, the UE 104 may reset the TA and spatial filter expiration timer(s). Additionally, at the UE 104 may update the relative position reference for monitoring a position change threshold, e.g., using RSRP or inertial sensors.

As illustrated with respective blocks 710 and 712, the UE 104 may transmit positioning SRS based on the new configuration for resource 0 and resource 1 based on the selection of new PRS/SRS configurations received at block 706, as long as the reset TA and spatial filter expiration timer(s) has not expired, or a position change threshold has not been exceeded.

Figure 8:
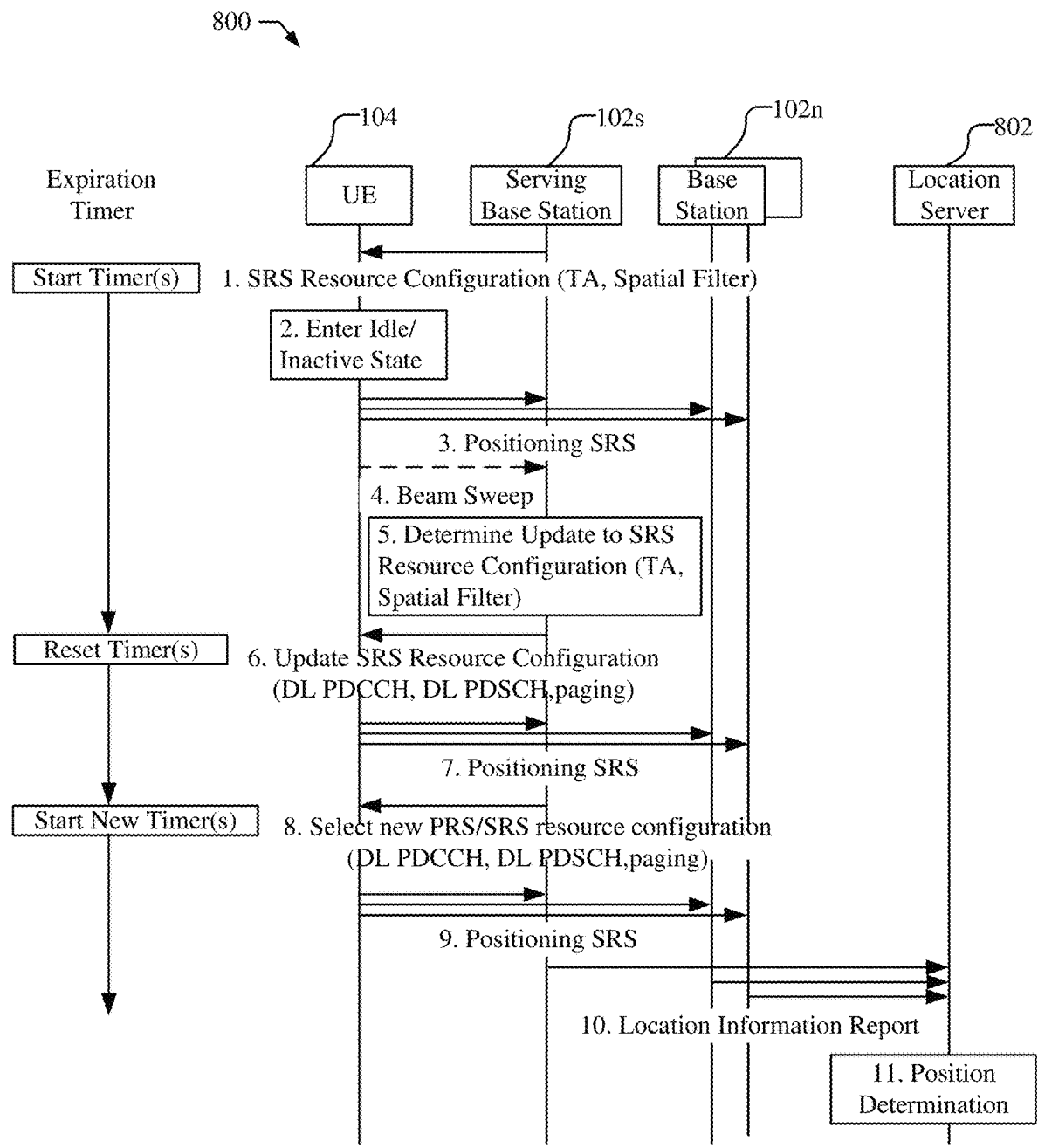
FIG. 8 shows a signaling flow that illustrates various messages sent between components of the wireless communication system in a positioning session that includes positioning SRS transmitted while the UE in Idle or Inactive mode using pre-configured TA and UL transmission spatial filters.

FIG. 8 shows a signaling flow 800 that illustrates various messages sent between components of the wireless communication system 100 depicted in FIG. 1, in a positioning session that includes positioning SRS transmitted while the UE 104 is in Idle or Inactive mode using pre-configured TA and UL transmission spatial filters, as discussed herein. Flow diagram 800 illustrates UE 104, a serving base station 102s, which may be an eNB or gNB, neighboring base stations 102n, and a location server 802, which may be, e.g., location server 172, 230a, 230b, or LMF 270. The serving base station 102s and neighboring base stations 102n may sometimes be referred to herein as base stations 102. While the flow diagram 800 is discussed, for ease of illustration, in relation to a 5G NR wireless access, signaling flows similar to FIG. 8 involving other types of high frequency networks and base stations will be readily apparent to those with ordinary skill in the art. In the signaling flow 800, it is assumed that the UE 104 and location server 802 communicate using the LPP positioning protocol, although use of NPP or a combination of LPP and NPP or other future protocol, such as NRPPa, is also possible. Further, FIG. 8 may not show all messages transmitted between entities in a positioning session, such as a capabilities request, capabilities, response, positioning request, positioning response, etc.

At stage 1, the serving base station 102s may transmit an SRS resource configuration message to the UE 104 while the UE 104 is in a connected RRC state. The SRS resource configuration message pre-configures the UE 104 with SRS resource configuration, including TA and spatial filter, for transmitting positioning SRS while in Idle or Inactive mode. The configuration message may further indicate how TA and spatial filter updates will be provided to the UE 104 while the UE 104 is in an Idle or Inactive state. There may be separate TAs and/or spatial filters associated with different positioning SRS resources and the SRS resource configuration may include separate expiration timers and/or spatial filters for the TAs associated with the different positioning SRS resources. Additionally, there may be separate TAs and/or spatial filters associated with different positioning SRS resources and for each positioning SRS resource the UE 104 may be configured with one or more position change thresholds, e.g., RSRP change or relative position change. For example, the change in the power of received signals may be based on one or more reference pathloss associated with the positioning SRS resource. Different thresholds may be used for each different positioning SRS resource and for each different reference pathloss. The UE may stop transmission of the positioning SRS while in the idle or inactive mode if the change in the power of the received signals in either or all the reference pathlosses exceeds a corresponding threshold before the UE receives the update to the TA. The UE 104 may further be pre-configured with a multiple PRS/SRS resource configurations with which the base station 102 may cause the UE 104 to switch between while the UE 104 is Idle or Inactive mode. Additionally, as illustrated, the expiration timer(s) for the TA and spatial filter for one or more SRS resources is started.

At stage 2, the UE 104 transitions from a connected RRC state to an Idle or Inactive state in which data communications between UE 104 and base station 102s are not exchanged communications, but UE 104 continues to monitor control and paging messages and may receive PRS or transmit SRS for positioning.

At stage 3, the UE 104 may transmit SRS for positioning based on the pre-configured positioning SRS resources including the TA and UL transmission spatial filter received at stage 1. The base stations 102 receive the positioning SRS and generates positioning measurements accordingly. The UE 104 may monitor the expiration timer(s) for the TA and spatial filter for one or more SRS resources and may continue to transmit SRS for positioning based on the pre-configured positioning SRS resources as long as the TA and UL transmission spatial filter remain valid, i.e., the expiration timer(s) do not expire. Additionally, the UE 104 may monitor a position change threshold(s) for the positioning SRS resources, e.g., based on changes to the power of received signals (e.g., RSRP) from one or more base stations 102 or changes in a relative position determined using dead reckoning based on inertial sensors, and may continue to transmit SRS for positioning based on the pre-configured positioning SRS resources as long as the position change threshold(s) for the positioning SRS resources is not exceeded.

At stage 4, the UE 104 may optionally perform a beam sweep based on the pre-configuration, e.g., by transmitting UL signals on the pre-configured resources with multiple pre-configured UL transmission spatial filters. The beam sweep, for example, may be performed after every positioning SRS transmission, after a set number of positioning SRS transmissions, or may be periodical or based on some other parameter.

At stage 5, the base station 102s may determine an update to the SRS resource configuration, e.g., the TA and spatial filters in particular. The base station 102s, for example, may determine an update to the TA based on positioning SRS received at stage 3 and/or the beam sweep at stage 4 and may determine an update to the spatial filter based on the beam sweep at stage 4.

At stage 6, the base station 102s may transmit an update to the SRS resource configuration, e.g., the TA and spatial filters based on the updated determined at stage 5. The updates may be transmitted, e.g., in a PDCCH, DCI, or PDSCH message or in a paging message. As illustrated, the expiration timer(s) for the TA and spatial filter may be reset for one or more SRS resources. Additionally, if the UE 104 is monitoring a position change threshold, e.g., using one or more of received power or inertial sensors, the reference RSRP or reference position may be updated.

At stage 7, the UE 104 may transmit SRS for positioning based on the pre-configured positioning SRS resources using the updated TA and UL transmission spatial filter received at stage 6. The base stations 102 receive the positioning SRS and generates positioning measurements accordingly. The UE 104 may continue to transmit the SRS for positioning using the updated TA and UL transmission spatial filter as long as the TA and UL transmission spatial filter remain valid, i.e., the expiration timer(s) do not expire and the position change threshold(s) for the positioning SRS resources is not exceeded.

At stage 8, the serving base station 102s may select a new PRS/SRS resource configuration from one of the multiple PRS/SRS resource configurations with which the UE 104 is pre-configured in stage 1. The selection of the new PRS/SRS resource configuration may be transmitted, e.g., in a PDCCH, DCI, or PDSCH message or in a paging message. The serving base station 102s may additionally provide an update to one or more of the TA. The serving base station 102s may further provide an update to the spatial filter if the UE 104 performs a beam sweep based on the pre-configuration, e.g., as illustrated in stage 4. As illustrated, new expiration timer(s) for the TA and spatial filter may be started for the new SRS configurations for the one or more SRS resources. Additionally, if the UE 104 is monitoring a position change threshold, e.g., using one or more of received power or inertial sensors, the reference RSRP or reference position may be updated.

At stage 9, the UE 104 may transmit SRS for positioning based on the new configurations for the positioning SRS resources using the updated TA and UL transmission spatial filter received at stage 6. The base stations 102 receive the positioning SRS and generates positioning measurements accordingly. The UE 104 may continue to transmit the SRS for positioning using the updated TA and UL transmission spatial filter as long as the TA and UL transmission spatial filter remain valid, i.e., the expiration timer(s) do not expire and the position change threshold(s) for the positioning SRS resources is not exceeded.

At stage 10, the base stations 102 may transmit location information to the location server 802. The location information, for example, may include any positioning measurements performed by the base stations 102 based on UL positioning SRS received from the UE 104. It should be understood that the base stations 102 may provide a location information report after each SRS transmission. Additionally, in some implementations, the neighboring base stations 102n may provide a location information report to the serving base station 102s and the serving base station 102s may provide a location information report on behalf of all base stations 102 to the location server 802.

At stage 11, the location server 802 may determine the UE location based on the positioning measurements provided in the location information received from the base stations 102 at stage 10.

In another implementation, while in Idle or Inactive mode, the UE 104 may be transmit UL reference signals that do not require configuration and update of the TA and UL transmission spatial filter. For example, the UE 104 may be pre-configured, e.g., while in an active RRC state, with a Physical Random Access Channel (PRACH) waveform that is to be transmitted as a UL reference signal for positioning while in Idle or Inactive mode. The UE 104 may be pre-configured with the UL resources to transmit a PRACH waveform to support positioning while in Idle or Inactive mode. The PRACH waveform is resistant to variation in TA, and accordingly, updates to the UL resource configuration for the PRACH waveform while the UE 104 is in Idle or Inactive mode are unnecessary. Additionally, use of an expiration timer or relative position change threshold are unnecessary.

The accuracy of positioning measurements corresponds to the bandwidth of the reference signals used for positioning signals, i.e., a larger bandwidth produces greater positioning accuracy. To increase the bandwidth of the PRACH waveform for improved positioning accuracy, the UE 104 may use a PRACH sequence that is longer than is used in a regular Random Access Channel (RACH) procedure. For example, in a regular RACH procedure, a PRACH waveform typically uses a Zadoff-Chu (ZC) sequence length ($L_{RA}$) of 139. The PRACH waveform for positioning may be configured for increased positioning accuracy and may use a ZC sequence length $L_{RA}$ that is greater than 139. For example, Release 16 has introduced PRACH waveforms for RACH procedure with ZC length $L_{RA}$ that are longer than 139, that may be used as PRACH waveforms for positioning with increased accuracy. By way of example, for 5G NR for operation in the unlicensed spectrum (NR-U), PRACH waveforms have been defined to span approximately 20 MHz with ZC length $L_{RA}$=571 for 30 kHz subcarrier spacing, or ZC length $L_{RA}$=1151 for 15 kHz subcarrier spacing, and to use ZC length $L_{RA}$=839 for NR for extended coverage. The UE 104 may be configured to reuse these pre-defined sequence lengths for a PRACH waveform for positioning, e.g., in order to increase positioning accuracy. Additionally, the PRACH waveform for positioning may be configured with longer sequences (e.g., ZC length $L_{RA}$>1151) to further improve the positioning accuracy.

Figure 9:
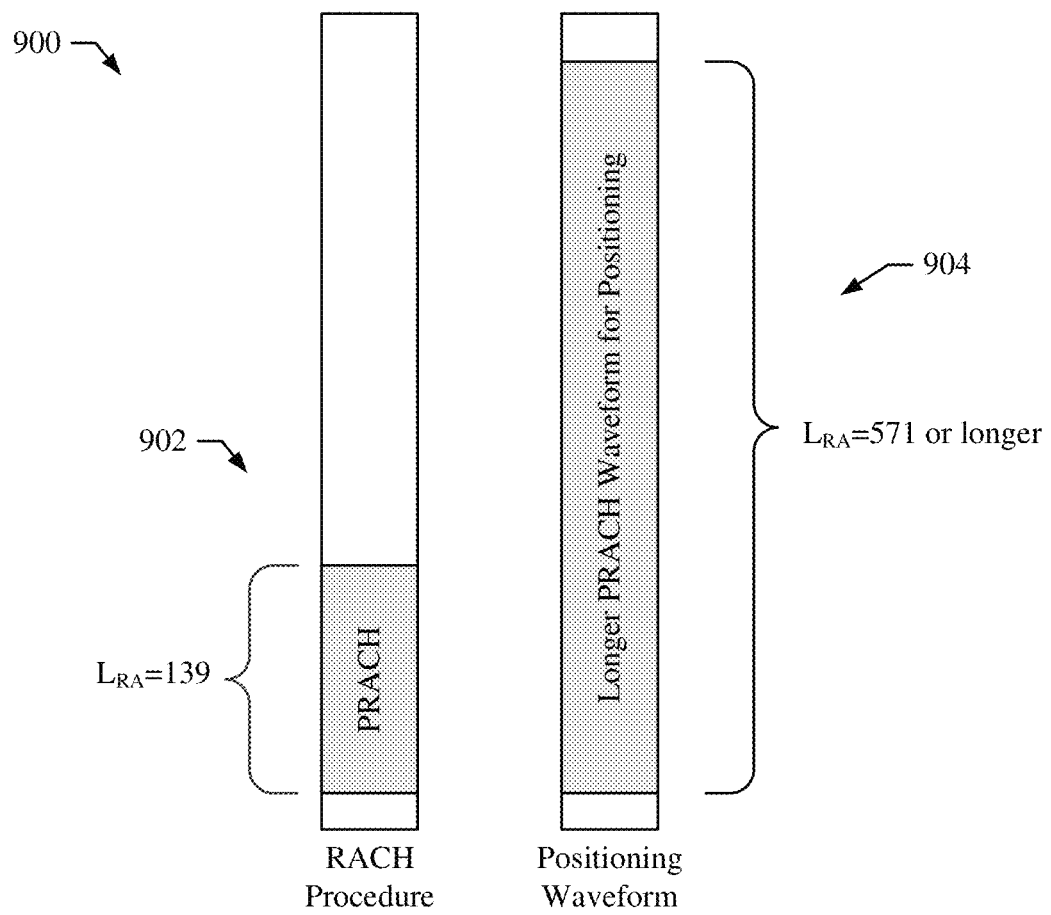
FIG. 9 is a graph illustrating PRACH waveforms.

FIG. 9, for example, is a graph 900 illustrating PRACH waveforms. A PRACH waveform 902 used for a normal RACH procedure, for example, has a ZC sequence length of $L_{RA}$=139. In comparison, a PRACH waveform 904 for positioning may use a longer sequence, e.g., a ZC sequence length of $L_{RA}$=571 or longer, which increases the bandwidth relative to PRACH waveform 902 and provides increased positioning accuracy.

In addition, the UE 104 may be configured to transmit the PRACH waveform for positioning in a RACH procedure, while in Idle or Inactive mode. For example, a pre-configured PRACH waveform may be only valid if the UE 104 stays within one cell. If the UE 104 moves from one cell to another, the pre-configuration for a PRACH waveform or positioning SRS for positioning may no longer be valid. To avoid the need to enter a connected RRC state in order to obtain a new configuration for the PRACH waveform for positioning, the UE 104 may instead transmit the PRACH waveform in a RACH procedure that is used for positioning. Thus, there is no need to pre-configure the PRACH or positioning SRS waveform while in an connected RRC state. The UE 104 may instead use the PRACH preamble in a RACH procedure for positioning while in an Idle or Inactive state. It should be understood that the RACH procedure is used by the UE 104 while in an Idle or Inactive state and is not used for initial access to a new cell. As discussed above, the PRACH waveform used in the preamble of the RACH procedure for positioning may use a longer sequence than is used in a normal RACH procedure, e.g., a ZC sequence length $L_{RA}$>139. For example, the PRACH waveform may use the defined NR-U waveforms with ZC length $L_{RA}$ of 571, 839, 1151, or a longer sequence may be used.

The UE 104 may transmit separate PRACH waveforms for positioning in separate RACH occasions with separate Random Access—Radio Network Temporary Identifiers (RA-RNTIs). The base station 102 may transmit a paging message to the UE 104, while the UE 104 is in Idle or Inactive mode, to indicate that the UE is to use a PRACH waveform in a corresponding RACH occasion for positioning.

Figure 10:
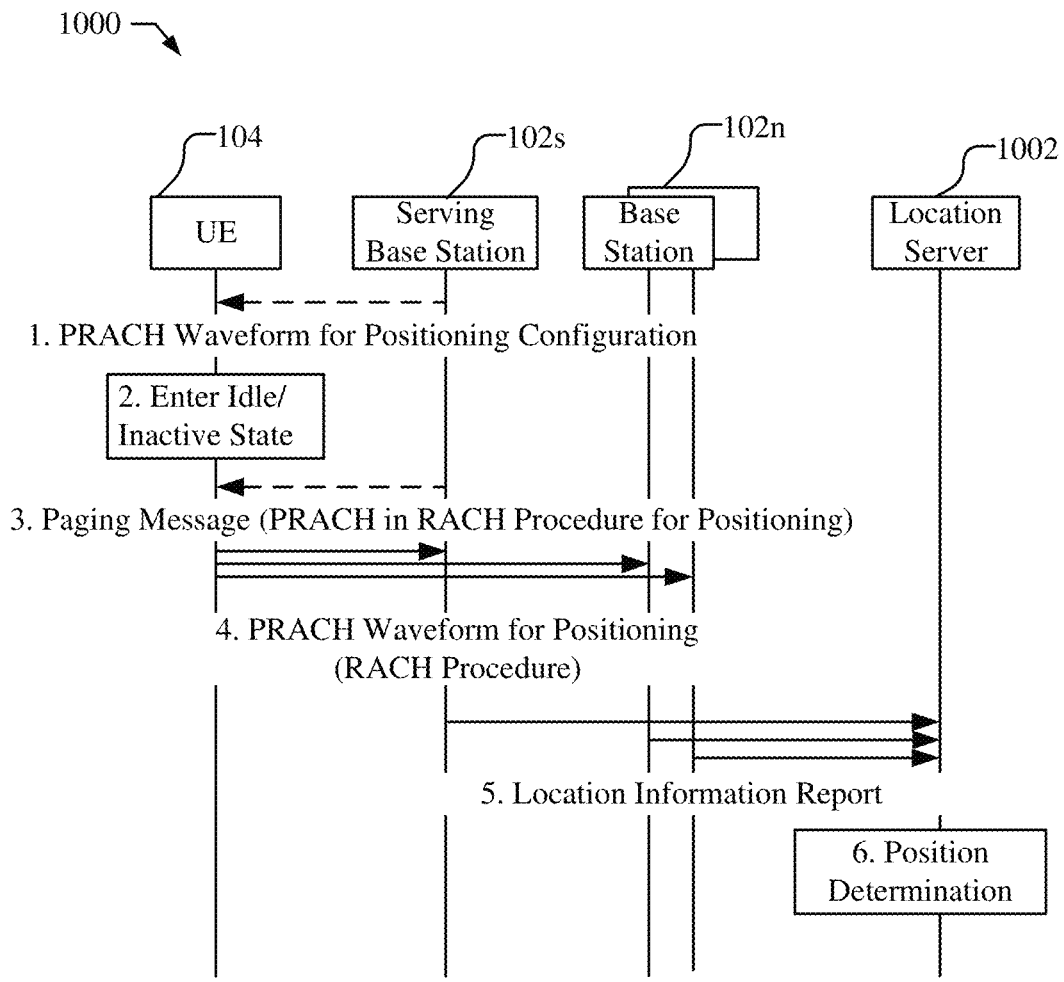
FIG. 10 shows a signaling flow that illustrates various messages sent between components of the wireless communication system in a positioning session that uses PRACH waveforms that are transmitted while the UE is in Idle or Inactive mode.

FIG. 10 shows a signaling flow 1000 that illustrates various messages sent between components of the wireless communication system 100 depicted in FIG. 1, in a positioning session that uses PRACH waveforms that are transmitted while the UE 104 is in Idle or Inactive mode, as discussed herein. Flow diagram 1000 illustrates UE 104, a serving base station 102s, which may be an eNB or gNB, neighboring base stations 102n, and a location server 1002, which may be, e.g., location server 172, 230a, 230b, or LMF 270. The serving base station 102s and neighboring base stations 102n may sometimes be referred to herein as base stations 102. While the flow diagram 1000 is discussed, for ease of illustration, in relation to a 5G NR wireless access, signaling flows similar to FIG. 10 involving other types of high frequency networks and base stations will be readily apparent to those with ordinary skill in the art. In the signaling flow 1000, it is assumed that the UE 104 and location server 1002 communicate using the LPP positioning protocol, although use of NPP or a combination of LPP and NPP or other future protocol, such as NRPPa, is also possible. Further, FIG. 10 may not show all messages transmitted between entities in a positioning session, such as a capabilities request, capabilities, response, positioning request, positioning response, etc.

At stage 1, the serving base station 102s may optionally transmit a PRACH waveform for positioning configuration message to the UE 104 while the UE 104 is in a connected RRC state. The PRACH waveform for positioning configuration message pre-configures the UE 104 with the UL resources to transmit a PRACH waveform to support positioning while the UE 104 is in an Idle or Inactive mode. The pre-configuration with the PRACH waveform in stage 1 is not necessary if the PRACH waveform is transmitted by the UE 104 in a RACH procedure for positioning.

At stage 2, the UE 104 transitions from a connected RRC state to an Idle or Inactive state in which data communications between UE 104 and base station 102s are not exchanged communications, but UE 104 continues to monitor control and paging messages and may transmit SRS for positioning.

At stage 3, the base station 102s may optionally send a paging message to the UE 104 indicating that the UE 104 is to use a PRACH waveform in a RACH procedure for positioning, e.g., if the UE 104 is not pre-configured to transmit the PRACH waveform in stage 1.

At stage 4, the UE 104 may transmit a PRACH waveform for positioning to the base stations 102 while the UE 104 is in the Idle or Inactive state. The base stations 102 may generate positioning measurements based on the received PRACH waveform for positioning. The PRACH waveform may be based on the pre-configuration received during stage 1. In another implementation, the PRACH waveform may be transmitted as the preamble of a RACH procedure for positioning, e.g., in response to the paging message at stage 3 if used. Separate PRACH waveforms may be transmitted for separate RACH occasions with separate Random Access—Radio Network Temporary Identifiers (RA-RNTIs). The PRACH waveform may be configured for positioning accuracy by including a ZC sequence length $L_{RA}$ that is greater than the length used for a regular RACH procedure, e.g., the ZC sequence length $L_{RA}$ may be greater than 139, such as 571, 839, 1151, or greater.

At stage 5, the base stations 102 may transmit location information to the location server 1002. The location information, for example, may include any positioning measurements performed by the base stations 102 based on PRACH waveform for positioning received from the UE 104. It should be understood that in some implementations, the neighboring base stations 102n may provide a location information report to the serving base station 102s and the serving base station 102s may provide a location information report on behalf of all base stations 102 to the location server 1002.

At stage 6, the location server 1002 may determine the UE location based on the positioning measurements provided in the location information received from the base stations 102 at stage 5.

Figure 11:
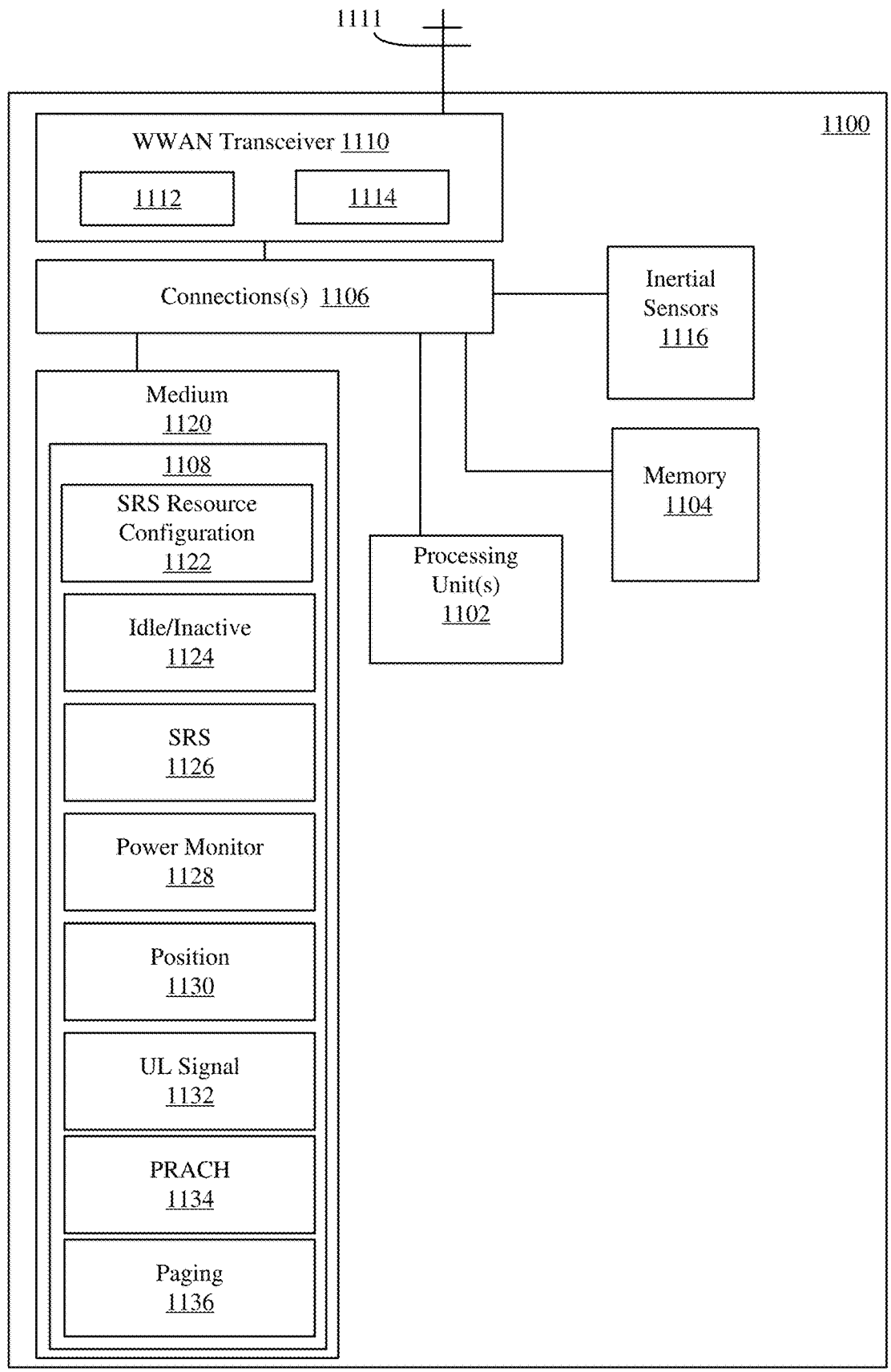
FIG. 11 shows a schematic block diagram illustrating certain exemplary features of a UE enabled to support positioning of a UE using reference signals for positioning that are transmitted while in Idle or Inactive mode.

FIG. 11 shows a schematic block diagram illustrating certain exemplary features of a UE 1100, e.g., which may be UE 104 shown in FIG. 1, enabled to support positioning of a UE using reference signals for positioning that are transmitted while in Idle or Inactive mode, such as SRS for positioning or PRACH waveforms for positioning, according to the disclosure herein. The UE 1100 may be configured to perform the signal flows 800 and 1000 shown in FIGS. 8 and 10, respectively, and the processes 1300 and 1500 shown in FIGS. 13 and 15, respectively, along with associated algorithms described herein. UE 1100 may, for example, include one or more processors 1102, memory 1104, an external interface such as a wireless transceiver 1110 (e.g., wireless network interface), which may be operatively coupled with one or more connections 1106 (e.g., buses, lines, fibers, links, etc.) to non-transitory computer readable medium 1120 and memory 1104. The UE 1100 may further include inertial sensors 1116, such a accelerometers or gyroscopes, that may be used for determining a relative position or change in relative position based on dead reckoning. The UE 1100 may further include additional items, which are not shown, such as a clock that may be used to monitor expiration timers, a user interface that may include e.g., a display, a keypad or other input device, such as virtual keypad on the display, through which a user may interface with the UE, or a satellite positioning system receiver. In certain example implementations, all or part of UE 1100 may take the form of a chipset, and/or the like. Wireless transceiver 1110 may, for example, include a transmitter 1112 enabled to transmit one or more signals over one or more types of wireless communication networks and a receiver 1114 to receive one or more signals transmitted over the one or more types of wireless communication networks.

In some embodiments, UE 1100 may include antenna 1111, which may be internal or external. UE antenna 1111 may be used to transmit and/or receive signals processed by wireless transceiver 1110. In some embodiments, UE antenna 1111 may be coupled to wireless transceiver 1110. In some embodiments, measurements of signals received (transmitted) by UE 1100 may be performed at the point of connection of the UE antenna 1111 and wireless transceiver 1110. For example, the measurement point of reference for received (transmitted) RF signal measurements may be an input (output) terminal of the receiver 1114 (transmitter 1112) and an output (input) terminal of the UE antenna 1111. In a UE 1100 with multiple UE antennas 1111 or antenna arrays, the antenna connector may be viewed as a virtual point representing the aggregate output (input) of multiple UE antennas. UE 1100 may receive signals, e.g., for SRS resource configuration or UL resource configuration to transmit a PRACH waveform, and transmit SRS or PRACH waveforms for positioning while in Idle or Inactive mode.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of UE 1100. The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. The medium 1120 and/or memory 1104 may include one or more components or modules that may be implemented by the one or more processors 1102 to perform the methodologies described herein. While the components or modules are illustrated as program code 1108 in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in UE 1100 is merely exemplary, and as such the functionality of the modules and/or data structures may be combined, separated, and/or be structured in different ways depending upon the implementation of the UE 1100.

The medium 1120 and/or memory 1104 may include an SRS resource configuration module 1122 that when implemented by the one or more processors 1102 configures the one or more processors 1102 to receive from a serving base station, via the wireless transceiver 1110, the SRS resource configuration for transmitting positioning SRS. The SRS resource configuration, for example, may include at least one of TA and UL transmission spatial filter. The one or more processors 1102 may be further configured to the receive updates to the TA and/or the UL transmission spatial filter while in an idle or inactive mode. The updates, for example, may be received in a single or multiple DL PDSCH messages, DL PDCCH messages, or paging messages and may be valid for one or more positioning SRS resources. Further, separate updates may be received for each positioning SRS resource. The SRS resource configuration, for example, may be one or more expiration timers for the TA and/or the UL transmission spatial filter, e.g., where the processor 1102 is configured to stop transmission of the positioning SRS while in the idle or inactive mode if the at least one expiration timer expires before the UE receives the update to the TA and/or the UL transmission spatial filter. For example, the TA may include separate TAs associated with different positioning SRS resources and the SRS resource configuration may include separate expiration timers for the TAs associated with the different positioning SRS resources. The UL transmission spatial filter, for example, may include separate UL transmission spatial filters associated with different positioning SRS resources and the SRS resource configuration may include separate expiration timers for the UL transmission spatial filters associated with the different positioning SRS resources. The update to the at least one of the TA and the UL transmission spatial filter may reset the expiration timer for the TA and/or the UL transmission spatial filter.

The medium 1120 and/or memory 1104 may include an idle/inactive module 1124 that when implemented by the one or more processors 1102 configures the one or more processors 1102 to enter an idle or inactive mode.

The medium 1120 and/or memory 1104 may include an SRS module 1126 that when implemented by the one or more processors 1102 configures the one or more processors 1102 to transmit, via the wireless transceiver 1110, the positioning SRS using the TA and/or UL transmission spatial filter while in the idle or inactive mode. The one or more processors 1102 is configured to transmit, via the wireless transceiver 1110, positioning SRS using the update to the TA and the UL transmission spatial filter while in the idle or inactive mode. The one or more processors 1102 may be configured to stop transmission of the positioning SRS while in the idle or inactive mode if the at least one expiration timer expires before the UE receives the update to the TA and/or the UL transmission spatial filter.

The medium 1120 and/or memory 1104 may include a power monitor module 1128 that when implemented by the one or more processors 1102 configures the one or more processors 1102 to monitor the power of signals, such as RSRP, received from one or more base stations while the UE is in an idle or inactive mode. The one or more processors 1102 may be configured to determine when a change in the power of received signals exceeds a predetermined threshold and may stop transmission of the positioning SRS while in the idle or inactive mode if the change in the power of the received signals exceeds the threshold before the UE receives the update to the TA. The one or more processors 1102 may be configured to update a reference power when the UE receives the update to the TA for determining when the change in the power of the received signals exceeds the threshold. For example, the separate TAs may be associated with different positioning SRS resources and the at least one processor 1102 may be configured to change the reference power of the received signals for each positioning SRS resource based on a first reference pathloss associated with the positioning SRS resource. Different thresholds may be used for each different positioning SRS resource. In another example, the one or more processors 1102 may be configured to change the reference power of the received signals for ach positioning SRS resource based on a second reference pathloss, wherein corresponding thresholds are used for each reference pathloss. The one or more processors 1102 may be configured to stop transmission of the positioning SRS while in the idle or inactive mode if the change in the power of the received signals in either or both of the first reference pathloss or the second reference pathloss exceeds a corresponding threshold before the UE receives the update to the TA.

The medium 1120 and/or memory 1104 may include a position module 1130 that when implemented by the one or more processors 1102 configures the one or more processors 1102 to monitor a relative position based on inertial measurements, e.g., from inertial sensors 1116, while the UE is in the idle or inactive mode. The one or more processors 1102 may be configured to determine when a change in the relative position exceeds a predetermined threshold and stop transmission of the positioning SRS while in the idle or inactive mode if the change in the relative position exceeds the threshold before the UE receives the update to the TA.

The medium 1120 and/or memory 1104 may include a UL signal module 1132 that when implemented by the one or more processors 1102 configures the one or more processors 1102 to transmit UL signals, via the wireless transceiver 1110, on pre-configured resources with multiple pre-configured UL transmission spatial filters. The update to the UL transmission spatial filter, for example, may be received from the serving base station in response to the transmitted UL signals on the pre-configured resources with the multiple pre-configured UL transmission spatial filters.

The medium 1120 and/or memory 1104 may include a PRACH module 1134 that when implemented by the one or more processors 1102 configures the one or more processors 1102 to transmit, via the wireless transceiver 1110, a PRACH for UL positioning waveform while the UE is in the idle or inactive mode. The one or more processors 1102 may be configured to receive, via the wireless transceiver 1110, a configuration for the PRACH for UL positioning waveform from a serving base station before entering the idle or inactive mode. The one or more processors 1102, for example, may configure the PRACH for UL positioning waveform for positioning accuracy by including a Zadoff-Chu (ZC) sequence length (LRA) greater than a length used for a regular random access waveform. For example, the ZC sequence length (LRA) of the regular random access waveform is 139. In some implementation, the ZC sequence length (LRA) may be 571 or 839 or 1151, or greater than 1151. For example, the one or more processors 1102 may be configured to transmit the PRACH for UL positioning waveform in a RACH procedure for positioning. The one or more processors 1102 may be configured to transmit separate PRACH for UL positioning waveforms corresponding to separate RACH occasions with separate RA-RNTIs.

The medium 1120 and/or memory 1104 may include a paging module 1136 that when implemented by the one or more processors 1102 configures the one or more processors 1102 to receive, via the wireless transceiver 1110, a paging message from a serving base station indicating that the UE is to transmit the PRACH for UL positioning waveform in the RACH procedure for positioning.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support positioning of the UE, in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a wireless transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
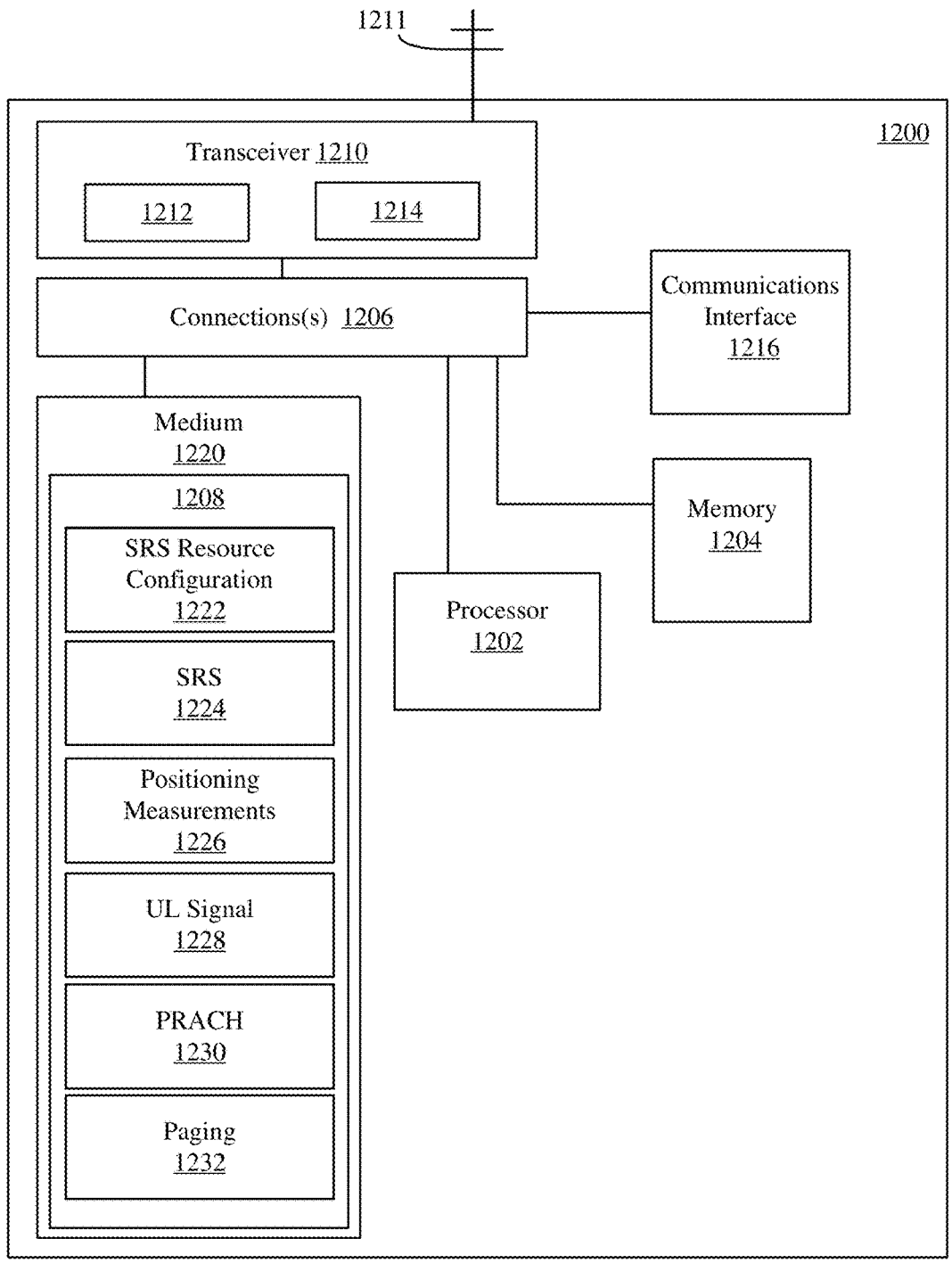
FIG. 12 shows a schematic block diagram illustrating certain exemplary features of a base station enabled to support positioning of a UE using reference signals for positioning that are transmitted while in Idle or Inactive mode.

FIG. 12 shows a schematic block diagram illustrating certain exemplary features of a base station 1200 in a wireless network enabled to support positioning of a UE using reference signals for positioning that are transmitted while the UE is in Idle or Inactive mode, such as SRS for positioning or PRACH waveforms for positioning, according to the disclosure herein. The base station 1200, for example, may be an eNB or gNB. The base station 1200 may be configured to perform the signal flows 800 and 1000 shown in FIGS. 8 and 10, respectively, and the processes 1400 and 1600 shown in FIGS. 14 and 16, respectively, along with associated algorithms described herein. The base station 1200 may, for example, include one or more processors 1202, memory 1204, and an external interface, which may include a wireless transceiver 1210 (e.g., wireless network interface), and a communications interface 1216 (e.g., wireline or wireless network interface to other network entities and/or the core network), which may be operatively coupled with one or more connections 1206 (e.g., buses, lines, fibers, links, etc.) to non-transitory computer readable medium 1220 and memory 1204. In some implementations, the base station 1200 may further include additional items, which are not shown. In certain example implementations, all or part of base station 1200 may take the form of a chipset, and/or the like. Wireless transceiver 1210, if present, may, for example, include a transmitter 1212 enabled to transmit one or more signals over one or more types of wireless communication networks and a receiver 1214 to receive one or more signals transmitted over the one or more types of wireless communication networks. The communications interface 1216 may be a wired or wireless interface capable of connecting to other base stations, e.g., in the RAN or network entities, such as a location server 172 shown in FIG. 1.

In some embodiments, base station 1200 may include antenna 1211, which may be internal or external. Antenna 1211 may be used to transmit and/or receive signals processed by wireless transceiver 1210. In some embodiments, antenna 1211 may be coupled to wireless transceiver 1210.

In some embodiments, measurements of signals received (transmitted) by base station 1200 may be performed at the point of connection of the antenna 1211 and wireless transceiver 1210. For example, the measurement point of reference for received (transmitted) RF signal measurements may be an input (output) terminal of the receiver 1214 (transmitter 1212) and an output (input) terminal of the antenna 1211. In a base station 1200 with multiple antennas 1211 or antenna arrays, the antenna connector may be viewed as a virtual point representing the aggregate output (input) of multiple antennas. In some embodiments, base station 1200 may transmit signals, e.g., for SRS resource configuration or UL resource configuration for a PRACH waveform, and receive SRS or PRACH waveforms for positioning that are transmitted by the UE while in Idle or Inactive mode.

The one or more processors 1202 may be implemented using a combination of hardware, firmware, and software. For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of base station 1200. The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. The medium 1220 and/or memory 1204 may include one or more components or modules that may be implemented by the one or more processors 1202 to perform the methodologies described herein. While the components or modules are illustrated as program code in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in base station 1200 is merely exemplary, and as such the functionality of the modules and/or data structures may be combined, separated, and/or be structured in different ways depending upon the implementation of the base station 1200.

The medium 1220 and/or memory 1204 may include an SRS resource configuration module 1222 that when implemented by the one or more processors 1202 configures the one or more processors 1202 to transmit to a UE, via the wireless transceiver 1210, the SRS resource configuration for transmitting positioning SRS while UE is in an idle or inactive mode. The SRS resource configuration may be transmitted to the UE while the UE is in an RRC connected state. The SRS resource configuration, for example, may include at least one of TA and UL transmission spatial filter. The one or more processors 1202 may be configured to transmit to the UE, via the wireless transceiver 1210, an update to the TA and/or the UL transmission spatial filter while the UE is in the idle or inactive mode. The update to the TA and/or the UL transmission spatial filter may be transmitted in a single or multiple DL PDSCH messages, DL PDCCH messages, or paging messages and may be valid for one or more positioning SRS resources. The SRS resource configuration, for example, may be one or more expiration timers for the TA and/or the UL transmission spatial filter, e.g., where the UE may stop transmission of the positioning SRS while in the idle or inactive mode if the at least one expiration timer expires before the UE receives the update to the TA and/or the UL transmission spatial filter. For example, the TA may include separate TAs associated with different positioning SRS resources and the SRS resource configuration may include separate expiration timers for the TAs associated with the different positioning SRS resources. The UL transmission spatial filter, for example, may include separate UL transmission spatial filters associated with different positioning SRS resources and the SRS resource configuration may include separate expiration timers for the UL transmission spatial filters associated with the different positioning SRS resources. The update to the at least one of the TA and the UL transmission spatial filter may reset the expiration timer for the TA and/or the UL transmission spatial filter.

The medium 1220 and/or memory 1204 may include an SRS module 1224 that when implemented by the one or more processors 1202 configures the one or more processors 1202 to receive, via the wireless transceiver 1210, the positioning SRS transmitted from the UE using the TA and/or the UL transmission spatial filter while the UE is in the idle or inactive mode. The one or more processors 1202 may be additionally configured to receive the positioning SRS transmitted from the UE using the update to the TA and/or the UL transmission spatial filter while the UE is in the idle or inactive mode.

The medium 1220 and/or memory 1204 may include a position module 1226 that when implemented by the one or more processors 1202 configures the one or more processors 1202 to generates positioning measurements using the positioning SRS transmitted from the UE using the TA and/or the UL transmission spatial filter and to generate positioning measurements using the positioning SRS transmitted from the UE using the update to the TA and/or the UL transmission spatial filter. For example, positioning measurements such as UL-TDOA and UL-AoA, multi-RTT, or other positioning measurements may be generated. The one or more processors 1202 may be configured to generate positioning measurements for the UE using PRACH for UL positioning received from the UE, via the wireless transceiver 1210, e.g., in a RACH procedure for positioning.

The medium 1220 and/or memory 1204 may include a UL signal module 1228 that when implemented by the one or more processors 1202 configures the one or more processors 1202 to receive from the UE, via the wireless transceiver 1210, UL signals on pre-configured resources with multiple pre-configured UL transmission spatial filters. The one or more processors 1202 may be configured to generate the update to the UL transmission spatial filter based on the received UL signals on the pre-configured resources with the multiple pre-configured UL transmission spatial filters.

The medium 1220 and/or memory 1204 may include a PRACH module 1230 that when implemented by the one or more processors 1202 configures the one or more processors 1202 to receive, via the wireless transceiver 1210, a PRACH for UL positioning waveform transmitted by the UE while the UE is in an idle or inactive mode. The PRACH for UL positioning waveform, for example, may be configured for positioning accuracy by including a Zadoff-Chu (ZC) sequence length (LRA) greater than a length used for a regular random access waveform enter an idle or inactive mode, which may be 139. In some implementation, the ZC sequence length (LRA) may be 571 or 839 or 1151, or greater than 1151. The one or more processors may be configured to transmit, via the wireless transceiver 1210, a configuration for the PRACH for UL positioning waveform to the UE before the UE enters the idle or inactive mode. The one or more processors 1202 may be configured to receive the PRACH for UL positioning waveform, for example, in a RACH procedure for positioning, and separate PRACH for UL positioning waveforms corresponding to separate RACH occasions may be received with separate RA-RNTIs.

The medium 1220 and/or memory 1204 may include a paging module 1232 that when implemented by the one or more processors 1202 configures the one or more processors 1202 to transmit, via the wireless transceiver 1210, a paging message to the UE while the UE is in the idle or inactive mode indicating that the UE is to transmit the PRACH for UL positioning waveform in the RACH procedure for positioning.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program 1208. For example, the non-transitory computer readable medium including program code 1208 stored thereon may include program code 1208 to support positioning of a UE, in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include a wireless transceiver 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable code 1208 stored thereon, which if executed by one or more processors 1202 may be operatively enabled to perform all or portions of the example operations as described herein. Computer readable medium 1220 may be a part of memory 1204.

Figure 13:
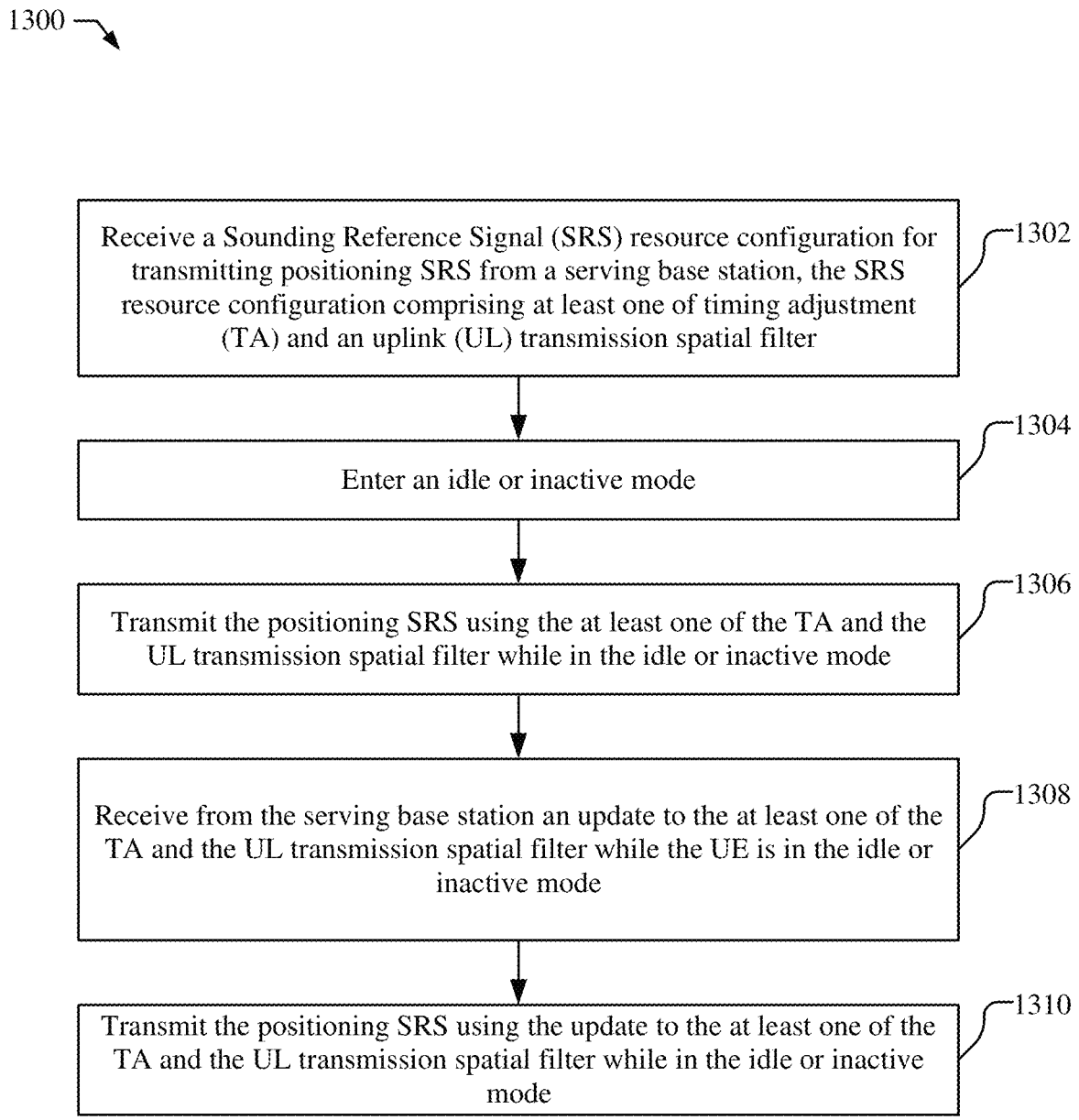
FIG. 13 shows a flowchart for an exemplary method for supporting position determination of a UE performed by the UE in a wireless network.

FIG. 13 shows a flowchart for an exemplary method 1300 for supporting position determination of a UE, such as UE 104, performed by the UE in a wireless network.

At block 1302, the UE receives a Sounding Reference Signal (SRS) resource configuration for transmitting positioning SRS from a serving base station. The SRS resource configuration may comprise at least one of timing adjustment (TA) and an uplink (UL) transmission spatial filter, e.g., as discussed at stage 1 of FIG. 8. The SRS resource configuration may be received while the UE is in an radio resource control (RRC) connected state. A means for receiving a Sounding Reference Signal (SRS) resource configuration for transmitting positioning SRS from a serving base station may be, e.g., the wireless transceiver 1110 and one or more processors 1102 with dedicated hardware or implementing executable code or software instructions in memory 1104 and/or medium 1120 such as the SRS resource configuration module 1122 in UE 1100 in FIG. 11.

At block 1304, the UE may enter an idle or inactive mode, e.g., as discussed at stage 2 of FIG. 8. A means for entering an idle or inactive mode may be, e.g., the one or more processors 1102 with dedicated hardware or implementing executable code or software instructions in memory 1104 and/or medium 1120 such as the idle/inactive module 1124 in UE 1100 in FIG. 11.

At block 1306, the UE transmits the positioning SRS using the at least one of the TA and the UL transmission spatial filter while in the idle or inactive mode, e.g., as discussed at stage 3 of FIG. 8. A means for transmitting the positioning SRS using the at least one of the TA and the UL transmission spatial filter while in the idle or inactive mode may be, e.g., the wireless transceiver 1110 and one or more processors 1102 with dedicated hardware or implementing executable code or software instructions in memory 1104 and/or medium 1120 such as the SRS module 1126 in UE 1100 in FIG. 11.

At block 1308, the UE receives from the serving base station an update to the at least one of the TA and the UL transmission spatial filter while the UE is in the idle or inactive mode, e.g., as discussed at stages 6 and 8 of FIG. 8. The updates to the at least one of the TA and the UL transmission spatial filter may be received in one of a downlink (DL) Physical Data Shared Channel (PDSCH), DL Physical Data Control Channel (PDCCH) transmitted from the serving base station, or a paging message. The update may be valid for one or more positioning SRS resources. Further, separate updates may be received for each positioning SRS resource. For example, the separate updates may be received in a single or multiple DL PDSCH, DL PDCCH, or the paging messages. A means for receiving from the serving base station an update to the at least one of the TA and the UL transmission spatial filter while the UE is in the idle or inactive mode may be, e.g., the wireless transceiver 1110 and one or more processors 1102 with dedicated hardware or implementing executable code or software instructions in memory 1104 and/or medium 1120 such as the SRS resource configuration module 1122 in UE 1100 in FIG. 11.

At block 1310, the UE transmits the positioning SRS using the update to the at least one of the TA and the UL transmission spatial filter while in the idle or inactive mode, e.g., as discussed at stages 7 and 9 of FIG. 8. A means for transmitting the positioning SRS using the update to the at least one of the TA and the UL transmission spatial filter while in the idle or inactive mode may be, e.g., the wireless transceiver 1110 and one or more processors 1102 with dedicated hardware or implementing executable code or software instructions in memory 1104 and/or medium 1120 such as the SRS module 1126 in UE 1100 in FIG. 11.

In one implementation, the SRS resource configuration may be at least one expiration timer for the at least one of the TA and the UL transmission spatial filter. The UE may stop transmission of the positioning SRS while in the idle or inactive mode if the at least one expiration timer expires before the UE receives the update to the at least one of the TA and the UL transmission spatial filter, e.g., as discussed at stage 3 of FIG. 8. The TA may include separate TAs associated with different positioning SRS resources and the SRS resource configuration may include separate expiration timers for the TAs associated with the different positioning SRS resources, e.g., as discussed at stage 1 of FIG. 8. The UL transmission spatial filter may include separate UL transmission spatial filters associated with different positioning SRS resources and the SRS resource configuration may include separate expiration timers for the UL transmission spatial filters associated with the different positioning SRS resources, e.g., as discussed at stage 1 of FIG. 8. The update to the at least one of the TA and the UL transmission spatial filter may reset the at least one expiration timer for the at least one of the TA and the UL transmission spatial filter, e.g., as discussed at stage 6 of FIG. 8.

In one implementation, the UE may further monitor power of received signals from one or more base stations while the UE is in the idle or inactive mode, such as RSRP, e.g., as discussed at stage 3 of FIG. 8. Additionally, the UE may determine when a change in the power of received signals exceeds a threshold. The UE may stop transmission of the positioning SRS while in the idle or inactive mode if the change in the power of the received signals exceeds the threshold before the UE receives the update to the TA, e.g., as discussed at stage 3 of FIG. 8. A means for monitoring power of received signals from one or more base stations while the UE is in the idle or inactive mode may be, e.g., the wireless transceiver 1110 and one or more processors 1102 with dedicated hardware or implementing executable code or software instructions in memory 1104 and/or medium 1120 such as the power monitor module 1128 in UE 1100 in FIG. 11. A means for determining when a change in the power of received signals exceeds a threshold may be, e.g., the one or more processors 1102 with dedicated hardware or implementing executable code or software instructions in memory 1104 and/or medium 1120 such as the power monitor module 1128 in UE 1100 in FIG. 11. The UE may update a reference power for determining when the change in the power of the received signals exceeds the threshold when the UE receives the update to the TA. The TA may include separate TAs associated with different positioning SRS resources and for each positioning SRS resource the change in the power of the received signals may be based on a first reference pathloss associated with the positioning SRS resource, e.g., as discussed at stage 1 of FIG. 8. Different thresholds may be used for each different positioning SRS resource. In another example, for each positioning SRS resource, the change in the power of the received signals is further based on a second reference pathloss, wherein corresponding thresholds are used for each reference pathloss. The UE may stop transmission of the positioning SRS while in the idle or inactive mode if the change in the power of the received signals in either or both of the first reference pathloss or the second reference pathloss exceeds a corresponding threshold before the UE receives the update to the TA.

In one implementation, the UE may monitor a relative position based on inertial measurements while the UE is in the idle or inactive mode, e.g., as discussed at stage 3 of FIG. 8. The UE may further determine when a change in the relative position exceeds a threshold. The UE may stop transmission of the positioning SRS while in the idle or inactive mode if the change in the relative position exceeds the threshold before the UE receives the update to the TA, e.g., as discussed at stage 3 of FIG. 8. A means for monitoring a relative position of the UE based on inertial measurements while the UE is in the idle or inactive mode may be, e.g., the inertial sensors 1116 and one or more processors 1102 with dedicated hardware or implementing executable code or software instructions in memory 1104 and/or medium 1120 such as the position module 1130 in UE 1100 in FIG. 11. A means for determining when a change in the relative position exceeds a threshold may be, e.g., the wireless transceiver 1110 and one or more processors 1102 with dedicated hardware or implementing executable code or software instructions in memory 1104 and/or medium 1120 such as the position module 1130 in UE 1100 in FIG. 11.

In one implementation, the UE may transmit UL signals on pre-configured resources with multiple pre-configured UL transmission spatial filters, wherein the update to the UL transmission spatial filter is received from the serving base station is received in response to the transmitted UL signals on the pre-configured resources with the multiple pre-configured UL transmission spatial filters. A means for transmitting UL signals on pre-configured resources with multiple pre-configured UL transmission spatial filters may be, e.g., the wireless transceiver 1110 and one or more processors 1102 with dedicated hardware or implementing executable code or software instructions in memory 1104 and/or medium 1120 such as the UL signal module 1132 in UE 1100 in FIG. 11.

In one implementation, the UE may receive multiple SRS resource configurations and transmit positioning SRS using a first PRS resource configuration from the multiple SRS resource configurations, e.g., as discussed at stage 1 of FIG. 8. The UE may further receive an update to the SRS resource configuration by receiving a selection of a second SRS resource configuration from the multiple SRS resource configurations, e.g. as discussed at stage 8 of FIG. 8. The UE may then transmit the positioning SRS using the second SRS resource configuration, e.g., as discussed at stage 9 of FIG. 8. The selection of the second SRS resource configuration may be received with the update to the at least one of the TA and the UL transmission spatial filter, e.g., as discussed at stage 8 of FIG. 8. The selection of the second SRS resource configuration may be received in one of a downlink (DL) Physical Data Shared Channel (PDSCH), DL Physical Data Control Channel (PDCCH) transmitted or a paging message, as discussed at stage 8 of FIG. 9.

Figure 14:
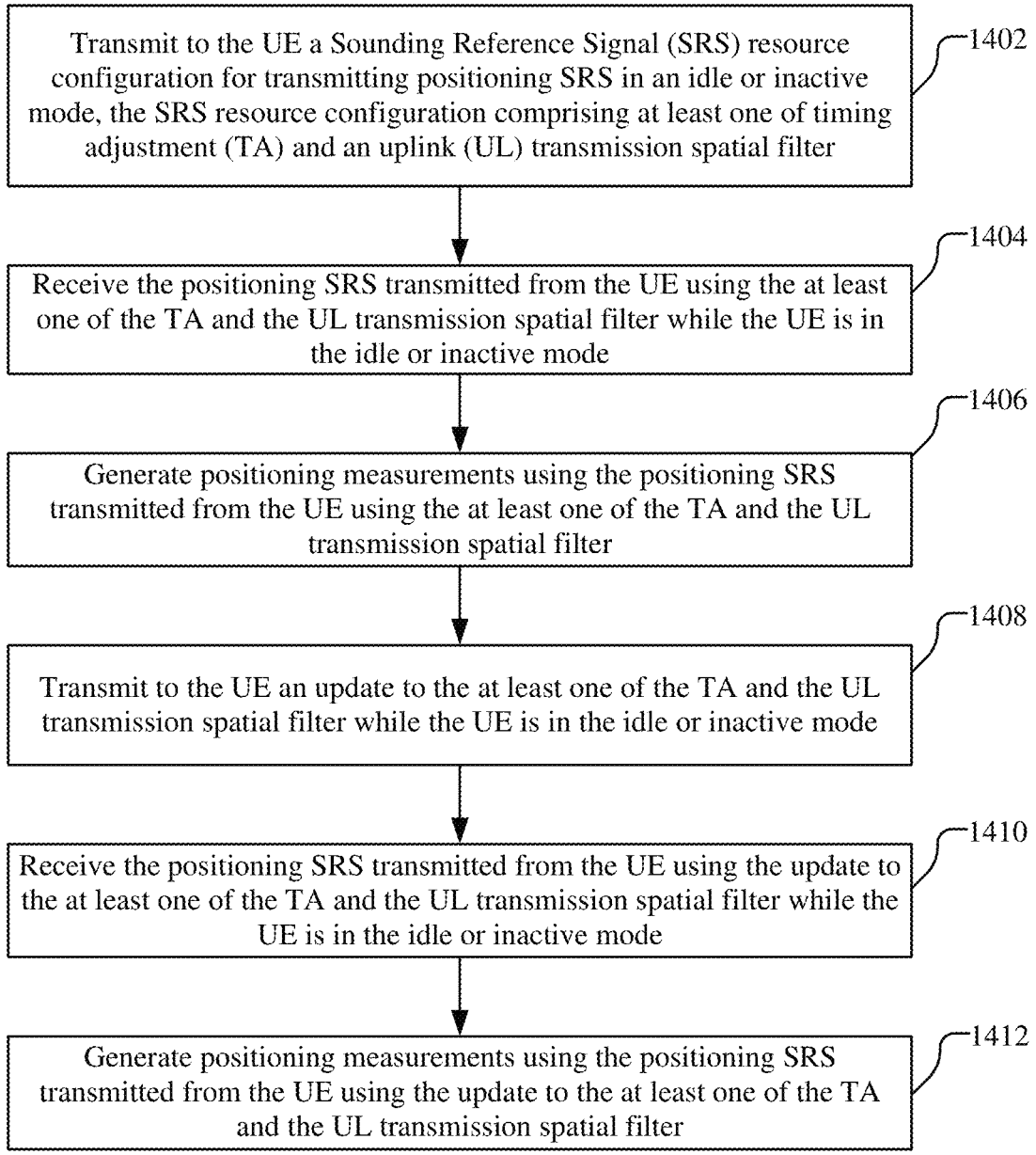
FIG. 14 shows a flowchart for an exemplary method for supporting position determination of a UE performed by a base station in a wireless network.

FIG. 14 shows a flowchart for an exemplary method 1400 for supporting position determination of a UE, such as UE 104, performed by a base station in a wireless network, such as base station 102.

At block 1402, the base station transmits to the UE a Sounding Reference Signal (SRS) resource configuration for transmitting positioning SRS in an idle or inactive mode, the SRS resource configuration comprising at least one of timing adjustment (TA) and an uplink (UL) transmission spatial filter, e.g., as discussed at stage 1 in FIG. 8. The SRS resource configuration may be received by the UE while it is in an radio resource control (RRC) connected state. A means for transmitting to the UE a Sounding Reference Signal (SRS) resource configuration for transmitting positioning SRS in an idle or inactive mode may be, e.g., the wireless transceiver 1210 and one or more processors 1202 with dedicated hardware or implementing executable code or software instructions in memory 1204 and/or medium 1220 such as the SRS resource configuration module 1222 in base station 1200 in FIG. 12.

At block 1404, the base station receives the positioning SRS transmitted from the UE using the at least one of the TA and the UL transmission spatial filter while the UE is in the idle or inactive mode, e.g., as discussed at stage 3 of FIG. 8. A means for receiving the positioning SRS transmitted from the UE using the at least one of the TA and the UL transmission spatial filter while the UE is in the idle or inactive mode may be, e.g., the wireless transceiver 1210 and one or more processors 1202 with dedicated hardware or implementing executable code or software instructions in memory 1204 and/or medium 1220 such as the SRS module 1224 in base station 1200 in FIG. 12.

At block 1406, the base station generates positioning measurements using the positioning SRS transmitted from the UE using the at least one of the TA and the UL transmission spatial filter, e.g., as discussed at stage 3 of FIG. 8. A means for generating positioning measurements using the positioning SRS transmitted from the UE using the at least one of the TA and the UL transmission spatial filter may be, e.g., the one or more processors 1202 with dedicated hardware or implementing executable code or software instructions in memory 1204 and/or medium 1220 such as the position module 1226 in base station 1200 in FIG. 12.

At block 1408, the base station transmit to the UE an update to the at least one of the TA and the UL transmission spatial filter while the UE is in the idle or inactive mode, e.g., as discussed at stage 6 of FIG. 8. The updates to the at least one of the TA and the UL transmission spatial filter may be transmitted in one of a downlink (DL) Physical Data Shared Channel (PDSCH), DL Physical Data Control Channel (PDCCH) transmitted from the serving base station, or a paging message. The update may be valid for one or more positioning SRS resources. Further, separate updates may be transmitted for each positioning SRS resource. For example, the separate updates may be transmitted in a single or multiple DL PDSCH, DL PDDCCH, or the paging messages. A means for transmitting to the UE an update to the at least one of the TA and the UL transmission spatial filter while the UE is in the idle or inactive mode may be, e.g., the wireless transceiver 1210 and one or more processors 1202 with dedicated hardware or implementing executable code or software instructions in memory 1204 and/or medium 1220 such as the SRS resource configuration module 1222 in base station 1200 in FIG. 12.

At block 1410, the base station receives the positioning SRS transmitted from the UE using the update to the at least one of the TA and the UL transmission spatial filter while the UE is in the idle or inactive mode, e.g., as discussed at stage 7 of FIG. 8. A means for receiving the positioning SRS transmitted from the UE using the update to the at least one of the TA and the UL transmission spatial filter while the UE is in the idle or inactive mode may be, e.g., the wireless transceiver 1210 and one or more processors 1202 with dedicated hardware or implementing executable code or software instructions in memory 1204 and/or medium 1220 such as the SRS module 1224 in base station 1200 in FIG. 12.

At block 1412, the base station generates positioning measurements using the positioning SRS transmitted from the UE using the update to the at least one of the TA and the UL transmission spatial filter, e.g., as discussed at stage 9 of FIG. 8. A means for generating positioning measurements using the positioning SRS transmitted from the UE using the update to the at least one of the TA and the UL transmission spatial filter may be, e.g., the one or more processors 1202 with dedicated hardware or implementing executable code or software instructions in memory 1204 and/or medium 1220 such as the position module 1226 in base station 1200 in FIG. 12.

In one implementation, the SRS resource configuration may be at least one expiration timer for the at least one of the TA and the UL transmission spatial filter. The UE may stop transmission of the positioning SRS while in the idle or inactive mode if the at least one expiration timer expires before the UE receives the update to the at least one of the TA and the UL transmission spatial filter from the base station, e.g., as discussed at stage 3 of FIG. 8. The TA may include separate TAs associated with different positioning SRS resources and the SRS resource configuration may include separate expiration timers for the TAs associated with the different positioning SRS resources, e.g., as discussed at stage 1 of FIG. 8. The UL transmission spatial filter may include separate UL transmission spatial filters associated with different positioning SRS resources and the SRS resource configuration may include separate expiration timers for the UL transmission spatial filters associated with the different positioning SRS resources, e.g., as discussed at stage 1 of FIG. 8. The update to the at least one of the TA and the UL transmission spatial filter may reset the at least one expiration timer for the at least one of the TA and the UL transmission spatial filter, e.g., as discussed at stage 6 of FIG. 8.

In one implementation, the base station may receive from the UE UL signals on pre-configured resources with multiple pre-configured UL transmission spatial filters and generate the update to the UL transmission spatial filter based on the received UL signals on the pre-configured resources with the multiple pre-configured UL transmission spatial filters. A means for receiving UL signals on pre-configured resources with multiple pre-configured UL transmission spatial filters may be, e.g., the wireless transceiver 1210 and one or more processors 1202 with dedicated hardware or implementing executable code or software instructions in memory 1204 and/or medium 1220 such as the UL signal module 1228 in base station 1200 in FIG. 12.

In one implementation, the base station may transmit multiple SRS resource configurations to the UE, wherein the positioning SRS received from the UE is configured with a first PRS resource configuration from the multiple SRS resource configurations, as discussed at stage 1 of FIG. 8. The base station may update the SRS resource configuration by including a selection of a second SRS resource configuration from the multiple SRS resource configurations, after which positioning SRS received from the UE use the second SRS resource configuration from the multiple SRS resource configurations, e.g., as discussed at stage 9 of FIG. 8. The selection of the second SRS resource configuration may be transmitted with the update to the at least one of the TA and the UL transmission spatial filter, e.g., as discussed at stage 8 of FIG. 8. The base station may transmits the selection of the second SRS resource configuration in one of a downlink (DL) Physical Data Shared Channel (PDSCH), DL Physical Data Control Channel (PDCCH), or a paging message, as discussed at stage 8 of FIG. 9.

Figure 15:
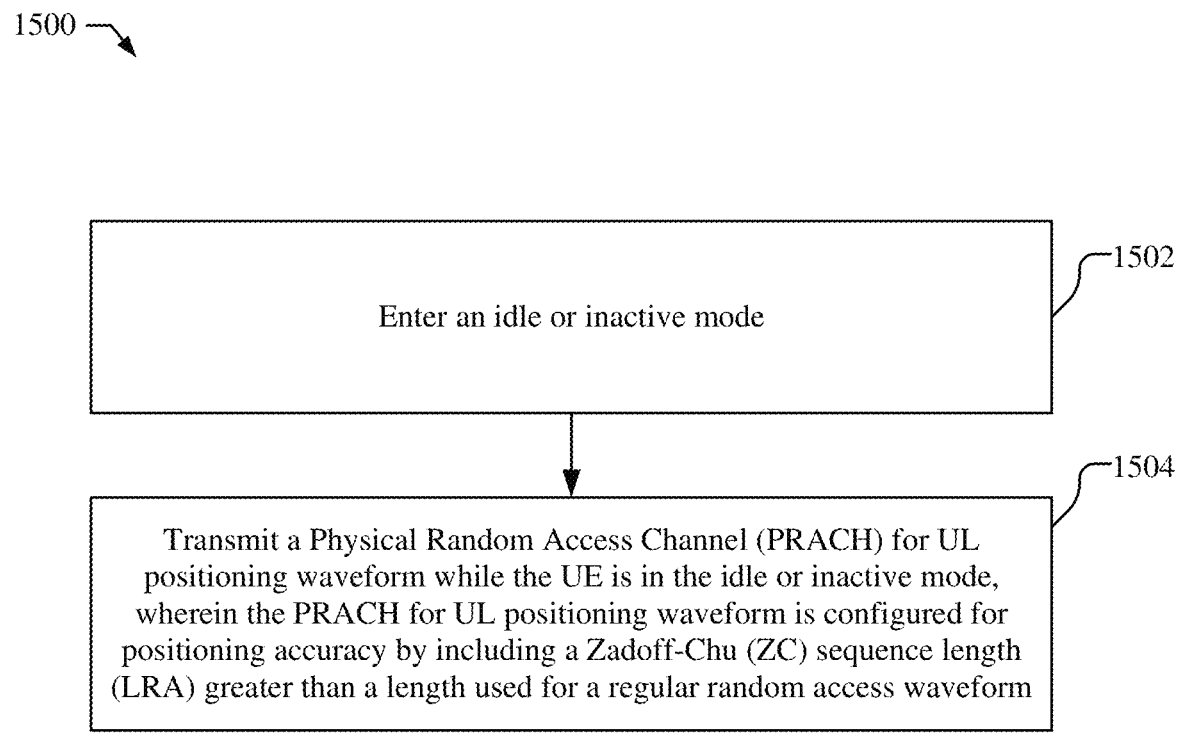
FIG. 15 shows a flowchart for another exemplary method for supporting position determination of a UE performed by the UE in a wireless network.

FIG. 15 shows a flowchart for an exemplary method 1500 for supporting position determination of a UE, such as UE 104, performed by the UE in a wireless network.

At block 1502, the UE enter an idle or inactive mode, e.g., as discussed at stage 2 of FIG. 10. A means for entering an idle or inactive mode may be, e.g., the one or more processors 1102 with dedicated hardware or implementing executable code or software instructions in memory 1104 and/or medium 1120 such as the idle/inactive module 1124 in UE 1100 in FIG. 11.

At block 1504, the UE may transmit a Physical Random Access Channel (PRACH) for UL positioning waveform while the UE is in the idle or inactive mode, e.g., as discussed at stage 4 of FIG. 10. The PRACH for UL positioning waveform is configured for positioning accuracy by including a Zadoff-Chu (ZC) sequence length (LRA) greater than a length used for a regular random access waveform. For example, the ZC sequence length (LRA) of the regular random access waveform is 139. In some implementation, the ZC sequence length (LRA) may be 571 or 839 or 1151, or greater than 1151. A means for transmitting a Physical Random Access Channel (PRACH) for UL positioning waveform while the UE is in the idle or inactive mode may be, e.g., the wireless transceiver 1110 and one or more processors 1102 with dedicated hardware or implementing executable code or software instructions in memory 1104 and/or medium 1120 such as the PRACH module 1134 in UE 1100 in FIG. 11.

In one implementation, the UE may receive a configuration for the PRACH for UL positioning waveform from a serving base station before entering the idle or inactive mode, e.g., as discussed at stage 1 on FIG. 10. A means for receiving a configuration for the PRACH for UL positioning waveform from a serving base station before entering the idle or inactive mode may be, e.g., the wireless transceiver 1110 and one or more processors 1102 with dedicated hardware or implementing executable code or software instructions in memory 1104 and/or medium 1120 such as the PRACH module 1134 in UE 1100 in FIG. 11.

In one implementation, the PRACH for UL positioning waveform may be transmitted in a Random Access Channel (RACH) procedure for positioning, e.g., as discussed at stage 4 of FIG. 10. The UE may transmit separate PRACH for UL positioning waveforms corresponding to separate RACH occasions with separate Random Access—Radio Network Temporary Identifiers (RA-RNTIs), e.g., as discussed at stage 4 of FIG. 10. In one example, the UE may further receive a paging message from a serving base station indicating that the UE is to transmit the PRACH for UL positioning waveform in the RACH procedure for positioning, e.g., as discussed at stage 3 of FIG. 10. A means for receiving a paging message from a serving base station indicating that the UE is to transmit the PRACH for UL positioning waveform in the RACH procedure for positioning may be, e.g., the wireless transceiver 1110 and one or more processors 1102 with dedicated hardware or implementing executable code or software instructions in memory 1104 and/or medium 1120 such as the paging module 1136 in UE 1100 in FIG. 11.

Figure 16:
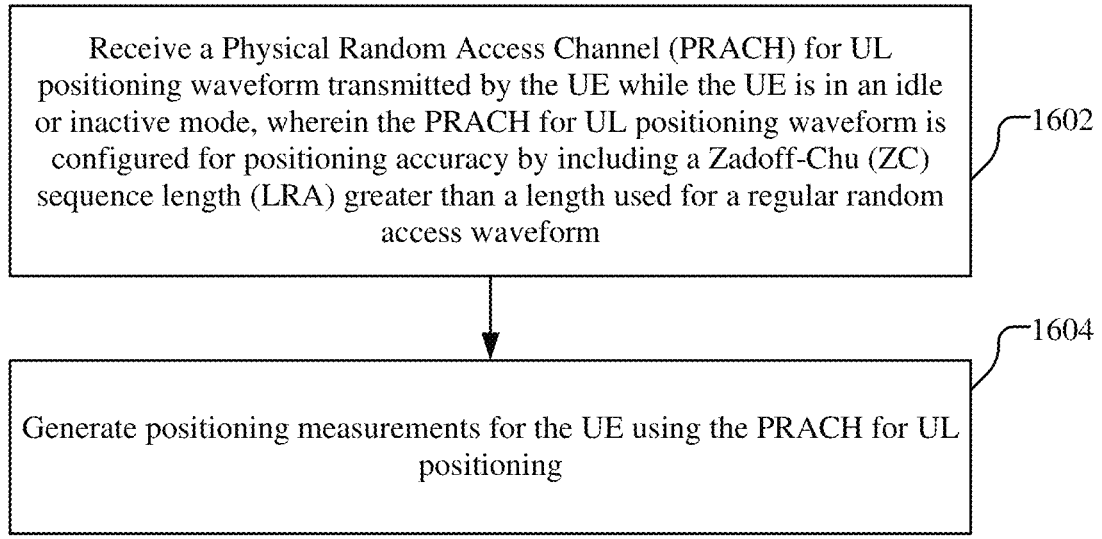
FIG. 16 shows a flowchart for another exemplary method for supporting position determination of a UE performed by a base station in a wireless network.

FIG. 16 shows a flowchart for an exemplary method 1600 for supporting position determination of a UE, such as UE 104, performed by a base station 102 in a wireless network.

At block 1602, the base station may receive a Physical Random Access Channel (PRACH) for UL positioning waveform transmitted by the UE while the UE is in an idle or inactive mode, e.g., as discussed at stage 4 of FIG. 10. The PRACH for UL positioning waveform may be configured for positioning accuracy by including a Zadoff-Chu (ZC) sequence length (LRA) greater than a length used for a regular random access waveform enter an idle or inactive mode, e.g., as discussed at stage 4 of FIG. 10. For example, the ZC sequence length (LRA) of the regular random access waveform is 139. In some implementation, the ZC sequence length (LRA) may be 571 or 839 or 1151, or greater than 1151. A means for receiving a Physical Random Access Channel (PRACH) for UL positioning waveform transmitted by the UE while the UE is in an idle or inactive mode may be the wireless transceiver 1210 and one or more processors 1202 with dedicated hardware or implementing executable code or software instructions in memory 1204 and/or medium 1220 such as the PRACH module 1230 in base station 1200 in FIG. 12.

At block 1604, the base station may generate positioning measurements for the UE using the PRACH for UL positioning, e.g., as discussed at stage 4 of FIG. 10. A means for generating positioning measurements for the UE using the PRACH for UL positioning may be, e.g., the one or more processors 1202 with dedicated hardware or implementing executable code or software instructions in memory 1204 and/or medium 1220 such as the position module 1226 in base station 1200 in FIG. 12.

In one implementation, the base station may transmit a configuration for the PRACH for UL positioning waveform to the UE before the UE enters the idle or inactive mode, e.g., as discussed at stage 1 of FIG. 10. A means for transmitting a configuration for the PRACH for UL positioning waveform to the UE before the UE enters the idle or inactive mode may be the wireless transceiver 1210 and one or more processors 1202 with dedicated hardware or implementing executable code or software instructions in memory 1204 and/or medium 1220 such as the PRACH module 1230 in base station 1200 in FIG. 12.

In one implementation, the PRACH for UL positioning waveform may be transmitted in a Random Access Channel (RACH) procedure for positioning, e.g., as discussed at stage 4 of FIG. 10. The base station may receive separate PRACH for UL positioning waveforms corresponding to separate RACH occasions with separate Random Access— Radio Network Temporary Identifiers (RA-RNTIs), e.g., as discussed at stage 4 of FIG. 10. In one implementation, the base station may further transmit a paging message to the UE while the UE is in the idle or inactive mode indicating that the UE is to transmit the PRACH for UL positioning waveform in the RACH procedure for positioning, e.g., as discussed at stage 3 of FIG. 10. A means for transmitting a paging message to the UE while the UE is in the idle or inactive mode indicating that the UE is to transmit the PRACH for UL positioning waveform in the RACH procedure for positioning may be the wireless transceiver 1210 and one or more processors 1202 with dedicated hardware or implementing executable code or software instructions in memory 1204 and/or medium 1220 such as the paging module 1232 in base station 1200 in FIG. 12.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method for supporting position determination of a user equipment (UE) performed by the UE in a wireless network, comprising: receiving a Sounding Reference Signal (SRS) resource configuration for transmitting positioning SRS from a serving base station, the SRS resource configuration comprising at least one of timing adjustment (TA) and an uplink (UL) transmission spatial filter; entering an idle or inactive mode; transmitting the positioning SRS using the at least one of the TA and the UL transmission spatial filter while in the idle or inactive mode; receiving from the serving base station an update to the at least one of the TA and the UL transmission spatial filter while the UE is in the idle or inactive mode; and transmitting the positioning SRS using the update to the at least one of the TA and the UL transmission spatial filter while in the idle or inactive mode.

Clause 2. The method of clause 1, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter.

Clause 3. The method of clause 2, wherein the TA comprises separate TAs associated with different positioning SRS resources and the SRS resource configuration comprises separate expiration timers for the TAs associated with the different positioning SRS resources.

Clause 4. The method of either of clauses 2 or 3, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 5. The method of any of clauses 2-4, wherein the update to the at least one of the TA and the UL transmission spatial filter resets the at least one expiration timer for the at least one of the TA and the UL transmission spatial filter.

Clause 6. The method of any of clauses 1-5, further comprising: monitoring power of received signals from one or more base stations while the UE is in the idle or inactive mode; and determining when a change in the power of received signals exceeds a threshold, wherein the UE stops transmission of the positioning SRS while in the idle or inactive mode if the change in the power of the received signals exceeds the threshold before the UE receives the update to the TA.

Clause 7. The method of clause 6, further comprising: updating a reference power for determining when the change in the power of the received signals exceeds the threshold when the UE receives the update to the TA.

Clause 8. The method of either of clauses 6 or 7, wherein the TA comprises separate TAs associated with different positioning SRS resources and for each positioning SRS resource the change in the power of the received signals is based on a first reference pathloss associated with the positioning SRS resource.

Clause 9. The method of clause 8, wherein a different threshold is used for each different positioning SRS resource.

Clause 10. The method of clause 8, wherein for each positioning SRS resource the change in the power of the received signals is further based on a second reference pathloss, and wherein corresponding thresholds are used for each reference pathloss.

Clause 11. The method of clause 10, wherein the UE stops transmission of the positioning SRS while in the idle or inactive mode if the change in the power of the received signals in either the first reference pathloss or the second reference pathloss exceeds a corresponding threshold before the UE receives the update to the TA.

Clause 12. The method of clause 10, wherein the UE stops transmission of the positioning SRS while in the idle or inactive mode if the change in the power of the received signals in both the first reference pathloss and the second reference pathloss exceeds a corresponding threshold before the UE receives the update to the TA.

Clause 13. The method of any of clauses 1-12, further comprising: monitoring a relative position of the UE based on inertial measurements while the UE is in the idle or inactive mode; and determining when a change in the relative position exceeds a threshold, wherein the UE stops transmission of the positioning SRS while in the idle or inactive mode if the change in the relative position exceeds the threshold before the UE receives the update to the TA.

Clause 14. The method of any of clauses 1-13, wherein the UE receives the update to the at least one of the TA and the UL transmission spatial filter in one of a downlink (DL) Physical Data Shared Channel (PDSCH), DL Physical Data Control Channel (PDCCH) transmitted from the serving base station, or a paging message.

Clause 15. The method of clause 14, wherein the update is valid for one or more positioning SRS resources.

Clause 16. The method of clause 14, wherein separate updates are received for each positioning SRS resource.

Clause 17. The method of clause 16, wherein the separate updates are received in a single one of the DL PDSCH, DL PDDCCH, or the paging message or are received in multiple ones of the DL PDSCH, DL PDDCCH, or the paging message.

Clause 18. The method of any of clauses 1-17, further comprising: transmitting UL signals on pre-configured resources with multiple pre-configured UL transmission spatial filters; wherein the update to the UL transmission spatial filter is received from the serving base station is received in response to the transmitted UL signals on the pre-configured resources with the multiple pre-configured UL transmission spatial filters.

Clause 19. The method of any of clauses 1-18, wherein receiving from the serving base station the SRS resource configuration comprises receiving multiple SRS resource configurations, wherein transmitting the positioning SRS uses a first PRS resource configuration from the multiple SRS resource configurations, further comprising receiving from the serving base station a selection of a second SRS resource configuration from the multiple SRS resource configurations, and wherein transmitting the positioning SRS uses the second SRS resource configuration.

Clause 20. The method of clause 19, wherein the selection of the second SRS resource configuration is received with the update to the at least one of the TA and the UL transmission spatial filter.

Clause 21. The method of clause 19, wherein the UE receives the selection of the second SRS resource configuration from the serving base station in one of a downlink (DL) Physical Data Shared Channel (PDSCH), DL Physical Data Control Channel (PDCCH) transmitted from the serving base station, or a paging message.

Clause 22. A user equipment (UE) configured to support position determination of the UE in a wireless network, comprising: a wireless transceiver configured to wirelessly communicate with base stations in the wireless network; at least one memory; at least one processor coupled to the wireless transceiver and the at least one memory, wherein the at least one processor is configured to: receive, via the wireless transceiver, a Sounding Reference Signal (SRS) resource configuration for transmitting positioning SRS from a serving base station, the SRS resource configuration comprising at least one of timing adjustment (TA) and an uplink (UL) transmission spatial filter; enter an idle or inactive mode; transmit, via the wireless transceiver, the positioning SRS using the at least one of the TA and the UL transmission spatial filter while in the idle or inactive mode; receive, via the wireless transceiver, from the serving base station an update to the at least one of the TA and the UL transmission spatial filter while the UE is in the idle or inactive mode; and transmit, via the wireless transceiver, the positioning SRS using the update to the at least one of the TA and the UL transmission spatial filter while in the idle or inactive mode.

Clause 23. The UE of clause 22, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter.

Clause 24. The UE of clause 23, wherein the TA comprises separate TAs associated with different positioning SRS resources and the SRS resource configuration comprises separate expiration timers for the TAs associated with the different positioning SRS resources.

Clause 25. The UE of either of clauses 23 or 24, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 26. The UE of any of clauses 23-25, wherein the update to the at least one of the TA and the UL transmission spatial filter resets the at least one expiration timer for the at least one of the TA and the UL transmission spatial filter.

Clause 27. The UE of any of clauses 22-26, wherein the at least one processor is further configured to: monitor power of received signals from one or more base stations while the UE is in the idle or inactive mode; and determine when a change in the power of received signals exceeds a threshold, wherein the UE stops transmission of the positioning SRS while in the idle or inactive mode if the change in the power of the received signals exceeds the threshold before the UE receives the update to the TA.

Clause 28. The UE of clause 27, wherein the at least one processor is further configured to: update a reference power for determining when the change in the power of the received signals exceeds the threshold when the UE receives the update to the TA.

Clause 29. The UE of either of clauses 27 or 28, wherein the TA comprises separate TAs associated with different positioning SRS resources and for each positioning SRS resource the change in the power of the received signals is based on a first reference pathloss associated with the positioning SRS resource.

Clause 30. The UE of clause 29, wherein a different threshold is used for each different positioning SRS resource.

Clause 31. The UE of clause 29, wherein for each positioning SRS resource the change in the power of the received signals is further based on a second reference pathloss, and wherein corresponding thresholds are used for each reference pathloss.

Clause 32. The UE of clause 31, wherein the UE stops transmission of the positioning SRS while in the idle or inactive mode if the change in the power of the received signals in either the first reference pathloss or the second reference pathloss exceeds a corresponding threshold before the UE receives the update to the TA.

Clause 33. The UE of clause 31, wherein the UE stops transmission of the positioning SRS while in the idle or inactive mode if the change in the power of the received signals in both the first reference pathloss and the second reference pathloss exceeds a corresponding threshold before the UE receives the update to the TA.

Clause 34. The UE of any of clauses 22-33, wherein the at least one processor is further configured to: monitor a relative position of the UE based on inertial measurements while the UE is in the idle or inactive mode; and determine when a change in the relative position exceeds a threshold, wherein the UE stops transmission of the positioning SRS while in the idle or inactive mode if the change in the relative position exceeds the threshold before the UE receives the update to the TA.

Clause 35. The UE of any of clauses 22-34, wherein the UE receives the update to the at least one of the TA and the UL transmission spatial filter in one of a downlink (DL) Physical Data Shared Channel (PDSCH), DL Physical Data Control Channel (PDCCH) transmitted from the serving base station, or a paging message.

Clause 36. The UE of clause 35, wherein the update is valid for one or more positioning SRS resources.

Clause 37. The UE of clause 35, wherein separate updates are received for each positioning SRS resource.

Clause 38. The UE of clause 37, wherein the separate updates are received in a single one of the DL PDSCH, DL PDDCCH, or the paging message or are received in multiple ones of the DL PDSCH, DL PDDCCH, or the paging message.

Clause 39. The UE of any of clauses 22-38, wherein the at least one processor is further configured to: transmit, via the wireless transceiver, UL signals on pre-configured resources with multiple pre-configured UL transmission spatial filters; wherein the update to the UL transmission spatial filter is received from the serving base station is received in response to the transmitted UL signals on the pre-configured resources with the multiple pre-configured UL transmission spatial filters.

Clause 40. The UE of any of clauses 22-39, wherein the at least one processor is configured to receive from the serving base station, via the wireless transceiver, the SRS resource configuration by being configured to receive multiple SRS resource configurations, wherein the positioning SRS uses a first PRS resource configuration from the multiple SRS resource configurations, wherein the at least one processor is further configured to receive from the serving base station, via the wireless transceiver, a selection of a second SRS resource configuration from the multiple SRS resource configurations, and transmit the positioning SRS using the second SRS resource configuration.

Clause 41. The UE of clause 40, wherein the selection of the second SRS resource configuration is received with the update to the at least one of the TA and the UL transmission spatial filter.

Clause 42. The UE of clause 40, wherein the UE receives the selection of the second SRS resource configuration from the serving base station in one of a downlink (DL) Physical Data Shared Channel (PDSCH), DL Physical Data Control Channel (PDCCH) transmitted from the serving base station, or a paging message.

Clause 43. A user equipment (UE) configured for supporting position determination of the UE in a wireless network, comprising: means for receiving a Sounding Reference Signal (SRS) resource configuration for transmitting positioning SRS from a serving base station, the SRS resource configuration comprising at least one of timing adjustment (TA) and an uplink (UL) transmission spatial filter; means for entering an idle or inactive mode; means for transmitting the positioning SRS using the at least one of the TA and the UL transmission spatial filter while in the idle or inactive mode; means for receiving from the serving base station an update to the at least one of the TA and the UL transmission spatial filter while the UE is in the idle or inactive mode; and means for transmitting the positioning SRS using the update to the at least one of the TA and the UL transmission spatial filter while in the idle or inactive mode.

Clause 44. The UE of clause 43, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter.

Clause 45. The UE of clause 44, wherein the TA comprises separate TAs associated with different positioning SRS resources and the SRS resource configuration comprises separate expiration timers for the TAs associated with the different positioning SRS resources.

Clause 46. The UE of either of clauses 44 or 45, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 47. The UE of any of clauses 44-46, wherein the update to the at least one of the TA and the UL transmission spatial filter resets the at least one expiration timer for the at least one of the TA and the UL transmission spatial filter.

Clause 48. The UE of any of clauses 43-47, further comprising: means for monitoring power of received signals from one or more base stations while the UE is in the idle or inactive mode; and means for determining when a change in the power of received signals exceeds a threshold, wherein the UE stops transmission of the positioning SRS while in the idle or inactive mode if the change in the power of the received signals exceeds the threshold before the UE receives the update to the TA.

Clause 49. The UE of clause 48, further comprising: means for updating a reference power for determining when the change in the power of the received signals exceeds the threshold when the UE receives the update to the TA.

Clause 50. The UE of either of clauses 48 or 49, wherein the TA comprises separate TAs associated with different positioning SRS resources and for each positioning SRS resource the change in the power of the received signals is based on a first reference pathloss associated with the positioning SRS resource.

Clause 51. The UE of clause 50, wherein a different threshold is used for each different positioning SRS resource.

Clause 52. The UE of clause 50, wherein for each positioning SRS resource the change in the power of the received signals is further based on a second reference pathloss, and wherein corresponding thresholds are used for each reference pathloss.

Clause 53. The UE of clause 52, wherein the UE stops transmission of the positioning SRS while in the idle or inactive mode if the change in the power of the received signals in either the first reference pathloss or the second reference pathloss exceeds a corresponding threshold before the UE receives the update to the TA.

Clause 54. The UE of clause 52, wherein the UE stops transmission of the positioning SRS while in the idle or inactive mode if the change in the power of the received signals in both the first reference pathloss and the second reference pathloss exceeds a corresponding threshold before the UE receives the update to the TA.

Clause 55. The UE of any of clauses 43-54, further comprising: means for monitoring a relative position of the UE based on inertial measurements while the UE is in the idle or inactive mode; and means for determining when a change in the relative position exceeds a threshold, wherein the UE stops transmission of the positioning SRS while in the idle or inactive mode if the change in the relative position exceeds the threshold before the UE receives the update to the TA.

Clause 56. The UE of any of clauses 43-55, wherein the UE receives the update to the at least one of the TA and the UL transmission spatial filter in one of a downlink (DL) Physical Data Shared Channel (PDSCH), DL Physical Data Control Channel (PDCCH) transmitted from the serving base station, or a paging message.

Clause 57. The UE of clause 56, wherein the update is valid for one or more positioning SRS resources.

Clause 58. The UE of clause 56, wherein separate updates are received for each positioning SRS resource.

Clause 59. The UE of clause 58, wherein the separate updates are received in a single one of the DL PDSCH, DL PDDCCH, or the paging message or are received in multiple ones of the DL PDSCH, DL PDDCCH, or the paging message.

Clause 60. The UE of any of clauses 43-59, further comprising: means for transmitting UL signals on pre-configured resources with multiple pre-configured UL transmission spatial filters; wherein the update to the UL transmission spatial filter is received from the serving base station is received in response to the transmitted UL signals on the pre-configured resources with the multiple pre-configured UL transmission spatial filters.

Clause 61. The UE of any of clauses 43-60, wherein the means for receiving from the serving base station the SRS resource configuration receives multiple SRS resource configurations, wherein the means for transmitting the positioning SRS uses a first PRS resource configuration from the multiple SRS resource configurations, further comprising means for receiving from the serving base station a selection of a second SRS resource configuration from the multiple SRS resource configurations, and wherein the means for transmitting the positioning SRS uses the second SRS resource configuration.

Clause 62. The UE of clause 61, wherein the selection of the second SRS resource configuration is received with the update to the at least one of the TA and the UL transmission spatial filter.

Clause 63. The UE of clause 61, wherein the UE receives the selection of the second SRS resource configuration from the serving base station in one of a downlink (DL) Physical Data Shared Channel (PDSCH), DL Physical Data Control Channel (PDCCH) transmitted from the serving base station, or a paging message.

Clause 64. A non-transitory storage medium including program code stored thereon, the program code is operable to configure at least one processor in a user equipment (UE) to support position determination of the UE in a wireless network, the program code comprising instructions to: receive a Sounding Reference Signal (SRS) resource configuration for transmitting positioning SRS from a serving base station, the SRS resource configuration comprising at least one of timing adjustment (TA) and an uplink (UL) transmission spatial filter; enter an idle or inactive mode; transmit the positioning SRS using the at least one of the TA and the UL transmission spatial filter while in the idle or inactive mode; receive from the serving base station an update to the at least one of the TA and the UL transmission spatial filter while the UE is in the idle or inactive mode; and transmit the positioning SRS using the update to the at least one of the TA and the UL transmission spatial filter while in the idle or inactive mode.

Clause 65. The non-transitory storage medium of clause 64, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter.

Clause 66. The non-transitory storage medium of clause 65, wherein the TA comprises separate TAs associated with different positioning SRS resources and the SRS resource configuration comprises separate expiration timers for the TAs associated with the different positioning SRS resources.

Clause 67. The non-transitory storage medium of either of clauses 65 or 66, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 68. The non-transitory storage medium of any of clauses 65-67, wherein the update to the at least one of the TA and the UL transmission spatial filter resets the at least one expiration timer for the at least one of the TA and the UL transmission spatial filter.

Clause 69. The non-transitory storage medium of any of clauses 64-68, wherein the program code further comprises instructions to: monitor power of received signals from one or more base stations while the UE is in the idle or inactive mode; and determine when a change in the power of received signals exceeds a threshold, wherein the UE stops transmission of the positioning SRS while in the idle or inactive mode if the change in the power of the received signals exceeds the threshold before the UE receives the update to the TA.

Clause 70. The non-transitory storage medium of clause 69, wherein the program code further comprises instructions to: update a reference power for determining when the change in the power of the received signals exceeds the threshold when the UE receives the update to the TA.

Clause 71. The non-transitory storage medium of either of clauses 69 or 70, wherein the TA comprises separate TAs associated with different positioning SRS resources and for each positioning SRS resource the change in the power of the received signals is based on a first reference pathloss associated with the positioning SRS resource.

Clause 72. The non-transitory storage medium of clause 71, wherein a different threshold is used for each different positioning SRS resource.

Clause 73. The non-transitory storage medium of clause 71, wherein for each positioning SRS resource the change in the power of the received signals is further based on a second reference pathloss, and wherein corresponding thresholds are used for each reference pathloss.

Clause 74. The non-transitory storage medium of clause 73, wherein the UE stops transmission of the positioning SRS while in the idle or inactive mode if the change in the power of the received signals in either the first reference pathloss or the second reference pathloss exceeds a corresponding threshold before the UE receives the update to the TA.

Clause 75. The non-transitory storage medium of clause 73, wherein the UE stops transmission of the positioning SRS while in the idle or inactive mode if the change in the power of the received signals in both the first reference pathloss and the second reference pathloss exceeds a corresponding threshold before the UE receives the update to the TA.

Clause 76. The non-transitory storage medium of any of clauses 64-75, wherein the program code further comprises instructions to: monitor a relative position of the UE based on inertial measurements while the UE is in the idle or inactive mode; and determine when a change in the relative position exceeds a threshold, wherein the UE stops transmission of the positioning SRS while in the idle or inactive mode if the change in the relative position exceeds the threshold before the UE receives the update to the TA.

Clause 77. The non-transitory storage medium of any of clauses 64-76, wherein the UE receives the update to the at least one of the TA and the UL transmission spatial filter in one of a downlink (DL) Physical Data Shared Channel (PDSCH), DL Physical Data Control Channel (PDCCH) transmitted from the serving base station, or a paging message.

Clause 78. The non-transitory storage medium of clause 77, wherein the update is valid for one or more positioning SRS resources.

Clause 79. The non-transitory storage medium of clause 77, wherein separate updates are received for each positioning SRS resource.

Clause 80. The non-transitory storage medium of clause 79, wherein the separate updates are received in a single one of the DL PDSCH, DL PDDCCH, or the paging message or are received in multiple ones of the DL PDSCH, DL PDDCCH, or the paging message.

Clause 81. The non-transitory storage medium of any of clauses 64-80, wherein the program code further comprises instructions to: transmit UL signals on pre-configured resources with multiple pre-configured UL transmission spatial filters; wherein the update to the UL transmission spatial filter is received from the serving base station is received in response to the transmitted UL signals on the pre-configured resources with the multiple pre-configured UL transmission spatial filters.

Clause 82. The non-transitory storage medium of any of clauses 64-81, wherein the instructions to receive from the serving base station the SRS resource configuration comprises instructions to receive multiple SRS resource configurations, wherein the positioning SRS uses a first PRS resource configuration from the multiple SRS resource configurations, wherein the program code further comprises instructions to receive from the serving base station a selection of a second SRS resource configuration from the multiple SRS resource configurations, and transmit the positioning SRS using the second SRS resource configuration.

Clause 83. The non-transitory storage medium of clause 82, wherein the selection of the second SRS resource configuration is received with the update to the at least one of the TA and the UL transmission spatial filter.

Clause 84. The non-transitory storage medium of clause 82, wherein the UE receives the selection of the second SRS resource configuration from the serving base station in one of a downlink (DL) Physical Data Shared Channel (PDSCH), DL Physical Data Control Channel (PDCCH) transmitted from the serving base station, or a paging message.

Clause 85. A method for supporting position determination of a user equipment (UE) performed by a base station in a wireless network, comprising: transmitting to the UE a Sounding Reference Signal (SRS) resource configuration for transmitting positioning SRS in an idle or inactive mode, the SRS resource configuration comprising at least one of timing adjustment (TA) and an uplink (UL) transmission spatial filter; receiving the positioning SRS transmitted from the UE using the at least one of the TA and the UL transmission spatial filter while the UE is in the idle or inactive mode; generating positioning measurements using the positioning SRS transmitted from the UE using the at least one of the TA and the UL transmission spatial filter; transmitting to the UE an update to the at least one of the TA and the UL transmission spatial filter while the UE is in the idle or inactive mode; receiving the positioning SRS transmitted from the UE using the update to the at least one of the TA and the UL transmission spatial filter while the UE is in the idle or inactive mode; and generating positioning measurements using the positioning SRS transmitted from the UE using the update to the at least one of the TA and the UL transmission spatial filter.

Clause 86. The method of clause 85, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter from the base station.

Clause 87. The method of clause 86, wherein the TA comprises separate TAs associated with different positioning SRS resources and the SRS resource configuration comprises separate expiration timers for the TAs associated with the different positioning SRS resources.

Clause 88. The method of either of clauses 86 or 87, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 89. The method of any of clauses 86-88, wherein the update to the at least one of the TA and the UL transmission spatial filter resets the at least one expiration timer for the at least one of the TA and the UL transmission spatial filter.

Clause 90. The method of any of clauses 85-89, wherein the base station transmits the update to the at least one of the TA and the UL transmission spatial filter in one of a downlink (DL) Physical Data Shared Channel (PDSCH), DL Physical Data Control Channel (PDCCH), or a paging message.

Clause 91. The method of clause 90, wherein the update is valid for one or more positioning SRS resources.

Clause 92. The method of clause 90, wherein separate updates are transmitted for each positioning SRS resource.

Clause 93. The method of clause 92, wherein the separate updates are transmitted in a single one of the DL PDSCH, DL PDDCCH, or the paging message or are transmitted in multiple ones of the DL PDSCH, DL PDDCCH, or the paging message.

Clause 94. The method of any of clauses 85-93, further comprising: receiving from the UE UL signals on pre-configured resources with multiple pre-configured UL transmission spatial filters; and generating the update to the UL transmission spatial filter based on the received UL signals on the pre-configured resources with the multiple pre-configured UL transmission spatial filters.

Clause 95. The method of any of clauses 85-94, wherein transmitting to the UE the SRS resource configuration comprises transmitting multiple SRS resource configurations, wherein the positioning SRS received from the UE using the at least one of the TA and the UL transmission spatial filter is configured with a first PRS resource configuration from the multiple SRS resource configurations, further comprising transmitting a selection of a second SRS resource configuration from the multiple SRS resource configurations, and receiving the positioning SRS transmitted from the UE using the second SRS resource configuration from the multiple SRS resource configurations.

Clause 96. The method of clause 95, wherein the selection of the second SRS resource configuration is transmitted with the update to the at least one of the TA and the UL transmission spatial filter.

Clause 97. The method of clause 95, wherein the base station transmits the selection of the second SRS resource configuration in one of a downlink (DL) Physical Data Shared Channel (PDSCH), DL Physical Data Control Channel (PDCCH), or a paging message.

Clause 98. A base station configured to support position determination of a user equipment (UE) in a wireless network, comprising: an external interface configured to wirelessly communicate with the UE in the wireless network; at least one memory; at least one processor coupled to the external interface and the at least one memory, wherein the at least one processor is configured to: transmit to the UE, via the external interface, a Sounding Reference Signal (SRS) resource configuration for transmitting positioning SRS in an idle or inactive mode, the SRS resource configuration comprising at least one of timing adjustment (TA) and an uplink (UL) transmission spatial filter; receive, via the external interface, the positioning SRS transmitted from the UE using the at least one of the TA and the UL transmission spatial filter while the UE is in the idle or inactive mode; generate positioning measurements using the positioning SRS transmitted from the UE using the at least one of the TA and the UL transmission spatial filter; transmit to the UE, via the external interface, an update to the at least one of the TA and the UL transmission spatial filter while the UE is in the idle or inactive mode; receive, via the external interface, the positioning SRS transmitted from the UE using the update to the at least one of the TA and the UL transmission spatial filter while the UE is in the idle or inactive mode; and generate positioning measurements using the positioning SRS transmitted from the UE using the update to the at least one of the TA and the UL transmission spatial filter.

Clause 99. The base station of clause 98, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter from the base station.

Clause 100. The base station of clause 99, wherein the TA comprises separate TAs associated with different positioning SRS resources and the SRS resource configuration comprises separate expiration timers for the TAs associated with the different positioning SRS resources.

Clause 101. The base station of either of clauses 99 or 100, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 102. The base station of any of clauses 99-101, wherein the update to the at least one of the TA and the UL transmission spatial filter resets the at least one expiration timer for the at least one of the TA and the UL transmission spatial filter.

Clause 103. The base station of any of clauses 98-102, wherein the base station transmits the update to the at least one of the TA and the UL transmission spatial filter in one of a downlink (DL) Physical Data Shared Channel (PDSCH), DL Physical Data Control Channel (PDCCH), or a paging message.

Clause 104. The base station of clause 103, wherein the update is valid for one or more positioning SRS resources.

Clause 105. The base station of clause 103, wherein separate updates are transmitted for each positioning SRS resource.

Clause 106. The base station of clause 105, wherein the separate updates are transmitted in a single one of the DL PDSCH, DL PDDCCH, or the paging message or are transmitted in multiple ones of the DL PDSCH, DL PDDCCH, or the paging message.

Clause 107. The base station of any of clauses 98-106, wherein the at least one processor is further configured to: receive from the UE, via the external interface, UL signals on pre-configured resources with multiple pre-configured UL transmission spatial filters; and generate the update to the UL transmission spatial filter based on the received UL signals on the pre-configured resources with the multiple pre-configured UL transmission spatial filters.

Clause 108. The base station of any of clauses 98-107, wherein the at least one processor is configured to transmit to the UE, via the external interface, the SRS resource configuration by being configured to transmit multiple SRS resource configurations, wherein the positioning SRS received from the UE using the at least one of the TA and the UL transmission spatial filter is configured with a first PRS resource configuration from the multiple SRS resource configurations, wherein the at least one processor is further configured to transmit, via the external interface, a selection of a second SRS resource configuration from the multiple SRS resource configurations, and receive the positioning SRS transmitted from the UE using the second SRS resource configuration from the multiple SRS resource configurations.

Clause 109. The base station of clause 108, wherein the selection of the second SRS resource configuration is transmitted with the update to the at least one of the TA and the UL transmission spatial filter.

Clause 110. The base station of clause 108, wherein the base station transmits the selection of the second SRS resource configuration in one of a downlink (DL) Physical Data Shared Channel (PDSCH), DL Physical Data Control Channel (PDCCH), or a paging message.

Clause 111. A base station in a wireless network configured for supporting position determination of a user equipment (UE), comprising: means for transmitting to the UE a Sounding Reference Signal (SRS) resource configuration for transmitting positioning SRS in an idle or inactive mode, the SRS resource configuration comprising at least one of timing adjustment (TA) and an uplink (UL) transmission spatial filter; means for receiving the positioning SRS transmitted from the UE using the at least one of the TA and the UL transmission spatial filter while the UE is in the idle or inactive mode; means for generating positioning measurements using the positioning SRS transmitted from the UE using the at least one of the TA and the UL transmission spatial filter; means for transmitting to the UE an update to the at least one of the TA and the UL transmission spatial filter while the UE is in the idle or inactive mode; means for receiving the positioning SRS transmitted from the UE using the update to the at least one of the TA and the UL transmission spatial filter while the UE is in the idle or inactive mode; and means for generating positioning measurements using the positioning SRS transmitted from the UE using the update to the at least one of the TA and the UL transmission spatial filter.

Clause 112. The base station of clause 111, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter from the base station.

Clause 113. The base station of clause 112, wherein the TA comprises separate TAs associated with different positioning SRS resources and the SRS resource configuration comprises separate expiration timers for the TAs associated with the different positioning SRS resources.

Clause 114. The base station of either of clauses 112 or 113, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 115. The base station of any of clauses 112-114, wherein the update to the at least one of the TA and the UL transmission spatial filter resets the at least one expiration timer for the at least one of the TA and the UL transmission spatial filter.

Clause 116. The base station of any of clauses 111-115, wherein the base station transmits the update to the at least one of the TA and the UL transmission spatial filter in one of a downlink (DL) Physical Data Shared Channel (PDSCH), DL Physical Data Control Channel (PDCCH), or a paging message.

Clause 117. The base station of clause 116, wherein the update is valid for one or more positioning SRS resources.

Clause 118. The base station of clause 116, wherein separate updates are transmitted for each positioning SRS resource.

Clause 119. The base station of clause 118, wherein the separate updates are transmitted in a single one of the DL PDSCH, DL PDDCCH, or the paging message or are transmitted in multiple ones of the DL PDSCH, DL PDDCCH, or the paging message.

Clause 120. The base station of any of clauses 111-119, further comprising: means for receiving from the UE UL signals on pre-configured resources with multiple pre-configured UL transmission spatial filters; and means for generating the update to the UL transmission spatial filter based on the received UL signals on the pre-configured resources with the multiple pre-configured UL transmission spatial filters.

Clause 121. The base station of any of clauses 111-120, wherein the means for transmitting to the UE the SRS resource configuration transmits multiple SRS resource configurations, wherein the positioning SRS received from the UE using the at least one of the TA and the UL transmission spatial filter is configured with a first PRS resource configuration from the multiple SRS resource configurations, further comprising means for transmitting a selection of a second SRS resource configuration from the multiple SRS resource configurations, and means for receiving the positioning SRS transmitted from the UE using the second SRS resource configuration from the multiple SRS resource configurations.

Clause 122. The base station of clause 121, wherein the selection of the second SRS resource configuration is transmitted with the update to the at least one of the TA and the UL transmission spatial filter.

Clause 123. The base station of clause 121, wherein the base station transmits the selection of the second SRS resource configuration in one of a downlink (DL) Physical Data Shared Channel (PDSCH), DL Physical Data Control Channel (PDCCH), or a paging message.

Clause 124. A non-transitory storage medium including program code stored thereon, the program code is operable to configure at least one processor in a base station to support position determination of a user equipment (UE) in a wireless network, the program code comprising instructions to: transmit to the UE a Sounding Reference Signal (SRS) resource configuration for transmitting positioning SRS in an idle or inactive mode, the SRS resource configuration comprising at least one of timing adjustment (TA) and an uplink (UL) transmission spatial filter; receive the positioning SRS transmitted from the UE using the at least one of the TA and the UL transmission spatial filter while the UE is in the idle or inactive mode; generate positioning measurements using the positioning SRS transmitted from the UE using the at least one of the TA and the UL transmission spatial filter; transmit to the UE an update to the at least one of the TA and the UL transmission spatial filter while the UE is in the idle or inactive mode; receive the positioning SRS transmitted from the UE using the update to the at least one of the TA and the UL transmission spatial filter while the UE is in the idle or inactive mode; and generate positioning measurements using the positioning SRS transmitted from the UE using the update to the at least one of the TA and the UL transmission spatial filter.

Clause 125. The non-transitory storage medium of clause 124, wherein the SRS resource configuration comprises at least one expiration timer for the at least one of the TA and the UL transmission spatial filter, wherein the UE stops transmission of the positioning SRS while in the idle or inactive mode if the at least one expiration timer expires before the UE receives the update to the at least one of the TA and the UL transmission spatial filter from the base station.

Clause 126. The non-transitory storage medium of clause 125, wherein the TA comprises separate TAs associated with different positioning SRS resources and the SRS resource configuration comprises separate expiration timers for the TAs associated with the different positioning SRS resources.

Clause 127. The non-transitory storage medium of either of clauses 125 or 126, wherein the UL transmission spatial filter comprises separate UL transmission spatial filters associated with different positioning SRS resources and the SRS resource configuration comprises separate expiration timers for the UL transmission spatial filters associated with the different positioning SRS resources.

Clause 128. The non-transitory storage medium of any of clauses 125-127, wherein the update to the at least one of the TA and the UL transmission spatial filter resets the at least one expiration timer for the at least one of the TA and the UL transmission spatial filter.

Clause 129. The non-transitory storage medium of any of clauses 124-128, wherein the base station transmits the update to the at least one of the TA and the UL transmission spatial filter in one of a downlink (DL) Physical Data Shared Channel (PDSCH), DL Physical Data Control Channel (PDCCH), or a paging message.

Clause 130. The non-transitory storage medium of clause 129, wherein the update is valid for one or more positioning SRS resources.

Clause 131. The non-transitory storage medium of clause 129, wherein separate updates are transmitted for each positioning SRS resource.

Clause 132. The non-transitory storage medium of clause 131, wherein the separate updates are transmitted in a single one of the DL PDSCH, DL PDDCCH, or the paging message or are transmitted in multiple ones of the DL PDSCH, DL PDDCCH, or the paging message.

Clause 133. The non-transitory storage medium of any of clauses 124-132, wherein the program code further comprises instructions to: receive from the UE UL signals on pre-configured resources with multiple pre-configured UL transmission spatial filters; and generate the update to the UL transmission spatial filter based on the received UL signals on the pre-configured resources with the multiple pre-configured UL transmission spatial filters.

Clause 134. The non-transitory storage medium of any of clauses 124-133, wherein the program code comprises instructions to transmit to the UE the SRS resource configuration comprises instructions to transmit multiple SRS resource configurations, wherein the positioning SRS received from the UE using the at least one of the TA and the UL transmission spatial filter is configured with a first PRS resource configuration from the multiple SRS resource configurations, wherein the program code further comprises instructions to transmit a selection of a second SRS resource configuration from the multiple SRS resource configurations, and receive the positioning SRS transmitted from the UE using the second SRS resource configuration from the multiple SRS resource configurations.

Clause 135. The non-transitory storage medium of clause 134, wherein the selection of the second SRS resource configuration is transmitted with the update to the at least one of the TA and the UL transmission spatial filter.

Clause 136. The non-transitory storage medium of clause 134, wherein the base station transmits the selection of the second SRS resource configuration in one of a downlink (DL) Physical Data Shared Channel (PDSCH), DL Physical Data Control Channel (PDCCH), or a paging message.

Clause 137. A method for supporting position determination of a user equipment (UE) performed by the UE in a wireless network, comprising: entering an idle or inactive mode; and transmitting a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

Clause 138. The method of clause 137, where the ZC sequence length (LRA) of the regular random access waveform is 139.

Clause 139. The method of clause 137, wherein the ZC sequence length (LRA) is 571 or 839 or 1151.

Clause 140. The method of clause 137, wherein the ZC sequence length (LRA) is greater than 1151.

Clause 141. The method of any of clauses 137-140, further comprising receiving a configuration for the PRACH for UL positioning waveform from a serving base station before entering the idle or inactive mode.

Clause 142. The method of any of clauses 137-141, wherein the PRACH for UL positioning waveform is transmitted in a Random Access Channel (RACH) procedure for positioning.

Clause 143. The method of clause 142, further comprising transmitting separate PRACH for UL positioning waveforms corresponding to separate RACH occasions with separate Random Access—Radio Network Temporary Identifiers (RA-RNTIs).

Clause 144. The method of clause 142, further comprising receiving a paging message from a serving base station indicating that the UE is to transmit the PRACH for UL positioning waveform in the RACH procedure for positioning.

Clause 145. A user equipment (UE) configured to support position determination of the UE in a wireless network, comprising: a wireless transceiver configured to wirelessly communicate with base stations in the wireless network; at least one memory; at least one processor coupled to the wireless transceiver and the at least one memory, wherein the at least one processor is configured to: enter an idle or inactive mode; and transmit, via the wireless transceiver, a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

Clause 146. The UE of clause 145, where the ZC sequence length (LRA) of the regular random access waveform is 139.

Clause 147. The UE of clause 145, wherein the ZC sequence length (LRA) is 571 or 839 or 1151.

Clause 148. The UE of clause 145, wherein the ZC sequence length (LRA) is greater than 1151.

Clause 149. The UE of any of clauses 145-148, wherein the at least one processor is further configured to receive, via the wireless transceiver, a configuration for the PRACH for UL positioning waveform from a serving base station before entering the idle or inactive mode.

Clause 150. The UE of any of clauses 145-149, wherein the PRACH for UL positioning waveform is transmitted in a Random Access Channel (RACH) procedure for positioning.

Clause 151. The UE of clause 150, wherein the at least one processor is further configured to transmit, via the wireless transceiver, separate PRACH for UL positioning waveforms corresponding to separate RACH occasions with separate Random Access—Radio Network Temporary Identifiers (RA-RNTIs).

Clause 152. The UE of clause 150, wherein the at least one processor is further configured to receive, via the wireless transceiver, a paging message from a serving base station indicating that the UE is to transmit the PRACH for UL positioning waveform in the RACH procedure for positioning.

Clause 153. A user equipment (UE) configured for supporting position determination of the UE in a wireless network, comprising: means for entering an idle or inactive mode; and means for transmitting a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

Clause 154. The UE of clause 153, where the ZC sequence length (LRA) of the regular random access waveform is 139.

Clause 155. The UE of clause 153, wherein the ZC sequence length (LRA) is 571 or 839 or 1151.

Clause 156. The UE of clause 153, wherein the ZC sequence length (LRA) is greater than 1151.

Clause 157. The UE of any of clauses 153-156, further comprising means for receiving a configuration for the PRACH for UL positioning waveform from a serving base station before entering the idle or inactive mode.

Clause 158. The UE of any of clauses 153-157, wherein the PRACH for UL positioning waveform is transmitted in a Random Access Channel (RACH) procedure for positioning.

Clause 159. The UE of clause 158, further comprising means for transmitting separate PRACH for UL positioning waveforms corresponding to separate RACH occasions with separate Random Access—Radio Network Temporary Identifiers (RA-RNTIs).

Clause 160. The UE of clause 158, further comprising means for receiving a paging message from a serving base station indicating that the UE is to transmit the PRACH for UL positioning waveform in the RACH procedure for positioning.

Clause 161. A non-transitory storage medium including program code stored thereon, the program code is operable to configure at least one processor in a user equipment (UE) to support position determination of the UE in a wireless network, the program code comprising instructions to: enter an idle or inactive mode; and transmit a Physical Random Access Channel (PRACH) for UL positioning waveform while the UE is in the idle or inactive mode, wherein the PRACH for UL positioning waveform is configured for positioning accuracy by including a Zadoff-Chu (ZC) sequence length (LRA) greater than a length used for a regular random access waveform.

Clause 162. The non-transitory storage medium of clause 161, where the ZC sequence length (LRA) of the regular random access waveform is 139.

Clause 163. The non-transitory storage medium of clause 161, wherein the ZC sequence length (LRA) is 571 or 839 or 1151.

Clause 164. The non-transitory storage medium of clause 161, wherein the ZC sequence length (LRA) is greater than 1151.

Clause 165. The non-transitory storage medium of any of clauses 161-164, wherein the program code further comprises instructions to receive a configuration for the PRACH for UL positioning waveform from a serving base station before entering the idle or inactive mode.

Clause 166. The non-transitory storage medium of any of clauses 161-165, wherein the PRACH for UL positioning waveform is transmitted in a Random Access Channel (RACH) procedure for positioning.

Clause 167. The non-transitory storage medium of clause 166, wherein the program code further comprises instructions to transmit separate PRACH for UL positioning waveforms corresponding to separate RACH occasions with separate Random Access—Radio Network Temporary Identifiers (RA-RNTIs).

Clause 168. The non-transitory storage medium of clause 166, wherein the program code further comprises instructions to receive a paging message from a serving base station indicating that the UE is to transmit the PRACH for UL positioning waveform in the RACH procedure for positioning.

Clause 169. A method for supporting position determination of a user equipment (UE) performed by a base station in a wireless network, comprising: receiving a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and generating positioning measurements for the UE using the PRACH for UL positioning.

Clause 170. The method of clause 169, wherein the ZC sequence length (LRA) of the regular random access waveform is 139.

Clause 171. The method of clause 169, wherein the ZC sequence length (LRA) is 571 or 839 or 1151.

Clause 172. The method of clause 169, wherein the ZC sequence length (LRA) is greater than 1151.

Clause 173. The method of any of clauses 169-172, further comprising transmitting a configuration for the PRACH for UL positioning waveform to the UE before the UE enters the idle or inactive mode.

Clause 174. The method of any of clauses 169-173, wherein the PRACH for UL positioning waveform is transmitted in a Random Access Channel (RACH) procedure for positioning.

Clause 175. The method of clause 174, further comprising receiving separate PRACH for UL positioning waveforms corresponding to separate RACH occasions with separate Random Access—Radio Network Temporary Identifiers (RA-RNTIs).

Clause 176. The method of clause 174, further comprising transmitting a paging message to the UE while the UE is in the idle or inactive mode indicating that the UE is to transmit the PRACH for UL positioning waveform in the RACH procedure for positioning.

Clause 177. A base station configured to support position determination of a user equipment (UE) in a wireless network, comprising: an external interface configured to wirelessly communicate with the UE in the wireless network; at least one memory; at least one processor coupled to the external interface and the at least one memory, wherein the at least one processor is configured to: receive, via the external interface, a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and generate positioning measurements for the UE using the PRACH for UL positioning.

Clause 178. The base station of clause 177, wherein the ZC sequence length (LRA) of the regular random access waveform is 139.

Clause 179. The base station of clause 177, wherein the ZC sequence length (LRA) is 571 or 839 or 1151.

Clause 180. The base station of clause 177, wherein the ZC sequence length (LRA) is greater than 1151.

Clause 181. The base station of any of clauses 177-180, wherein the at least one processor is further configured to transmit, via the external interface, a configuration for the PRACH for UL positioning waveform to the UE before the UE enters the idle or inactive mode.

Clause 182. The base station of any of clauses 177-181, wherein the PRACH for UL positioning waveform is transmitted in a Random Access Channel (RACH) procedure for positioning.

Clause 183. The base station of clause 182, wherein the at least one processor is further configured to receive, via the external interface, separate PRACH for UL positioning waveforms corresponding to separate RACH occasions with separate Random Access—Radio Network Temporary Identifiers (RA-RNTIs).

Clause 184. The base station of clause 182, wherein the at least one processor is further configured to transmit, via the external interface, a paging message to the UE while the UE is in the idle or inactive mode indicating that the UE is to transmit the PRACH for UL positioning waveform in the RACH procedure for positioning.

Clause 185. A base station in a wireless network configured for supporting position determination of a user equipment (UE), comprising: means for receiving a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and means for generating positioning measurements for the UE using the PRACH for UL positioning.

Clause 186. The base station of clause 185, wherein the ZC sequence length (LRA) of the regular random access waveform is 139.

Clause 187. The base station of clause 185, wherein the ZC sequence length (LRA) is 571 or 839 or 1151.

Clause 188. The base station of clause 185, wherein the ZC sequence length (LRA) is greater than 1151.

Clause 189. The base station of any of clauses 185-188, further comprising means for transmitting a configuration for the PRACH for UL positioning waveform to the UE before the UE enters the idle or inactive mode.

Clause 190. The base station of any of clauses 185-189, wherein the PRACH for UL positioning waveform is transmitted in a Random Access Channel (RACH) procedure for positioning.

Clause 191. The base station of clause 190, further comprising means for receiving separate PRACH for UL positioning waveforms corresponding to separate RACH occasions with separate Random Access—Radio Network Temporary Identifiers (RA-RNTIs).

Clause 192. The base station of clause 190, further comprising means for transmitting a paging message to the UE while the UE is in the idle or inactive mode indicating that the UE is to transmit the PRACH for UL positioning waveform in the RACH procedure for positioning.

Clause 193. A non-transitory storage medium including program code stored thereon, the program code is operable to configure at least one processor in a base station to support position determination of a user equipment (UE) in a wireless network, the program code comprising instructions to: receive a Physical Random Access Channel (PRACH) for UL positioning waveform transmitted by the UE while the UE is in an idle or inactive mode, wherein the PRACH for UL positioning waveform is configured for positioning accuracy by including a Zadoff-Chu (ZC) sequence length (LRA) greater than a length used for a regular random access waveform; and generate positioning measurements for the UE using the PRACH for UL positioning.

Clause 194. The non-transitory storage medium of clause 193, wherein the ZC sequence length (LRA) of the regular random access waveform is 139.

Clause 195. The non-transitory storage medium of clause 193, wherein the ZC sequence length (LRA) is 571 or 839 or 1151.

Clause 196. The non-transitory storage medium of clause 193, wherein the ZC sequence length (LRA) is greater than 1151.

Clause 197. The non-transitory storage medium of any of clauses 193-196, wherein the program code further comprises instructions to transmit a configuration for the PRACH for UL positioning waveform to the UE before the UE enters the idle or inactive mode.

Clause 198. The non-transitory storage medium of any of clauses 193-197, wherein the PRACH for UL positioning waveform is transmitted in a Random Access Channel (RACH) procedure for positioning.

Clause 199. The non-transitory storage medium of clause 198, wherein the program code further comprises instructions to receive separate PRACH for UL positioning waveforms corresponding to separate RACH occasions with separate Random Access—Radio Network Temporary Identifiers (RA-RNTIs).

Clause 200. The non-transitory storage medium of clause 198, wherein the program code further comprises instructions to transmit a paging message to the UE while the UE is in the idle or inactive mode indicating that the UE is to transmit the PRACH for UL positioning waveform in the RACH procedure for positioning.

Therefore, it is intended that claimed subject matter not be limited to the particular examples disclosed, but that such claimed subject matter may also include all aspects falling within the scope of appended claims, and equivalents thereof.

What is claimed is:

1. A method for supporting position determination of a user equipment (UE) performed by the UE in a wireless network, comprising:
    receiving a first Sounding Reference Signal (SRS) resource configuration from a base station during an active mode in which data communication occurs over a connection between the UE and the base station, the first SRS resource configuration comprising information for transmitting a positioning SRS to the base station;
    receiving, after transitioning to an inactive mode, an updated SRS resource configuration, the updated SRS resource configuration comprising an SRS for positioning inactive mode timing adjustment (TA) expiration timer, a reference signal receive power (RSRP) change threshold, and an indication of a downlink reference signal to be used for pathloss estimation by the UE, wherein the inactive mode corresponds to a state in which data communications are not exchanged, but the UE can receive control or paging signals from the base station in addition to transmitting the positioning SRS; and
    transmitting the positioning SRS while remaining in the inactive mode, wherein the transmitting of the positioning SRS is based at least in part on a determination that a timing advance is valid, wherein the determination whether a timing advance is valid is based at least in part on the SRS for positioning inactive mode TA expiration timer not being expired and a power of the indicated downlink reference signal is not increasing or decreasing by more than the RSRP change threshold.

2. The method of claim 1, wherein the first SRS resource configuration comprises a timing advance (TA) and an UL transmission spatial filter.

3. The method of claim 1, wherein the receiving of the first SRS resource configuration or the receiving of the updated SRS resource configuration comprises receiving two or more positioning SRS resources, and the two or more positioning SRS resources are associated with different expiration timers.

4. The method of claim 1, wherein the indicated downlink reference signal corresponds to one or more positioning SRS resources, and wherein the transmitting the positioning SRS comprises transmitting via at least one positioning SRS resource from the one or more positioning SRS resources.

5. The method of claim 2, wherein the SRS for positioning inactive mode TA expiration timer of the updated SRS resource configuration corresponds to a resetting of an SRS for positioning inactive mode TA expiration timer of the first SRS resource configuration as a result of receiving the updated SRS resource configuration with an update to the TA or the UL transmission spatial filter.

6. The method of claim 1, wherein the indication of a downlink reference signal to use for pathloss estimation further comprises a type of downlink reference signal and whether the downlink reference signal is transmitted from a serving base station or a neighboring base station.

7. The method of claim 1, further comprising:
    updating a reference power for the indicated downlink reference signal for determining when the change in the power of received signals exceeds the threshold.

8. The method of claim 1, wherein the SRS for positioning inactive mode TA expiration timer comprises separate TA expiration timers associated with different positioning SRS resources, and for each positioning SRS resource the change in the power of the received signals is based on a first reference pathloss associated with the positioning SRS resource.

9. The method of claim 8, wherein a different threshold is used for each different positioning SRS resource.

10. The method of claim 8, wherein for each positioning SRS resource the change in the power of the received signals is further based on a second reference pathloss, and wherein corresponding thresholds are used for each reference pathloss.

11. The method of claim 10, wherein the UE stops transmission of the positioning SRS while in the inactive mode if the change in the power of the received signals in either the first reference pathloss or the second reference pathloss exceeds a corresponding threshold.

12. The method of claim 10, wherein the UE stops transmission of the positioning SRS while in the inactive mode if the change in the power of the received signals in both the first reference pathloss and the second reference pathloss exceeds a corresponding threshold.

13. The method of claim 1, further comprising:
    monitoring a relative position of the UE based on inertial measurements while the UE is in the inactive mode; and
    determining when a change in the relative position exceeds a threshold, wherein the UE stops transmission of the positioning SRS while in the inactive mode if the change in the relative position exceeds the threshold.

14. The method of claim 1, wherein the receiving of the updated SRS resource configuration comprises receiving an update to a TA associated with the SRS for positioning inactive mode TA expiration timer in one of a downlink (DL)

Physical Data Shared Channel (PDSCH), a DL Physical Data Control Channel (PDCCH), or a paging message.

15. The method of claim 14, wherein the update is valid for one or more positioning SRS resources.

16. The method of claim 14, wherein separate updates are received for each positioning SRS resource.

17. The method of claim 16, wherein the separate updates are received in a single one of the DL PDSCH, DL PDDCCH, or the paging message or are received in multiple ones of the DL PDSCH, DL PDDCCH, or the paging message.

18. The method of claim 1, further comprising:
transmitting UL signals on pre-configured resources with multiple pre-configured UL transmission spatial filters;
wherein an update to an UL transmission spatial filter is received from the base station in response to the transmitted UL signals on the pre-configured resources with the multiple pre-configured UL transmission spatial filters.

19. The method of claim 1, wherein receiving the first SRS resource configuration comprises receiving multiple SRS resource configurations from the base station, wherein receiving the updated SRS resource configuration comprises receiving, from the base station a selection of a second SRS resource configuration from the multiple SRS resource configurations, and wherein transmitting the positioning SRS uses the second SRS resource configuration.

20. The method of claim 19, wherein the selection of the second SRS resource configuration is received with an update to a TA associated with the SRS for positioning inactive mode TA expiration timer.

21. The method of claim 19, wherein the UE receives the selection of the second SRS resource configuration from the base station in one of a downlink (DL) Physical Data Shared Channel (PDSCH), a DL Physical Data Control Channel (PDCCH, or a paging message.

22. A user equipment (UE) configured to support position determination of the UE in a wireless network, comprising:
a wireless transceiver configured to wirelessly communicate with base stations in the wireless network;
at least one memory;
at least one processor coupled to the wireless transceiver and the at least one memory, wherein the at least one processor is configured to:
receive, via the wireless transceiver, a first Sounding Reference Signal (SRS) resource configuration from a base station during an active mode in which data communication occurs over a connection between the UE and the base station, the first SRS resource configuration comprising information for transmitting a positioning SRS to the base station;
receive, via the wireless transceiver and while in an inactive mode after transitioning to an inactive mode, an updated SRS resource configuration, the updated SRS resource configuration comprising an SRS for positioning inactive mode timing adjustment (TA) expiration timer, a reference signal receive power (RSRP) change threshold, and an indication of a downlink reference signal to be used for pathloss estimation by the UE, wherein the inactive mode corresponds to a state in which data communications are not exchanged, but the UE can receive control or paging signals from the base station in addition to transmitting the positioning SRS; and
transmit, via the wireless transceiver, the positioning SRS while remaining in the inactive mode, wherein the transmitting of the positioning SRS is based at least in part on a determination that a timing advance is valid, wherein the determination whether a timing advance is valid is based at least in part on the SRS for positioning inactive mode TA expiration timer not being expired and a power of the indicated downlink reference signal is not increasing or decreasing by more than the RSRP change threshold.

23. The UE of claim 22, wherein the first SRS resource configuration comprises a timing advance (TA) and an UL transmission spatial filter.

24. The UE of claim 22, wherein the first SRS resource configuration or the updated SRS resource configuration comprises two or more positioning SRS resources, and the two or more positioning SRS resources are associated with different expiration timers.

25. The UE of claim 22, wherein the indicated downlink reference signal corresponds to one or more positioning SRS resources, and wherein the transmitting the positioning SRS comprises transmitting via at least one positioning SRS resource from the one or more positioning SRS resources.

26. The UE of claim 23, wherein the SRS for positioning inactive mode TA expiration timer of the updated SRS resource configuration corresponds to a resetting of an SRS for positioning inactive mode TA expiration timer of the first SRS resource configuration as a result of receiving the updated SRS resource configuration with an update to the TA or the UL transmission spatial filter.

27. The UE of claim 22, wherein the indication of a downlink reference signal to use for pathloss estimation further comprises a type of downlink reference signal and whether the downlink reference signal is transmitted from a serving base station or a neighboring base station.

28. The UE of claim 22, wherein the at least one processor is further configured to:
update a reference power for the indicated downlink reference signal for determining when the change in the power of received signals exceeds the threshold.

29. The UE of claim 22, wherein the SRS for positioning inactive mode TA expiration timer comprises separate TA expiration timers associated with different positioning SRS resources and for each positioning SRS resource the change in the power of the received signals is based on a first reference pathloss associated with the positioning SRS resource.

30. The UE of claim 29, wherein a different threshold is used for each different positioning SRS resource.

31. The UE of claim 29, wherein for each positioning SRS resource the change in the power of the received signals is further based on a second reference pathloss, and wherein corresponding thresholds are used for each reference pathloss.

32. The UE of claim 31, wherein the UE stops transmission of the positioning SRS while in the inactive mode if the change in the power of the received signals in either the first reference pathloss or the second reference pathloss exceeds a corresponding threshold.

33. The UE of claim 31, wherein the UE stops transmission of the positioning SRS while in the inactive mode if the change in the power of the received signals in both the first reference pathloss and the second reference pathloss exceeds a corresponding threshold.

34. The UE of claim 22, wherein the at least one processor is further configured to:
monitor a relative position of the UE based on inertial measurements while the UE is in the inactive mode; and determine when a change in the relative position exceeds a threshold, wherein the UE stops transmission of the positioning SRS while in the inactive mode if the change in the relative position exceeds the threshold.

35. The UE of claim 22, wherein the at least one processor is further configured to:
receive the updated SRS resource configuration with an update to a TA associated with the SRS for positioning inactive mode TA expiration timer in one of a downlink (DL) Physical Data Shared Channel (PDSCH), a DL Physical Data Control Channel (PDCCH), or a paging message.

36. The UE of claim 35, wherein the update is valid for one or more positioning SRS resources.

37. The UE of claim 35, wherein separate updates are received for each positioning SRS resource.

38. The UE of claim 37, wherein the separate updates are received in a single one of the DL PDSCH, DL PDDCCH, or the paging message or are received in multiple ones of the DL PDSCH, DL PDDCCH, or the paging message.

39. The UE of claim 22, wherein the at least one processor is further configured to:
transmit, via the wireless transceiver, UL signals on pre-configured resources with multiple pre-configured UL transmission spatial filters;
wherein an update to an UL transmission spatial filter is received from the base station in response to the transmitted UL signals on the pre-configured resources with the multiple pre-configured UL transmission spatial filters.

40. The UE of claim 22, wherein the at least one processor is configured to perform the following using the wireless transceiver;
receive the first SRS resource configuration with multiple SRS resource configurations,
receive the updated SRS resource configuration through receiving from the base station a selection of a second SRS resource configuration from the multiple SRS resource configurations, and
transmit the positioning SRS using the second SRS resource configuration.

41. The UE of claim 40, wherein the selection of the second SRS resource configuration is received with an update to a TA associated with the SRS for positioning inactive mode TA expiration timer.

42. The UE of claim 40, wherein the UE receives the selection of the second SRS resource configuration from the base station in one of a downlink (DL) Physical Data Shared Channel (PDSCH), a DL Physical Data Control Channel (PDCCH), or a paging message.

43. A method for supporting position determination of a user equipment (UE) performed by a base station in a wireless network, comprising:
transmitting a first Sounding Reference Signal (SRS) resource configuration to the UE while the UE is in an active mode in which data communication occurs over a connection between the UE and the base station, the first SRS resource configuration comprising information for transmitting a positioning SRS to the base station;
transmitting, after the UE has transitioned to an inactive mode, an updated SRS resource configuration to the UE, the updated SRS resource configuration comprising an SRS for positioning inactive mode timing adjustment (TA) expiration timer, a reference signal receive power (RSRP) change threshold, and an indication of a downlink reference signal to be used for pathloss estimation by the UE, wherein the inactive mode corresponds to a state in which data communications are not exchanged, but the base station can transmit control or paging signals to the UE in addition to receiving the positioning SRS;
receiving the positioning SRS from the UE while the UE remains in the inactive mode; and
generating positioning measurements using the positioning SRS transmitted from the UE.

44. The method of claim 43, wherein the first SRS resource configuration comprises a timing advance (TA) and an UL transmission spatial filter.

45. The method of claim 43, wherein the first SRS resource configuration or the updated SRS resource configuration comprises two or more positioning SRS resources, and the two or more positioning SRS resources are associated with different expiration timers.

46. The method of claim 43, wherein the indicated downlink reference signal corresponds to one or more positioning SRS resources, and wherein the receiving the positioning SRS comprises receiving via at least one positioning SRS resource from the one or more positioning SRS resources.

47. The method of claim 44, wherein the SRS for positioning inactive mode TA expiration timer of the updated SRS resource configuration corresponds to a resetting of an SRS for positioning inactive mode TA expiration timer of the first SRS resource configuration as a result of transmitting the updated SRS resource configuration with an update to the TA or the UL transmission spatial filter.

48. The method of claim 43, further comprises transmitting an update to a TA associated with the SRS for positioning inactive mode TA expiration timer in one of a downlink (DL) Physical Data Shared Channel (PDSCH), a DL Physical Data Control Channel (PDCCH), or a paging message.

49. The method of claim 48, wherein the update is valid for one or more positioning SRS resources.

50. The method of claim 48, wherein separate updates are transmitted for each positioning SRS resource.

51. The method of claim 50, wherein the separate updates are transmitted in a single one of the DL PDSCH, DL PDDCCH, or the paging message or are transmitted in multiple ones of the DL PDSCH, DL PDDCCH, or the paging message.

52. The method of claim 43, further comprising:
receiving from the UE UL signals on pre-configured resources with multiple pre-configured UL transmission spatial filters; and
generating an update to at least one UL transmission spatial filter based on the received UL signals on the pre-configured resources with the multiple pre-configured UL transmission spatial filters.

53. The method of claim 43, wherein transmitting the first SRS resource configuration comprises transmitting multiple SRS resource configurations to the UE, wherein transmitting the updated SRS resource configuration comprises transmitting a selection of a second SRS resource configuration from the multiple SRS resource configurations, and wherein receiving the positioning SRS uses the second SRS resource configuration.

54. The method of claim 53, wherein the selection of the second SRS resource configuration is transmitted with an update to a TA associated with the SRS for positioning inactive mode TA expiration timer.

55. The method of claim 53, wherein the base station transmits the selection of the second SRS resource configuration in one of a downlink (DL) Physical Data Shared Channel (PDSCH), a DL Physical Data Control Channel (PDCCH), or a paging message.

56. A base station configured to support position determination of a user equipment (UE) in a wireless network, comprising:
an external interface configured to wirelessly communicate with the UE in the wireless network;
at least one memory;
at least one processor coupled to the external interface and the at least one memory, wherein the at least one processor is configured to:
transmit a first Sounding Reference Signal (SRS) resource configuration to the UE while the UE is in an active mode in which data communication occurs over a connection between the UE and the base station, the first SRS resource configuration comprising information for transmitting a positioning SRS to the base station;
transmit, after the UE has transitioned to an inactive mode, an updated SRS resource configuration to the UE, the updated SRS resource configuration comprising an SRS for positioning inactive mode timing adjustment (TA) expiration timer, a reference signal receive power (RSRP) change threshold, and an indication of a downlink reference signal to be used for pathloss estimation by the UE, wherein the inactive mode corresponds to a state in which data communications are not exchanged, but the base station can transmit control or paging signals to the UE in addition to receiving the positioning SRS;
receive, via the external interface, the positioning SRS from the UE while the UE remains in the inactive mode; and
generate positioning measurements using the positioning SRS transmitted from the UE.

57. The base station of claim 56, wherein the first SRS resource configuration comprises a timing advance (TA) and an UL transmission spatial filter.

58. The base station of claim 56, wherein the first SRS resource configuration or the updated SRS resource configuration comprises two or more positioning SRS resources and the two or more positioning SRS resources are associated with different expiration timers.

59. The base station of claim 56, wherein the indicated downlink reference signal corresponds to one or more positioning SRS resources, and wherein the receiving the positioning SRS comprises receiving via at least one positioning SRS resource from the one or more positioning SRS resources.

60. The base station of claim 57, wherein the SRS for positioning inactive mode TA expiration timer of the updated SRS resource configuration corresponds to a resetting of an SRS for positioning inactive mode TA expiration timer of the first SRS resource configuration as a result of transmitting the updated SRS resource configuration with an update to the TA or the UL transmission spatial filter.

61. The base station of claim 56, wherein the at least one processor is further configured to transmit an update to a TA associated with the SRS for positioning inactive mode TA expiration timer in one of a downlink (DL) Physical Data Shared Channel (PDSCH), a DL Physical Data Control Channel (PDCCH), or a paging message.

62. The base station of claim 61, wherein the update is valid for one or more positioning SRS resources.

63. The base station of claim 61, wherein separate updates are transmitted for each positioning SRS resource.

64. The base station of claim 63, wherein the separate updates are transmitted in a single one of the DL PDSCH, DL PDDCCH, or the paging message or are transmitted in multiple ones of the DL PDSCH, DL PDDCCH, or the paging message.

65. The base station of claim 56, wherein the at least one processor is further configured to:
receive from the UE, via the external interface, UL signals on pre-configured resources with multiple pre-configured UL transmission spatial filters; and
generate an update to at least one UL transmission spatial filter based on the received UL signals on the pre-configured resources with the multiple pre-configured UL transmission spatial filters.

66. The base station of claim 56, wherein the at least one processor is configured to:
transmit, via the external interface, the first SRS resource configuration with multiple SRS resource configurations,
transmit the updated SRS resource configuration by transmitting, via the external interface, a selection of a second SRS resource configuration from the multiple SRS resource configurations, and
receive the positioning SRS using the second SRS resource configuration.

67. The base station of claim 66, wherein the selection of the second SRS resource configuration is transmitted with an update to a TA associated with the SRS for positioning inactive mode TA expiration timer.

68. The base station of claim 66, wherein the base station transmits the selection of the second SRS resource configuration in one of a downlink (DL) Physical Data Shared Channel (PDSCH), a DL Physical Data Control Channel (PDCCH), or a paging message.

* * * * *